(12) United States Patent
Fujita et al.

(10) Patent No.: US 7,944,794 B2
(45) Date of Patent: May 17, 2011

(54) OPTICAL DISC APPARATUS, INFORMATION RECORDING METHOD, AND INFORMATION REPRODUCTION METHOD

(75) Inventors: Goro Fujita, Kanagawa (JP); Kimihiro Saito, Saitama (JP); Toshihiro Horigome, Kanagawa (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 520 days.

(21) Appl. No.: 12/038,201

(22) Filed: Feb. 27, 2008

(65) Prior Publication Data

US 2008/0239922 A1    Oct. 2, 2008

(30) Foreign Application Priority Data

Mar. 30, 2007    (JP) ................................. 2007-094822

(51) Int. Cl.
  *G11B 7/00*    (2006.01)
(52) U.S. Cl. .......................... 369/103; 369/53.23; 369/94
(58) Field of Classification Search ............... 369/44.37, 369/94, 44.25, 44.26, 44.35, 44.36, 103, 369/53.27, 53.28, 47.16, 47.41, 53.22, 53.23, 369/53.31
See application file for complete search history.

(56) References Cited

U.S. PATENT DOCUMENTS

| | | | | |
|---|---|---|---|---|
| 5,526,336 A | * | 6/1996 | Park et al. | ......................... 369/94 |
| 2006/0158990 A1 | * | 7/2006 | Hineno | ....................... 369/112.1 |

FOREIGN PATENT DOCUMENTS

| | | |
|---|---|---|
| JP | 62-192939 | 8/1987 |
| JP | 04-301226 | 10/1992 |
| JP | 08-221754 | 8/1996 |
| JP | 08-339571 | 12/1996 |
| JP | 2000-285508 | 10/2000 |
| JP | 2003-036537 | 2/2003 |
| JP | 2005-071557 | 3/2005 |
| JP | 2006-268952 | 10/2006 |
| WO | WO2006/093054 A1 | 9/2006 |

OTHER PUBLICATIONS

U.S. Appl. No. 12/046,039, filed Mar. 11, 2008, Fujita, et al.

* cited by examiner

*Primary Examiner* — Tan X Dinh
*Assistant Examiner* — Andrew J Sasinowski
(74) *Attorney, Agent, or Firm* — Oblon, Spivak, McClelland, Maier & Neustadt, L.L.P.

(57) ABSTRACT

An optical disc apparatus that records recording marks in a plurality of mark layers by irradiating predetermined light onto a disc-like volume type recording medium on the basis of information to be recorded is disclosed. The apparatus includes: a first focus position adjusting means for adjusting the position of a focus on which a first light beam focuses within the volume type recording medium, in the direction of an optical axis of the first light beam; a second focus position adjusting means for adjusting the position of a focus on which a second light beam focuses within the volume type recording medium, in the direction of an optical axis of the second light beam; a focus control means for controlling the first focus position adjusting means and the second focus position adjusting means; and a recording control means for forming the recording marks at the positions of respective focuses.

23 Claims, 23 Drawing Sheets

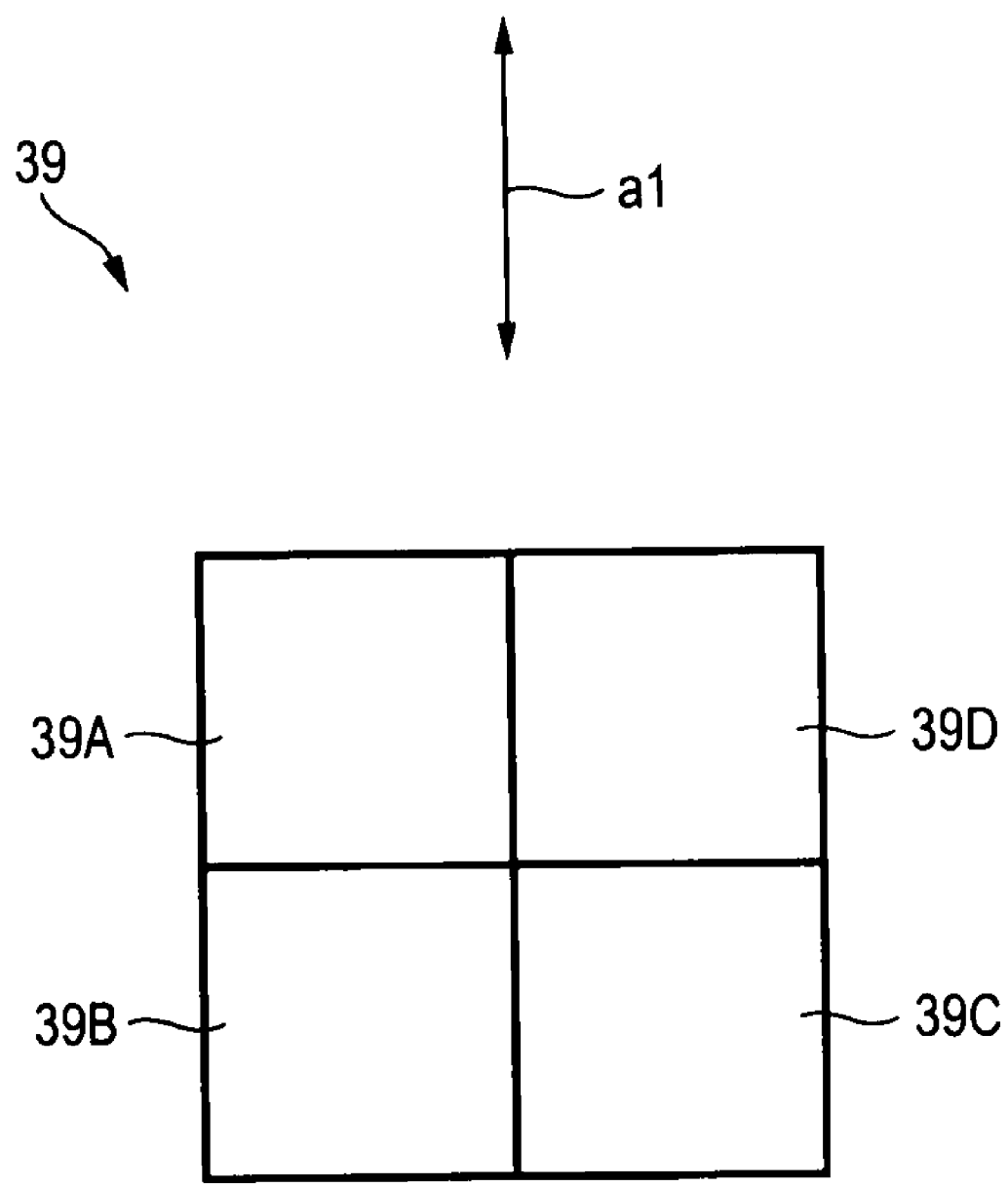

OPTICAL DISC APPARATUS, INFORMATION RECORDING METHOD, AND INFORMATION REPRODUCTION METHOD

CROSS REFERENCES TO RELATED APPLICATIONS

The present invention contains subject matter related to Japanese Patent Application JP 2007-094822 filed in the Japanese Patent Office on Mar. 30, 2007, the entire contents of which being incorporated herein by reference.

BACKGROUND OF THE INVENTION

1. Field of the Invention

The present invention relates to an optical disc apparatus, an information recording method, and an information reproduction method and is suitably applied to an optical disc apparatus that records a hologram on an optical disc and reproduces the hologram, for example.

2. Description of the Related Art

Known optical disc apparatuses that reproduce information by irradiating light beams on optical discs, such as a CD (compact disc), a DVD (digital versatile disc) and a Blu-ray disc (registered trademark; referred to as "BD") and reading reflected light are widespread.

Moreover, in the known optical disc apparatuses, recording of information is performed by irradiating light beams on the optical discs and changing a local reflectance of the optical discs.

Regarding the optical discs, the size of a light spot formed on a corresponding optical disc is approximately given by $\lambda/NA$ ($\lambda$: wavelength of a light beam, NA: numerical aperture), and it is known that the resolution is also proportional to the value. For example, details of a BD that can record about 25 GB data on an optical disc having a diameter of 120 mm are disclosed in Y. Kasami, Y. Kuroda, K. Seo, O. Kawakubo, S. Takagawa, M. Ono, and M. Yamada, Jpn. J. Appl. Phys., 39, 756(2000) (Non-patent Document 1).

Various kinds of contents, such as music contents and image contents, or various kinds of information, such as various data for computers, are recorded on an optical disc. In particular, since an increase in the number of contents recorded in one optical disc is recently requested as the amount of information increases due to a high-resolution image or high-quality sound, the optical disc is requested to have a larger capacity than before.

For this reason, a technique of increasing the recording capacity in one optical disc by causing recording layers to overlap within one optical disc is proposed (for example, refer to I. Ichimura et al, Technical Digest of ISOM' 04, pp 52, Oct. 11-15, 2005, Jeju Korea (Non-patent Document 2)).

On the other hand, an optical disc apparatus using a hologram is also proposed as a technique of recording information on an optical disc (for example, refer to R. R. McLeod et al., "Micro holographic multilayer optical disc data storage," Appl. Opt., Vol. 44, 2005, pp 3197 (Non-patent Document 3)).

For example, as shown in FIG. 1, an optical disc apparatus 1 is configured such that light beams from an optical head 7 are condensed into an optical disc 8, which is formed of a photopolymer whose refractive index changes with the intensity of irradiated light and then light beam from the opposite direction is condensed once again on the same focus position by using a reflection unit 9 provided in a bottom surface side (lower side in FIG. 1) of the optical disc 8.

The optical disc apparatus 1 makes a laser 2 emit a light beam, which is a laser light, modulates the light wave by using an acoustooptic modulator 3, and converts the modulated light wave into parallel light by using a collimator lens 4. Then, the light beams are transmitted through a polarization beam splitter 5, are converted into circularly polarized light from linearly polarized light by a quarter wavelength plate 6, and are then incident on the optical head 7.

The optical head 7 is configured to be able to record and reproduce information. The optical head 7 makes light beams reflected by a mirror 7A and condensed by an objective lens 7B so as to be irradiated onto the optical disc 8 which is rotating by a spindle motor (not shown).

At this time, light beams are condensed within the optical disc 8 and are then reflected by the reflection unit 9 provided at the bottom surface side of the optical disc 8, such that the light beams are condensed onto the same focus within the optical disc 8 from the bottom surface side of the optical disc 8. In addition, the reflection unit 9 is configured to include a condensing lens 9A, a shutter 9B, a condensing lens 9C, and a reflection mirror 9D.

As a result, as shown in FIG. 2A, a standing wave is generated on the focus position of a light beam and a recording mark RM that is a hologram, which has a small light spot size and has an overall shape obtained by attaching two cones such that vortexes thereof are made contact with each other, is formed. In this way, the recording mark RM is recorded as information.

When the optical disc apparatus 1 records a plurality of recording marks RM within the optical disc 8, the optical disc apparatus 1 can form one mark recording layer by rotating the optical disc 8 and disposing each recording mark RM along a track having a shape of a concentric circle or a spiral and can record each recording mark RM by adjusting the focus position of a light beam such that a plurality of mark recording layers overlap.

Thus, the optical disc 8 has a multi-layer structure including a plurality of mark recording layers thereinside. For example, as shown in FIG. 2B, in the optical disc 8, a distance (mark pitch) p1 between recording marks RM is 1.5 μm, a distance (track pitch) p2 between trucks is 2 μm, and a distance p3 between layers is 22.5 μm.

In addition, in the case of reproducing information from the disc 8 on which the recording mark RM is recorded, the optical disc apparatus 1 closes the shutter 9B of the reflection unit 9 such that a light beam is not irradiated from the rear surface side of the optical disc 8.

At this time, the optical disc apparatus 1 causes the optical head 7 to irradiate light beams onto the recording mark RM in the optical disc 8 and causes reproduction light beams generated from the recording mark RM to be incident on the optical head 7. The reproduction light beams are converted into linearly polarized light from circularly polarized light by the quarter wavelength plate 6 and are reflected by the polarization beam splitter 5. Then, the reproduction light beams are condensed by the condensing lens 10 and are irradiated onto a photodetector 12 through a pinhole plate 11.

At this time, the optical disc apparatus 1 detects the optical amount of reproduction light beams using photodetector 12 and reproduces information based on a result of the detection.

SUMMARY OF THE INVENTION

However, in the case of the optical disc apparatus 1 having the above-described configuration, a highly accurate control is required to make focuses of two kinds of light beams formed on a portion, in which information is recorded, of the optical disc 8 which rotates and vibrates. Accordingly, the configuration of the optical disc apparatus 1 becomes complicated.

Furthermore, in recent years, there is not only a demand to increase the amount of information recorded on the optical disc 8 but also a demand to shorten a time required for recording and reproduction by improving the recording speed or the reproduction speed.

In this case, it is considered to increase the rotation speed of the optical disc 8 or shorten the record time of the recording mark RM in the optical disc apparatus 1.

However, in the case of the optical disc apparatus 1, there is a limitation in an increase in rotation speed from the point of view of the strength of the optical disc 8, a performance of a spindle motor, or deviation. In addition, since a time required for physical and chemical reactions when forming the recording mark RM is taken, an upper limit of the recording speed or the reproduction speed is set naturally.

For this reason, in the optical disc apparatus 1, it has been difficult to shorten a time required for recording or reproduction.

Therefore, in view of the above, it is desirable to provide an optical disc apparatus, an information recording method, and an information reproduction method capable of completing recording of information on an optical disc and reproduction of information from the optical disc within a short time.

According to an embodiment of the present invention, there is provided an optical disc apparatus that records recording marks in a plurality of mark layers by irradiating predetermined light based on information to be recorded onto a disc-like volume type recording medium including: a first focus position adjusting means for adjusting the position of a focus on which a first light beam focuses within the volume type recording medium, in the direction of an optical axis of the first light beam; a second focus position adjusting means for adjusting the position of a focus on which a second light beam focuses within the volume type recording medium, in the direction of an optical axis of the second light beam; a focus control means for controlling the first focus position adjusting means and the second focus position adjusting means such that the first light beam and the second light beam passing through the same objective lens are focused on mutually corresponding positions of different mark layers within the volume type recording medium; and a recording control means for forming the recording marks at the positions of respective focuses by irradiating the first light beam and the second light beam in a state where the first light beam and the second light beam correspond to the information to be recorded.

Thus, since associated information can be recorded as recording marks at the mutually corresponding positions of different mark layers by the first and second light beams when information is recorded, the associated information can be concurrently read from the mutually corresponding positions of different mark layers at the time of reproduction.

Furthermore, according to another embodiment of the present invention, there is provided an information recording method of recording marks in a plurality of mark layers by irradiating predetermined light onto a disc-like volume type recording medium on the basis of information to be recorded including the steps of: performing a focus control such that first light beam and second light beam passing through the same objective lens are focused on mutually corresponding positions of different mark layers within the volume type recording medium by adjusting the position of a focus on which a first light beam focuses within the volume type recording medium, in the direction of an optical axis of the first light beam and adjusting the position of a focus on which a second light beam focuses within the volume type recording medium, in the direction of an optical axis of the second light beam; and performing a recording control for forming the recording marks at the positions of respective focuses by irradiating the first light beam and the second light beam in a state where the first light beam and the second light beam correspond to the information to be recorded.

Thus, since associated information can be recorded as recording marks at the mutually corresponding positions of different mark layers by the first and second light beams when information is recorded, the associated information can be concurrently read from the mutually corresponding positions of different mark layers at the time of reproduction.

Furthermore, according to still another embodiment of the present invention, there is provided an optical disc apparatus that reproduces information by irradiating predetermined light onto a disc-like volume type recording medium and in which recording marks are recorded in a plurality of mark layers including: a first focus position adjusting means for adjusting the position of a focus on which a first light beam focuses within the volume type recording medium, in the direction of an optical axis of the first light beam; a second focus position adjusting means for adjusting the position of a focuses on which a second light beams focuses within the volume type recording medium, in the direction of an optical axis of the second light beam; a focus control means for generating first and second reproduction light beams on the basis of the recording marks of the different mark layers by controlling the first focus position adjusting means and the second focus position adjusting means such that the first light beam and the second light beam passing through the same objective lens are focused on mutually corresponding positions of different mark layers within the volume type recording medium; first and second detecting means for detecting the first and second reproduction light beams; and a reproduction signal generating means for generating a reproduction signal by unifying detection results of the first and second detecting means.

Thus, since the first and second reproduction light beams can be concurrently detected from different mark layers when information is reproduced, it is possible to increase a speed of reading information from an optical disc by unifying both detection results.

In addition, according to still another embodiment of the present invention, there is provided an information reproduction method of reproducing information by irradiating predetermined light onto a disc-like volume type recording medium and in which recording marks are recorded in a plurality of mark layers including the steps of: performing a focus control for making a control such that first light beam and second light beam passing through the same objective lens are focused on mutually corresponding positions of different mark layers within the volume type recording medium by adjusting the position of a focus on which a first light beam focuses within the volume type recording medium, in the direction of an optical axis of the first light beam and adjusting the position of a focus on which a second light beam focuses within the volume type recording medium, in the direction of an optical axis of the second light beam and for generating first and second reproduction light beams on the basis of the recording marks of the different mark layers; detecting the first and second reproduction light beams; and generating a reproduction signal by unifying detection results in the detecting of the first and second reproduction light beams.

Thus, since the first and second reproduction light beams can be concurrently detected from different mark layers when information is reproduced, it is possible to increase a speed of reading information from an optical disc by unifying both detection results.

According to the embodiments of the present invention, since associated information can be recorded as recording marks at the mutually corresponding positions of different mark layers by the first and second light beams when information is recorded, the associated information can be concurrently read from the mutually corresponding positions of different mark layers at the time of reproduction. As a result, it is possible to realize an optical disc apparatus and an information recording method capable of completing reproduction of information from a hologram recorded in an optical disc in a short time.

Furthermore, according to the embodiments of the present invention, since the first and second reproduction light beams can be concurrently detected when information is reproduced, it is possible to increase a speed of reading information from an optical disc by unifying both detection results. As a result, it is possible to realize an optical disc apparatus and an information recording method capable of completing reproduction of information from a hologram recorded in an optical disc in a short time.

BRIEF DESCRIPTION OF THE DRAWINGS

FIG. 8 is a view schematically illustrating the configuration of a detection region in a photodetector;

DESCRIPTION OF THE PREFERRED EMBODIMENTS

Hereinafter, an embodiment of the present invention will be described with reference to the accompanying drawings.

(1) Principles of Recording and Reproduction of Information Using a Hologram

Principles of recording and reproduction of information will be described before describing the specific configuration of an optical disc according to an embodiment of the present invention.

Figure 3A:
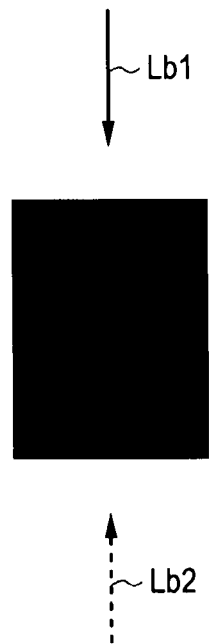
FIGS. 3A to 3C are views schematically illustrating principles of recording and reproduction of a hologram.

In FIG. 3A, a recording medium M has a shape of an approximately rectangular parallelepiped and is formed by using a photopolymer which reacts to a blue light beam having a wavelength of 405 nm, for example, and whose refractive index changes with the intensity of irradiated light.

A hologram is uniformly formed on the recording medium M by irradiating blue light beams Lb1 and Lb2, each of which has a wavelength of 405 nm, on the entire recording medium M from upper and lower sides in the drawing as previous format processing.

Figure 3B:
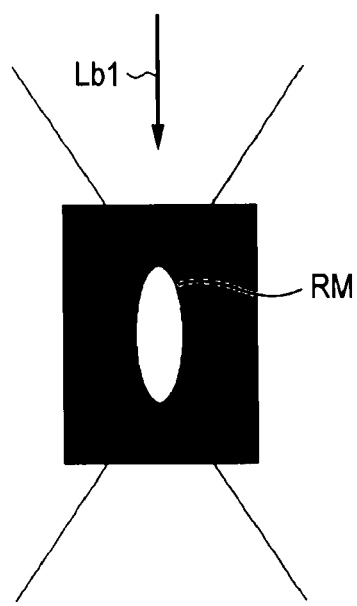

In the case when the blue light beam Lb1 having a wavelength of 405 nm, for example, is irradiated onto the recording medium M such that the blue light beams Lb1 are condensed, a hologram is broken by the blue light beam Lb1 and a recording mark RM that is a portion where the hologram is broken is formed as shown in FIG. 3B.

Figure 3C:
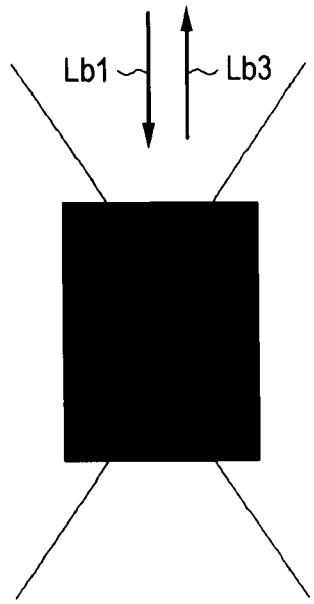

As a result, as shown in FIG. 3C, in the case when the blue light beam Lb1 having the same wavelength as that at the time of formatting is irradiated onto a portion of the recording medium M where the recording mark RM is not formed, are production light beam Lb3 is generated from a corresponding portion, to which the blue light beam Lb1 is irradiated, due to a property of a hologram.

On the other hand, since a hologram is broken in a portion where the recording mark RM is recorded, a property as a hologram is not shown in the portion where the recording mark RM is recorded even if the blue light beam Lb1 is irradiated thereonto. As a result, the blue reproduction light beam Lb3 is not generated in the portion where the recording mark RM is recorded.

Then, information can be recorded on the recording medium M or reproduced from the recording medium M, for example, by assigning values "0" and "1", which are used when expressing information in a binary system, for "no recording mark RM (that is, a hologram is not broken)" and "there exists the recording mark RM (that is, a hologram is completely broken)", respectively.

Thus, in recording and reproduction of information using a hologram, a hologram is formed on the whole by performing formatting beforehand and one kind of light beam, such as the blue light beam Lb1, is used both cases of recording of information and reproduction of information.

(2) First Embodiment (2-1) Configuration of an Optical Disc

Figure 4:
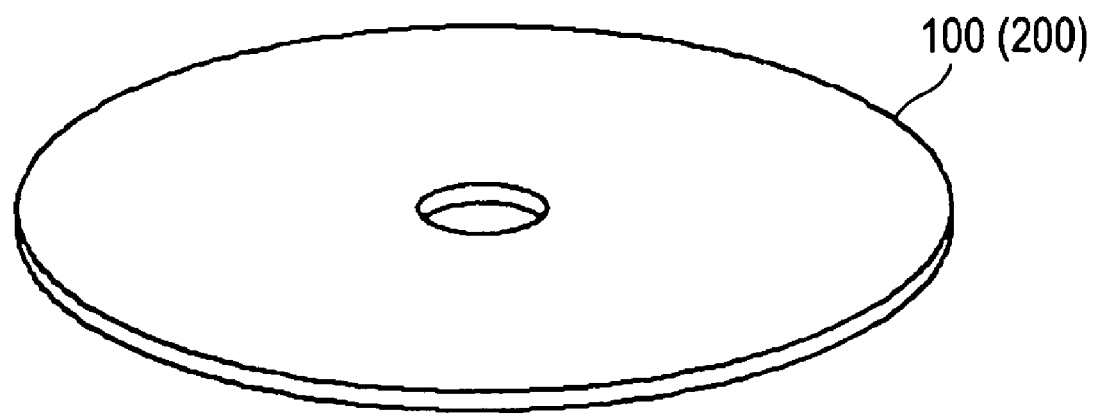
FIG. 4 is a view schematically illustrating the configuration of an optical disc in an embodiment of the present invention.

Next, an optical disc 100 used as an information recording medium in the present embodiment will be described. As shown in an outline view of FIG. 4, the optical disc 100 is configured to have a disc-like shape with a diameter of about 120 mm as the entire shape, like known CD, DVD, and BD.

Figure 5:
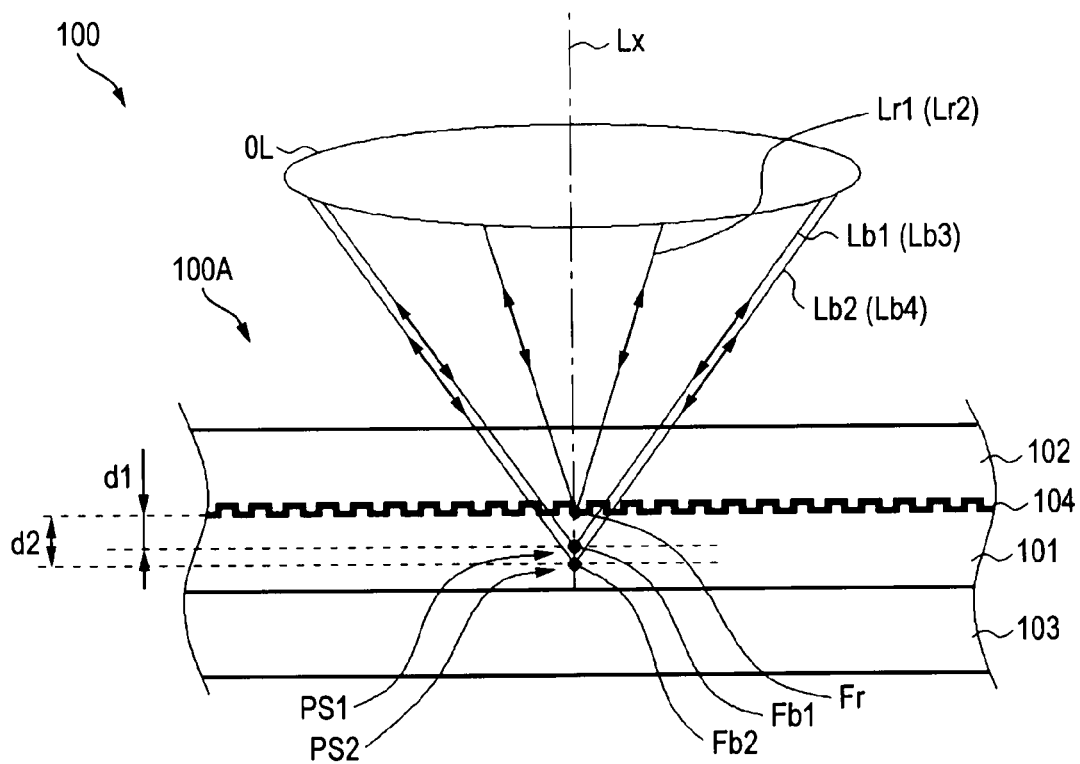
FIG. 5 is a view schematically illustrating the internal configuration of optical discs in the first and second embodiments.

Furthermore, as shown in a cross-sectional view of FIG. 5, the optical disc 100 has a recording layer 101 for recording information in the middle thereof and the recording layer 101 is configured such that substrates 102 and 103 pinch the recording layer 101 from both surfaces thereof.

The substrates 102 and 103 are formed of materials, such as polycarbonate or glass. Each of the substrates 102 and 103 is configured such that light incident on one surface is transmitted toward the opposite surface with a high transmittance. In addition, the substrates 102 and 103 also serve to protect the recording layer 101 because each of the substrates 102 and 103 has a predetermined strength.

In addition, the optical disc 100 has an almost symmetrical structure in the thickness direction thereof when the recording layer 101 is assumed to be a center. In addition, a consideration for suppressing the overall warpage or distortion occurring due to aging and the like as much as possible is also made. In addition, non-reflective coating processing may be performed on surfaces of the substrates 102 and 103 in order to prevent unnecessary reflection.

Figure 1:
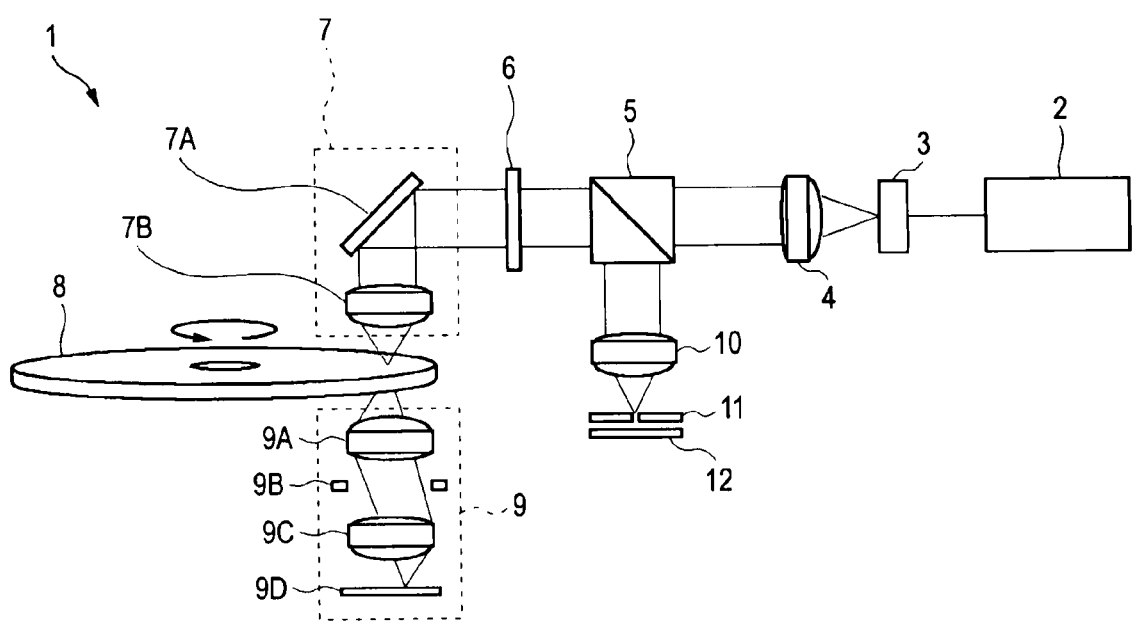
FIG. 1 is a view schematically illustrating a known standing wave recording type optical disc apparatus.

Similar to the optical disc 8 (see FIG. 1) and the recording medium M (see FIGS. 3A to 3C), the recording layer 101 is formed of a photopolymer whose refractive index changes with the intensity of irradiated light and which reacts to a blue light beam having a wavelength of 405 nm.

In practice, the optical disc 100 is configured such that the blue light beams Lb1 are condensed and irradiated by an objective lens OL at the time of recording and reproduction of information (which will be described later in detail).

At this time, in the recording layer 101, a hologram near a focus Fb1 of the blue light beams Lb1 is broken and the recording mark RM is formed in order to increase the intensity of light near the focus Fb1 of the blue light beams Lb1.

In addition, the optical disc 100 has a transflective film 104, which serves as a transflective layer, in an interface between the recording layer 101 and the substrate 102. The transflective film 104 is a dielectric multilayer, for example, and has a wavelength selectivity that allows the blue light beams Lb1 and Lb2 and blue reproduction light beams Lb3 and Lb4, of whose wavelengths are 405 nm, to be transmitted therethrough and that reflects a red light beam Lr1 having a wavelength of 660 nm.

Furthermore, the transflective film 104 forms guide grooves for a tracking servo. Specifically, the transflective film 104 forms a spiral track with the same land and groove as those in a normal BD-R (recordable) disc or the like. An address having a series of numbers is added for a predetermined recording unit in the track, such that a track used to record or reproduce information can be specified on the basis of the address.

In addition, a pit may be formed instead of a guide groove or a combination of a guide groove and a pit may be formed in the transflective film 104 (that is, interface between the recording layer 101 and the substrate 102), such that an address can be recognized by using light beams.

When the red light beam Lr1 is irradiated from a side of the substrate 102, the transflective film 104 reflects the red light beam Lr1 toward the side of the substrate 102. A light beam reflected at this time is hereinafter called a red reflected light beam Lr2.

It is assumed that the red reflected light beam Lr2 is used for a position control (that is, focus control and tracking control) of the predetermined objective lens OL for matching a focus Fr of the red light beam Lr1 condensed by the objective lens OL to a track (hereinafter, referred to as a target track) that is targeted in an optical disc apparatus, for example. Hereinafter, a surface of the optical disc 100 facing the substrate 102 is called a surface 100A.

In practice, when information is recorded on the optical disc 100, the red light beams Lr1 are condensed by the objective lens OL a position control of which has been done and are focused on a target track of the transflective film 104, as shown in FIG. 5.

In addition, the blue light beam Lb1, which shares an optical axis Lx with the red light beam Lr1 and is condensed by the objective lens OL, is transmitted through the substrate 102 and the transflective film 104 and is focused on the position corresponding to a bottom side (that is, substrate 103 side) of the target track in the recording layer 101. At this time, the focus Fb1 of the blue light beam Lb1 is positioned at a place farther than the focus Fr on the common optical axis Lx when the objective lens OL is set as a reference.

As a result, in the optical disc 100, a relatively small recording mark RM (hereinafter, referred to as a first recording mark RM1) is recorded at the position of the focus Fb1 corresponding to the bottom side of the target track in the recording layer 101.

At this time, a hologram of a portion where the intensity of the blue light beam Lb1, which is convergent light, reaches a predetermined value or more is broken in the recording layer 101, such that the recording mark RM is formed. Accordingly, the recording mark RM has an elliptical shape which is long up and down, as shown in FIG. 3B.

In addition, the diameter RMr of the recording mark RM is about 1.0 μm and the height RMh thereof is about 9.7 μm.

Figure 2A:
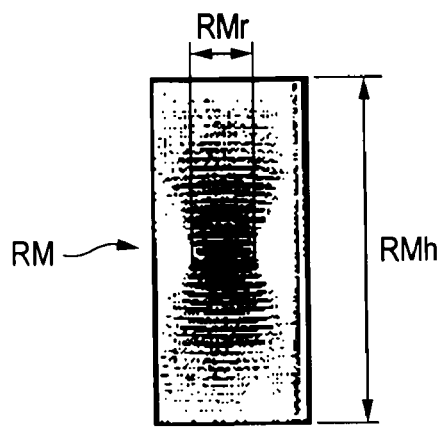
FIGS. 2A to 2C are views schematically illustrating a mode of formation of a hologram.
Figure 2B:
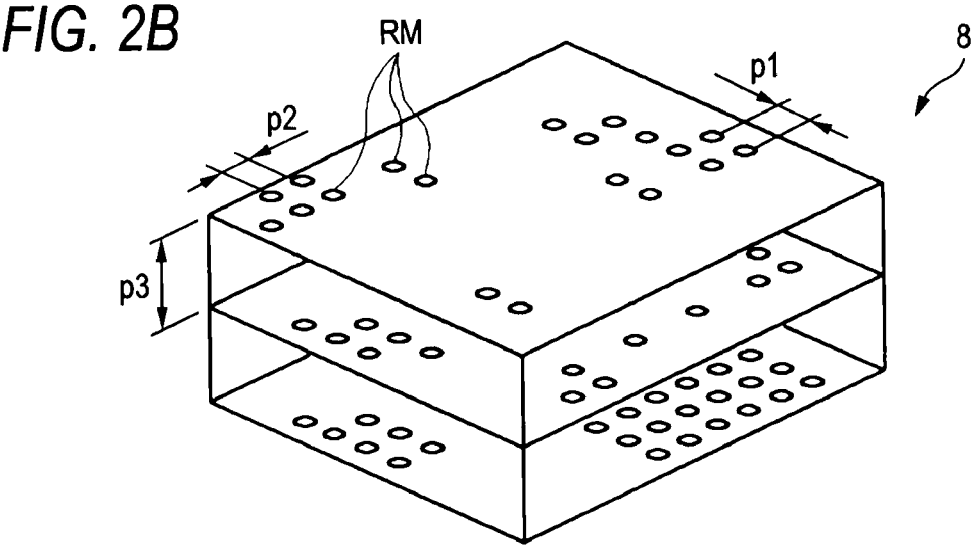
Figure 2C:
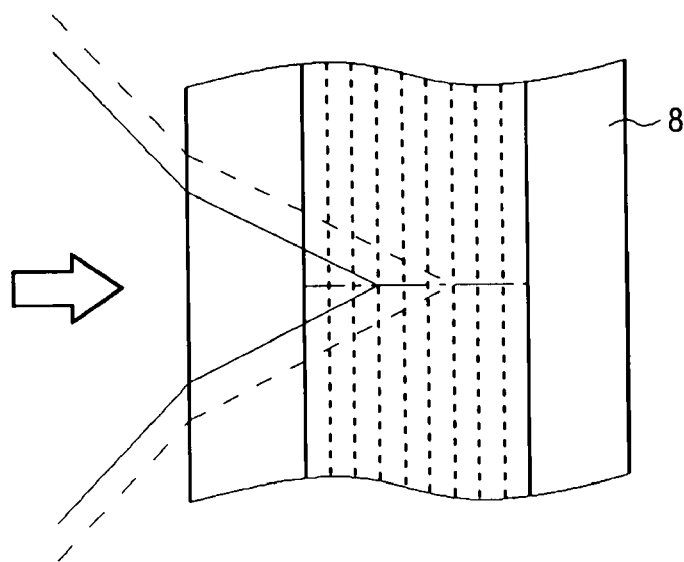

Furthermore, the optical disc 100 is designed such that the thickness t1 (=0.3 mm) of the recording layer 101 is sufficiently larger than the height RMh of the recording mark RM. Accordingly, the optical disc 100 can perform recording of multiple layers, which are obtained by overlapping a plurality of mark recording layers in the thickness direction of the optical disc 100 as shown in FIG. 2B, by causing the recording mark RM to be recorded while changing a distance (hereinafter, referred to as a depth) from the transflective film 104 in the recording layer 101.

In this case, the depth of the recording mark RM can be changed by adjusting the depth of the focus Fb1 of the blue light beam Lb1 in the recording layer 101 of the optical disc 100. For example, the optical disc 100 can form about twenty mark recording layers in the recording layer 101 if the distance p3 between the mark recording layers is set to about 15 μm in consideration of interference between the recording marks RM. Moreover, the distance p3 may also be set to other values in consideration of the interference between the recording marks RM in addition to be set to about 15 μm.

Furthermore, as shown in FIG. 5, the optical disc 100 is configured such that when information is recorded, the blue light beam Lb2, which shares the optical axis Lx with the red light beam Lr1 and the blue light beam Lb1 and is condensed by the objective lens OL, is transmitted through the substrate 102 and the transflective film 104 and is focused on the position corresponding to a back side (that is, substrate 103 side) of the target track in the recording layer 101. At this time, a focus Fb2 of the blue light beam Lb2 is positioned at a place farther than the focus Fr and the focus Fb1 of the blue light beam Lb1 on the common optical axis Lx when the objective lens OL is set as a reference.

As a result, in the optical disc 100, a relatively small recording mark RM (hereinafter, referred to as a second recording mark RM2) is recorded at the position of the focus Fb2, that is, a position (hereinafter, referred to as second target mark position PS2) corresponding to a target depth (hereinafter, also referred to as a second target depth) at a bottom side of the target track in the recording layer 101. At this time, a hologram of a portion where the intensity of the blue light beam Lb2, which is convergent light, reaches a predetermined value or more is broken in the recording layer 101, such that the second recording mark RM2 is formed, in the same manner as the case of the blue light beam Lb1.

Thus, the optical disc 100 is configured such that when information is recorded, the first recording mark RM1 and the second recording mark RM2 are simultaneously recorded at the positions of the focuses Fb1 and Fb2 in the recording layer 101, that is, the first target mark position PS1 and the second target mark position PS2, which are positioned at the bottom side of the target track in the transflective film 104 and correspond to the first target depth and the second target depth, by using the red light beam Lr1 for position control, the blue light beams Lb1 and Lb2 for recording of information.

Furthermore, in the optical disc 100, the position of the objective lens OL is controlled such that the red light beams Lr1 condensed by the objective lens OL are focused on the target track of the transflective film 104 when information is reproduced, in the same manner as the case of recording information.

In this case, the optical disc 100 is configured such that the focus Fb1 of the blue light beam Lb1 having passed through the substrate 102 and the transflective film 104 through the same objective lens OL is positioned at the first target mark position PS1 in the recording layer 101.

Here, in the case when the first recording mark RM1 is not recorded at the first target mark position PS1, a property as a hologram is shown at the first target mark position PS1 since the hologram is not broken but remains at the first target mark position PS1. Forth is reason, the blue reproduction light beam Lb3 is generated from the first target mark position PS1 of the recording layer 101.

The blue reproduction light beam Lb3 has the same optical property as the blue light beam Lb2 irradiated at the time of formatting and propagates while diverging in the same direction as the blue light beam Lb2, that is, from the recording layer 101 toward a side of the substrate 102.

On the other hand, in the case when the first recording mark RM1 is recorded at the first target mark position PS1, the property as a hologram is not shown at the first recording mark RM1. For this reason, the blue reproduction light beam Lb3 is not generated from the first target mark position PS1.

Furthermore, the optical disc 100 is configured such that when information is reproduced, the focus Fb2 of the blue light beam Lb2 is adjusted by an optical element (not shown) in the same manner as when recording is performed and the blue light beams Lb2 are focused on the recording mark RM2 of the second target mark position PS2, as shown in FIG. 5.

Here, in the case when the second recording mark RM2 is not recorded at the second target mark position PS2, the property as a hologram is shown at the second target mark position PS2 since the hologram is not broken but remains at the second target mark position PS2. Forth is reason, the blue reproduction light beam Lb4 is generated from the second target mark position PS2 of the recording layer 101. The blue reproduction light beam Lb4 propagates while diverging from the inside of the recording layer 101 toward a side of the substrate 102, in the same manner as the blue reproduction light beam Lb3.

On the other hand, in the case when the second recording mark RM2 is recorded at the second target mark position PS2, the second recording mark RM2 does not show a property as a hologram. For this reason, the blue reproduction light beam Lb4 is not generated from the second target mark position PS2.

Thus, the optical disc 100 is configured such that when recorded information is reproduced, the blue reproduction light beam Lb3 and the blue reproduction light beam Lb4 are respectively generated according to the existence of the first recording mark RM1 and the second recording mark RM2 at the first target mark position PS1 and the second target mark position PS2 by causing the focuses Fb1 and Fb2 of the two blue light beams Lb1 and Lb2 within the recording layer 101 to be formed at the different first and second target mark positions PS1 and PS2.

(2-2) Configuration of an Optical Disc Apparatus

Figure 6:
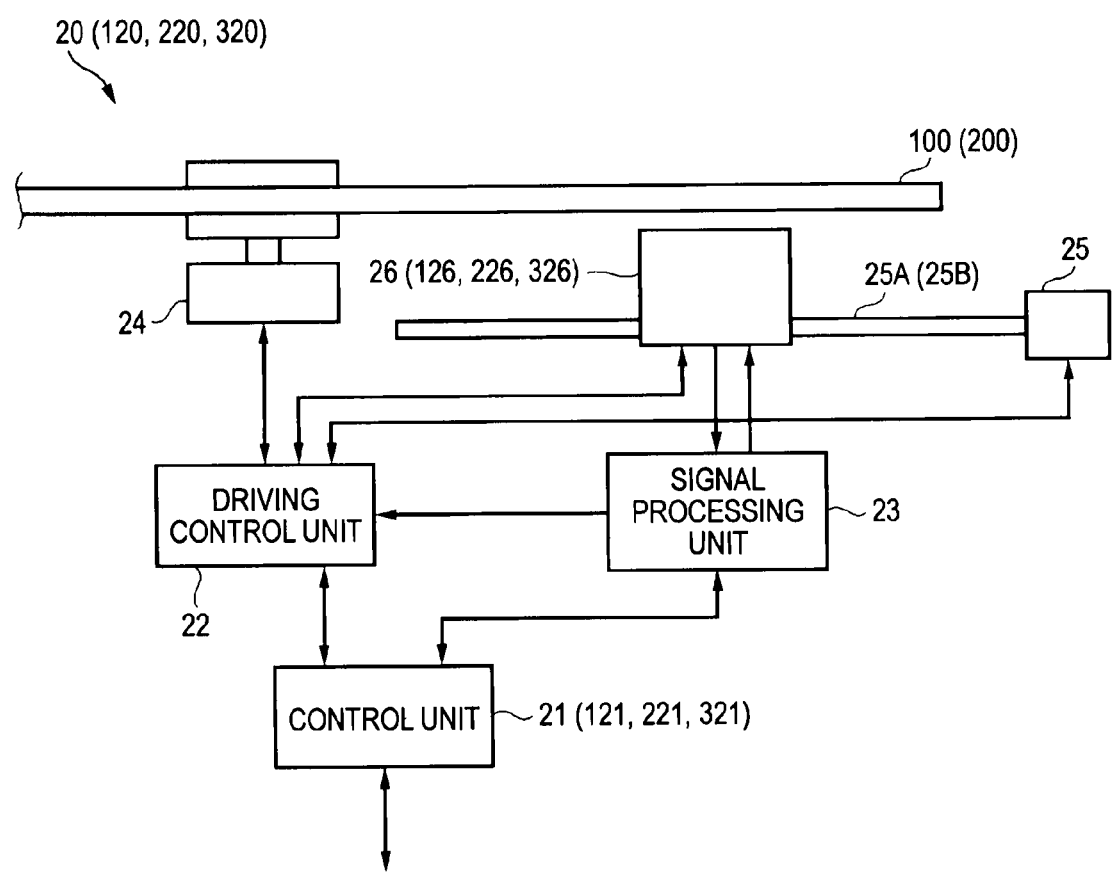
FIG. 6 is a view schematically illustrating the configuration of an optical disc apparatus according to an embodiment of the present invention.

Next, an optical disc apparatus 20 corresponding to the above optical disc 100 will be described. The optical disc apparatus 20 is configured to make an overall control with a control unit 21, as shown in FIG. 6.

The control unit 21 is configured to include a CPU (central processing unit; not shown) as a main portion. In addition, the control unit 21 is configured to execute various kinds of processing, such as information recording processing or information reproduction processing by reading various programs, such as a basic program and an information recording program, from a ROM (read only memory; not shown) and loading the read program to a RAM (random access memory; not shown).

For example, when the control unit 21 receives an information recording command, record information, and record address information from an external device (not shown) in a state where the optical disc 100 is loaded, the control unit 21 supplies a driving command and record address information to a driving control unit 22 and supplies record information to a signal processing unit 23. In addition, the record address information is information indicating an address, in which record information is to be recorded, among addresses given to the recording layer 101 or the transflective film 104 of the optical disc 100.

In response to the driving command, the driving control unit 22 rotates the optical disc 100 with a predetermined rotation speed by controlling driving of a spindle motor 24 and moves an optical pickup 26 to the position, which corresponds to the record address information in the diameter direction (that is, inner peripheral direction or outer peripheral direction) of the optical disc 100, along moving shafts 25A and 25B by controlling driving of a thread motor 25.

The signal processing unit 23 generates a recording signal by performing various kinds signal processing, such as predetermined coding processing or modulation processing, on the supplied record information and then supplies record information to the optical pickup 26.

The optical pickup 26 matches the irradiation position of light beams on a track (hereinafter, referred to as a target track), which is shown by record address information in the recording layer 101 or the transflective film 104 of the optical disc 100, by performing focus control and tracking control on the basis of a control of the driving control unit 22, such that the recording mark RM corresponding to a recording signal from the signal processing unit 23 is recorded (which will be described in detail later).

In addition, for example, when the control unit 21 receives an information reproduction command and reproduction address information indicating an address of corresponding record information from an external device (not shown), the control unit 21 supplies a driving command to the driving control unit 22 and supplies a reproduction processing command to the signal processing unit 23.

The driving control unit 22 rotates the optical disc 100 with a predetermined rotation speed by controlling driving of the spindle motor 24 and moves the optical pickup 26 to the position corresponding to the reproduction address information by controlling driving of the thread motor 25, in the same manner as the case of recording information.

The optical pickup 26 matches the irradiation position of light beams on a track (that is, a target track), which is shown by reproduction address information in the recording layer 101 or the transflective film 104 of the optical disc 100, by performing focus control and tracking control on the basis of a control of the driving control unit 22 and irradiates a predetermined amount of light beams. At this time, the optical pickup 26 is configured to detect a reproduction light beam generated from the recording mark RM of the recording layer 101 in the optical disc 100 and to supply a detection signal corresponding to the amount of light to the signal processing unit 23 (which will be described in detail later).

The signal processing unit 23 generates reproduction information by performing various kinds of signal processing, such as predetermined demodulation processing and decoding processing, on the supplied detection signal and then supplies the reproduction information to the control unit 21. Then, the control unit 21 transmits the reproduction information to an external device (not shown).

Thus, the optical disc apparatus 20 is configured to record information on a target track in the recording layer 101 of the optical disc 100 or to reproduce information from the target track by causing the control unit 21 to control the optical pickup 26.

(2-3) Configuration of an Optical Pickup

Next, the configuration of the optical pickup 26 will be described. As schematically shown in FIG. 7, the optical pickup 26 is provided with many optical components and is configured to include largely a position control optical system 30 and an information optical system 50.

(2-3-1) Configuration of a Position Control Optical System

The position control optical system 30 is configured to irradiate the red light beam Lr1 onto a surface 100A of the optical disc 100 and to receive the red reflected light beam Lr2, which is obtained when the red light beam Lr1 is reflected from the optical disc 100.

Figure 7:
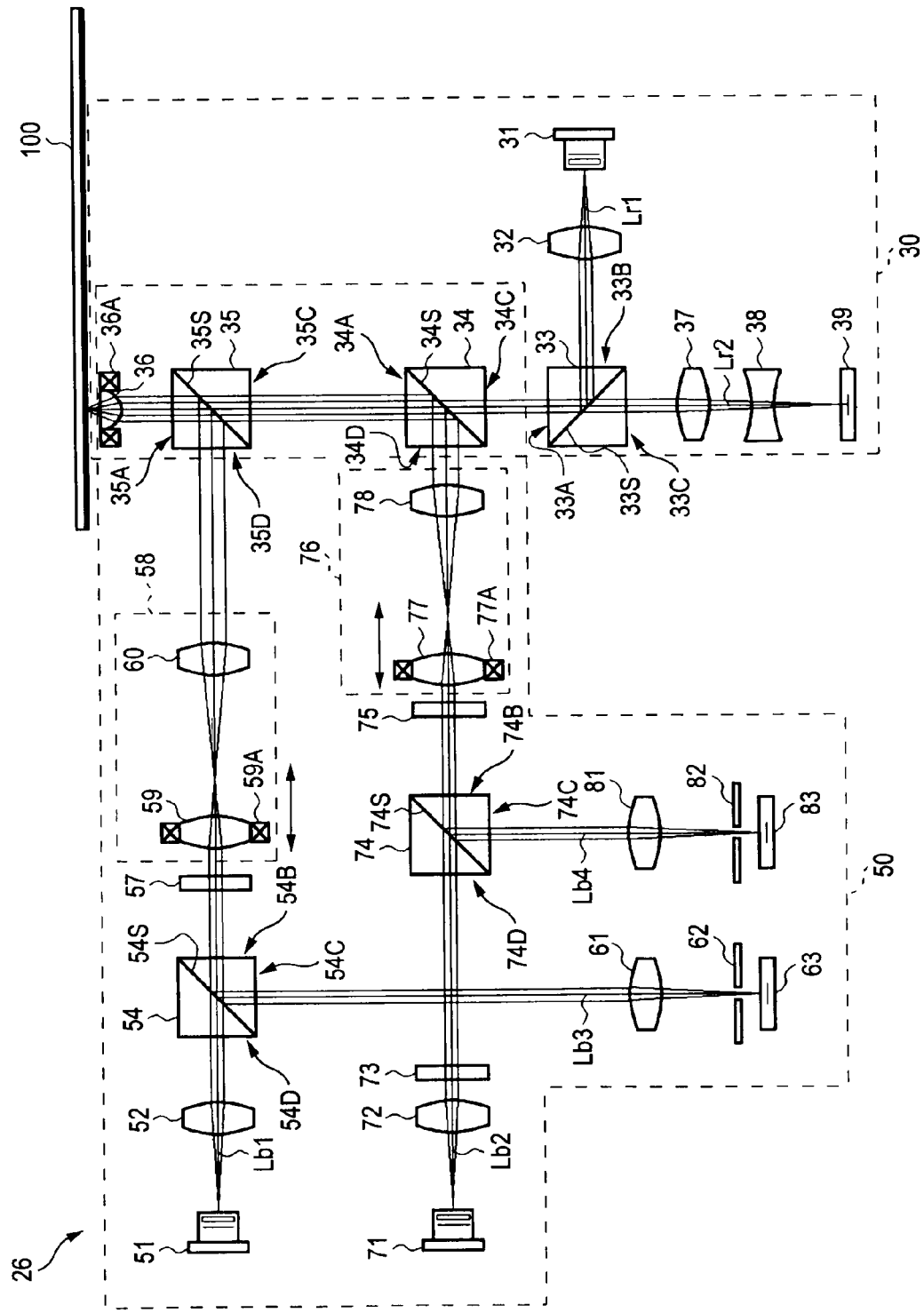
FIG. 7 is a view schematically illustrating the configuration of an optical pickup in the first embodiment.

Referring to FIG. 7, a laser diode 31 of the position control optical system 30 is configured to be able to emit a red laser beam having a wavelength of about 660 nm. In actuality, the laser diode 31 emits a predetermined amount of the red light beam Lr1, which is divergent light, on the basis of a control of the control unit 21 (see FIG. 6) and makes the emitted red light beam Lr1 incident on a collimator lens 32. In addition, the red light beam Lr1 is s-polarized light, for example.

The collimator lens 32 converts the red light beam Lr1 from divergent light to parallel light and makes the converted red light beam Lr1 incident on a surface 33B of a non-polarization beam splitter 33. The non-polarization beam splitter 33 reflects the red light beam Lr1 from a transflective surface 33S in a rate of about 50%, such that the red light beam Lr1 is emitted from a surface 33A and is then incident on a dichroic prism 34.

A transflective surface 34S of the dichroic prism 34 has a transmittance and a reflectance changing according to the wavelength of a light beam, that is, has a wavelength selectivity. The transflective surface 34S transmits a red light beam having a wavelength of about 660 nm therethrough in a rate of about 100% and reflects a blue light beam having a wavelength of 405 nm therefrom in a rate of about 100%. Accordingly, the dichroic prism 34 causes the red light beam Lr1 to be transmitted through the transflective surface 34S such that the red light beam Lr1 is incident on a surface 35C of the polarization beam splitter 35.

The polarization beam splitter 35 is configured such that light beams are reflected from a transflective surface 35S or transmitted through the transflective surface 35S according to the polarizing direction of a light beam, for example, such that a p-polarized light component is reflected from a transflective surface 35S and a s-polarized light component is transmitted through the transflective surface 35S. In practice, the polarization beam splitter 35 causes the red light beam Lr1, which is s-polarized light, to be transmitted through the transflective surface 35S, to be emitted from a surface 35A, and to be then incident on an objective lens 36.

The objective lens 36 condenses the red light beam Lr1 and irradiates the red light beam Lr1 toward the surface 100A of the optical disc 100. At this time, the red light beam Lr1 is transmitted through the substrate 102 and is then reflected from the transflective film 104, thereby becoming the red reflected light beam Lr2 propagating in the direction opposite to the red light beam Lr1, as shown in FIG. 5A.

Then, the red reflected light beam Lr2 is converted into a parallel beam by the objective lens 36, is sequentially transmitted through the polarization beam splitter 35 and the dichroic prism 34, and is then incident on the surface 33A of the non-polarization beam splitter 33.

The non-polarization beam splitter 33 causes the red reflected light beam Lr2 to be emitted from the surface 33C and to be incident on a condensing lens 37 by transmitting the red reflected light beam Lr2 therethrough in a rate of about 50%. The condensing lens 37 makes the red reflected light beam Lr2 converging, astigmatism is given by a cylindrical lens 38, and then the red reflected light beam Lr2 is irradiated onto a photodetector 39.

However, in the optical disc apparatus 20, the relative position of a target track with respect to the position control optical system 30 may be changed since there is a possibility that so-called surface deviation or the like will occur in the rotating optical disc 100.

Accordingly, in order to make the focus Fr (see FIG. 5) of the red light beam Lr1 follow a target track in the position control optical system 30, it is necessary to move the focus Fr in the focus direction, which is a direction approaching the optical disc 100 or a direction becoming distant from the optical disc 100, and the tracking direction, which is a direction toward an inner peripheral side or an outer peripheral side of the optical disc 100.

Therefore, the objective lens 36 is configured to be able to be driven in two axial directions of the focus direction and the tracking direction by a biaxial actuator 36A.

Furthermore, in the position control optical system 30 (see FIG. 8), the optical position and the like of various optical components are adjusted such that a focusing state when the red light beam Lr1 is condensed by the objective lens 36 and is then irradiated onto the transflective film 104 of the optical disc 100 is reflected on a focusing state when the red reflected light beam Lr2 is condensed by the condensing lens 37 and is then irradiated onto the photodetector 39.

As shown in FIG. 8, the photodetector 39 has four detection regions 39A, 39B, 39C, and 39D divided in the shape of a matrix on a surface onto which the red reflected light beam Lr2 is irradiated. In addition, a direction (longitudinal direction in the drawing) indicated by an arrow a1 corresponds to a traveling direction of a track when the red light beam Lr1 is irradiated onto the transflective film 104 (see FIG. 5).

The photodetector 39 detects a part of the red reflected light beam Lr2 from the detection regions 39A, 39B, 39C, and 39D, generates detection signals SDAr, SDBr, and SDCr, and SDDr in accordance with the amount of detected light, and transmits the detection signals SDAr, SDBr, and SDCr, and SDDr to the signal processing unit 23 (see FIG. 6).

The signal processing unit 23 is configured to perform a focus control by using a so-called astigmatic method and calculates a focus error signal SFEr on the basis of the following expression 1 and supplies the focus error signal SFEr to the driving control unit 22.

$$SFEr=(SDAr+SDCr)-(SDBr+SDDr) \quad (1)$$

The focus error signal SFEr indicates the size of an amount of deviation (that is, distance) between the focus Fr of the red light beam Lr1 and the transflective film 104 of the optical disc 100.

In addition, the signal processing unit 23 is configured to perform a tracking control by using a so-called push-pull method and calculates a tracking error signal STEr on the basis of the following expression 2 and supplies the tracking error signal STEr to the driving control unit 22.

$$STEr=(SDAr+SDDr)-(SDBr+SDCr) \quad (2)$$

The tracking error signal STEr indicates the size of an amount of deviation (that is, distance) between the focus Fr of the red light beam Lr1 and a target track in the transflective film 104 of the optical disc 100.

The driving control unit 22 performs a feedback control (that is, focus control) of the objective lens 36 such that the red light beam Lr1 is focused on the transflective film 104 of the optical disc 100 by generating a focus driving signal SFDr on the basis of the focus error signal SFEr and supplying the focus driving signal SFDr to the biaxial actuator 36A.

In addition, the driving control unit 22 performs a feedback control (that is, tracking control) of the objective lens 36 such that the red light beam Lr1 is focused on a target track in the transflective film 104 of the optical disc 100 by generating a tracking driving signal STDr on the basis of the tracking error signal STEr and supplying the tracking driving signal STDr to the biaxial actuator 36A.

Thus, the position control optical system 30 is configured to irradiate the red light beam Lr1 onto the transflective film 104 of the optical disc 100 and to supply a result of reception of the red reflected light beam Lr2, which is reflected light of the red light beam Lr1, to the signal processing unit 23. Then, the driving control unit 22 is configured to perform focus control and tracking control of the objective lens 36 such that the red light beam Lr1 is focused on a target track of the transflective film 104.

(2-3-2) Configuration of an Information Optical System

The information optical system 50 (see FIG. 7) is configured to irradiate the blue light beams Lb1 and Lb2 onto the surface 100A of the optical disc 100 and to receive the blue reproduction light beams Lb3 and Lb4 that are generated in the optical disc 100.

(2-3-2-1) Optical Path (1) of a Blue Light Beam

A laser diode 51 of the information optical system 50 is configured to be able to emit a blue laser beam having a wavelength of about 405 nm. In practice, the laser diode 51 emits the blue light beam Lb1, which is divergent light, on the basis of a control of the control unit 21 (see FIG. 6) and makes the emitted blue light beam Lb1 incident on a collimator lens 52. In addition, the blue light beam Lb1 is p-polarized light, for example.

The collimator lens 52 converts the blue light beam Lb1 from divergent light to parallel light and makes the converted blue light beam Lb1 incident on a surface 54D of a non-polarization beam splitter 54. The non-polarization beam splitter 54 causes the blue light beam Lb1 to be transmitted through a transflective surface 54S in a predetermined rate (for example, about 50%), to be emitted from a surface 54B, and to be then incident on a liquid crystal panel 57.

A liquid crystal panel 57 corrects a spherical aberration of the blue light beam Lb1 or a comatic aberration resulting from the inclination of the optical disc 100 and makes the corrected blue light beam Lb1 to be incident on a relay lens 58.

The relay lens 58 converts the blue light beam Lb1 from parallel light to convergent light using a movable lens 59, converts the blue light beam Lb1, which has become divergent light after convergence, into convergent light again using a fixed lens 60, and makes the blue light beam Lb1 incident on a surface 35D of the polarization beam splitter 35.

The movable lens 59 moves in the direction of an optical axis of the blue light beam Lb1 by means of the actuator 59A. In practice, the relay lens 58 can change a convergence state of the blue light beam Lb1 emitted from a fixed lens 60 by moving the movable lens 59 with the actuator 59A on the basis of a control of the control unit 21 (see FIG. 6).

In practice, the polarization beam splitter 35 causes the blue light beam Lb2, which is s-polarized light, to be transmitted through the transflective surface 35S and to be then incident on the objective lens 36. The objective lens 36 condenses the blue light beam Lb1 and irradiates the blue light beam Lb1 toward the surface 100A of the optical disc 100. In addition, for the blue light beam Lb1, the objective lens 36 acts as a condensing lens having a numerical aperture (NA) of 0.5 from the relationship, such as an optical distance, between the objective lens 36 and the relay lens 58.

At this time, as shown in FIG. 5, the blue light beams Lb1 are transmitted through the substrate 102 and the transflective film 104 and are then focused within the recording layer 101. Here, the position of the focus Fb1 of the blue light beam Lb1 is determined by a convergence state when the blue light beam Lb1 is emitted from the fixed lens 60 of the relay lens 58. That is, the focus Fb1 moves to a side within the recording layer 101 toward the surface 100A or the opposite side according to the position of the movable lens 59.

Specifically, the information optical system 50 is designed such that a moving distance of the movable lens 59 and a moving distance of the focus Fb1 of the blue light beam Lb1 are approximately proportional to each other. For example, the information optical system 50 is designed such that the focus Fb1 of the blue light beam Lb1 moves by 30 μm if the movable lens 59 moves by 1 mm.

In practice, the information optical system 50 is configured to adjust a depth d1 (that is, a distance from the transflective film 104) of the focus Fb1 (see FIG. 5) of the blue light beam Lb1 within the recording layer 101 of the optical disc 100 by causing the control unit 21 (see FIG. 6) to control the position of the movable lens 59.

Thus, the information optical system 50 is configured to make an adjustment such that the focus Fb1 of the blue light beam Lb1, which is emitted from the surface 54A of the non-polarization beam splitter 54, is located at a desired focal depth d within the recording layer 101 of the optical disc 100 by controlling the position of the movable lens 59 in the relay lens 58. Moreover, in the following description, an optical path that the blue light beam Lb1 follows is called a blue optical path 1.

(2-3-2-2) Optical Path (2) of a Blue Light Beam

Similar to the laser diode 51, a laser diode 71 is configured to be able to emit a blue laser beam having a wavelength of about 405 nm. In practice, the laser diode 71 emits the blue light beam Lb2, which is divergent light, on the basis of a control of the control unit 21 (see FIG. 6) and makes the emitted blue light beam Lb2 incident on a collimator lens 72.

The collimator lens 72 converts the blue light beam Lb2 from divergent light to parallel light and makes the converted blue light beam Lb2 incident on a half wavelength plate 73. The polarization direction of the blue light beam Lb2 is rotated by a predetermined angle by the half wavelength plate 73, such that the blue light beam Lb2 is converted, for example, from p-polarized light to s-polarized light and is then incident on a surface 74D of a non-polarization beam splitter 74.

The non-polarization beam splitter 74 causes the blue light beam Lb2 to be transmitted through a transflective surface 74S in a predetermined rate (for example, about 50%), to be emitted from a surface 74B, and to be then incident on a liquid crystal panel 75. The liquid crystal panel 75 corrects a spherical aberration of the blue light beam Lb2 or a comatic aberration resulting from the inclination of the optical disc 100 and makes the corrected blue light beam Lb2 to be incident on a relay lens 76.

The relay lens 76 converts the blue light beam Lb2 from parallel light to convergent light using a movable lens 77, converts the blue light beam Lb2, which has become divergent light after convergence, into convergent light again using a fixed lens 78, and makes the blue light beam Lb2 incident on a surface 34D of the dichroic prism 34.

Here, the movable lens 77 moves in the direction of an optical axis of the blue light beam Lb1 by means of an actuator 77A. In practice, the relay lens 76 can change a convergence state of the blue light beam Lb2 emitted from a fixed lens 78 by moving the movable lens 77 with the actuator 77A on the basis of a control of the control unit 21 (see FIG. 6).

The dichroic prism 34 causes the blue light beam Lb2 to be reflected from the transflective surface 34S, to be emitted from a surface 34A, and to be then incident on the surface 35C of the polarization beam splitter 35. The polarization beam splitter 35 causes the blue light beam Lb2, which is s-polarized light, to be transmitted through the transflective surface 35S and to be then incident on the objective lens 36.

The objective lens 36 condenses the blue light beam Lb2 and irradiates the blue light beam Lb2 toward the surface 100A of the optical disc 100. In addition, for the blue light beam Lb2, the objective lens 36 acts as a condensing lens having a numerical aperture (NA) of 0.5 from the relationship, such as an optical distance, between the objective lens 36 and the relay lens 58 in the same manner as the case of the blue light beam Lb1.

At this time, as shown in FIG. 5, the blue light beams Lb2 are transmitted through the substrate 102 and the transflective film 104 and are then focused within the recording layer 101. Here, the position of the focus Fb2 of the blue light beam Lb2 is determined by a convergence state when the blue light beam Lb2 is emitted from the fixed lens 78 of the relay lens 76. That is, the focus Fb2 moves to a side within the recording layer 101 toward the surface 100A or the opposite side according to the position of the movable lens 77.

Specifically, the information optical system 50 is designed such that a moving distance of the movable lens 77 and a moving distance of the focus Fb2 of the blue light beam Lb2 are approximately proportional to each other, in the same manner as the case of the blue light beam Lb1. For example, the information optical system 50 is designed such that the focus Fb2 of the blue light beam Lb2 moves by 30 μm if the movable lens 77 moves by 1 mm.

In practice, the information optical system 50 is configured to adjust a depth d2 of the focus Fb2 (see FIG. 5) of the blue light beam Lb2 within the recording layer 101 of the optical disc 100 by causing the control unit 21 (see FIG. 6) to control the position of the movable lens 77.

In addition, the relay lenses 58 and 76 are configured such that not only the movable lenses 59 and 77 are independently adjusted by the control unit 21 but also the movable lenses 59 and 77 are adjusted in conjunction with each other by the control unit 21.

Thus, the information optical system 50 is configured to make an adjustment such that the focus Fb2 of the blue light beam Lb2, which is emitted from the laser diode 71, is located at a desired focal depth d2 within the recording layer 101 of the optical disc 100 by controlling the position of the movable lens 77 in the relay lens 76. Moreover, in the following description, an optical path that the blue light beam Lb2 follows is called a blue optical path 2.

(2-3-2-3) Optical Path (3) of a Blue Light Beam

As described above, the optical disc 100 (see FIG. 5) generates the blue reproduction light beam Lb3 since a property as a hologram is shown if the first recording mark RM1 is not recorded at the position (that is, first target mark position PS1) of the focus Fb1 in the recording layer 101 when the blue light beam Lb1 is irradiated. At this time, the blue reproduction light beam Lb3 becomes the same s-polarized light as the blue light beam Lb1, for example.

The blue reproduction light beam Lb3 is converted into parallel light by the objective lens 36 and is then incident on the surface 35A of the non-polarization beam splitter 35 so as to follow the blue optical path 1 of the blue light beam Lb1 shown in FIG. 7 in the opposite direction. The non-polarization beam splitter 35 causes the blue reproduction light beam Lb3, which is s-polarized light, to be reflected from the transflective surface 35S and to be then incident on the relay lens 58 from the surface 35D.

The relay lens 58 causes the blue reproduction light beam Lb3 to be incident on the surface 54A of the non-polarization beam splitter 54 sequentially through the fixed lens 60 and the movable lens 59. The non-polarization beam splitter 54 causes a part of the blue reproduction light beams Lb3, which are s-polarized light, to be reflected from the transflective surface 54S, and to be then emitted from the surface 54C so as to be incident on a condensing lens 61.

The condensing lens 61 makes the blue reproduction light beam Lb3 converging and irradiates the blue reproduction light beam Lb3 onto a photodetector 63 through a pinhole plate 62 in which a hole 62H having a predetermined diameter is provided. The photodetector 63 is configured to detect the light amount of the blue reproduction light beam Lb3, generate a detection signal SD1 according to the detected light amount, and supply the generated detection signal SD1 to the signal processing unit 23 (see FIG. 6) (which will be described in detail later). Moreover, in the following description, an optical path that the blue reproduction light beam Lb3 follows is called a blue optical path 3.

(2-3-2-4) Optical Path (4) of a Blue Light Beam

In addition, as described above, the optical disc 100 (see FIG. 5) generates the blue reproduction light beam Lb4 since a property as a hologram is shown if the second recording mark RM2 is not recorded at the position (that is, second target mark position PS2) of the focus Fb2 in the recording layer 101 in the same manner as the blue light beam Lb1 when the blue light beam Lb2 is irradiated. At this time, the blue reproduction light beam Lb4 becomes the same p-polarized light as the blue light beam Lb2, for example.

The blue reproduction light beam Lb4 is converted into parallel light by the objective lens 36 and is then incident on the surface 35A of the non-polarization beam splitter 35 so as to follow the blue optical path 2 of the blue light beam Lb2 shown in FIG. 7 in the opposite direction. The non-polarization beam splitter 35 causes the blue reproduction light beam Lb4, which is p-polarized light, to be transmitted through the transflective surface 35S, to be emitted from the surface 35C, and to be then incident on the surface 34A of the dichroic prism 34.

The dichroic prism 34 causes the blue reproduction light beam Lb4 to be reflected from the transflective surface 34S, to be emitted from the surface 34D, and to be then incident on the relay lens 76. The relay lens 76 causes the blue reproduction light beam Lb4 to be incident on the surface 74B of the non-polarization beam splitter 74 sequentially through the fixed lens 78, the movable lens 77, and the liquid crystal panel 75.

The non-polarization beam splitter 74 causes the blue reproduction light beam Lb4 to be reflected in a predetermined rate (for example, about 50%), to be emitted from a surface 74C, and to be then incident on a condensing lens 81. The condensing lens 81 makes the blue reproduction light beam Lb4 converging and irradiates the blue reproduction light beam Lb4 onto a photodetector 83 through a pinhole plate 82 in which a hole 82H having a predetermined diameter is provided.

The photodetector 83 is configured to detect the light amount of the blue reproduction light beam Lb4, generate a detection signal SD2 according to the detected light amount, and supply the generated detection signal SD2 to the signal processing unit 23 (see FIG. 6) (which will be described in detail later). Moreover, in the following description, an optical path that the blue reproduction light beam Lb4 follows is called a blue optical path 4.

(2-4) Recording and Reproduction of Information

Next, a case in which the optical disc apparatus 20 records information on the optical disc 100 and a case in which the optical disc apparatus 20 reproduces information from the optical disc 100 will be described.

(2-4-1) Recording of Information

In the case of recording information on the optical disc 100, the control unit 21 (see FIG. 6) of the optical disc apparatus 20 supplies a driving command and record address information to the driving control unit 22 and supplies record information to the signal processing unit 23 when the control unit 21 receives an information recording command, record information, and record address information from an external device (not shown) as described above.

At this time, the driving control unit 22 causes the focus Fr of the red light beam Lr1 to follow a target track corresponding to the record address information by irradiating the red light beam Lr1 from the surface 100A of the optical disc 100 by means of the position control optical system 30 of the optical pickup 26 and performing focus control and tracking control (that is, position control) of the objective lens 36 on the basis of a detection result of the red reflected light beam Lr2, which is reflected light of the red light beam Lr1.

In addition, the control unit 21 adjusts the depth d1 of the focus Fb1 (see FIG. 5) of the blue light beam Lb1 by adjusting the position of the movable lens 59 in the relay lens 58, such that the focus Fb1 is located at the first target mark position PS1.

Similarly, the control unit 21 adjusts the depth d2 of the focus Fb2 (see FIG. 5) of the blue light beam Lb2 by adjusting the position of the movable lens 77 in the relay lens 76, such that the focus Fb2 is located at the second target mark position PS2.

In addition, the information optical system 50 irradiates the blue light beams Lb1 and Lb2 from a side of the surface 100A of the optical disc 100. At this time, the focus Fb1 of the blue light beam Lb1 and the focus Fb2 of the blue light beam Lb2 are condensed by the position-controlled objective lens 36 so as to be located at the first target mark position PS1 and the second target mark position PS2 all of which are positioned at a bottom side of a target track, respectively.

As a result, the optical pickup 26 can form the first recording mark RM1 and the second recording mark RM2 at the first target mark position PS1 and the second target mark position PS2 in the recording layer 101 of the optical disc 100, respectively.

In addition, the signal processing unit 23 divides record information into first divided record information and second divided record information by predetermined data dividing processing, generates recording signals corresponding to binary data (that is, value "0" or "1") that form each divided record information, and supplies the recording signals to the laser diodes 51 and 71, respectively.

That is, the laser diode 51 does not emit the blue light beam Lb1 when the first divided record information is a value "0" but emits the blue light beam Lb1 when the first divided record information is a value "1". Similarly, the laser diode 71 does not emit the blue light beam Lb2 when the second divided record information is a value "0" but emits the blue light beam Lb2 when the second divided record information is a value "1".

Thus, the optical disc apparatus 20 can make a hologram exist at the first target mark position PS1 within the recording layer 101 of the optical disc 100 without performing any recording when the first divided record information is a value "0" and can record the first recording mark RM1 when the first divided record information is a value "1". At the same time, the optical disc apparatus 20 can make a hologram exist at the second target mark position PS2 without performing any recording when the second divided record information is a value "0" and can record the second recording mark RM2 when the second divided record information is a value "1".

In addition, the control unit 21 is configured to divide information into two recording mark layers and record the divided information in, for example, a TOC (table of contents) of the optical disc 100 (hereinafter, referred to as division recording) and record information on correspondence of mark recording layers as management information.

Thus, the optical disc apparatus 20 is configured to be able to simultaneously record the first recording mark RM1 and the second recording mark RM2 that are independent from each other, as two kinds of divided record information obtained by dividing record information, at two positions corresponding to a target track within the recording layer 101 of the optical disc 100, that is, at the first target mark position PS1 and the second target mark position PS2.

(2-4-2) Reproduction of Information

In the case of reproducing information from the optical disc 100, the control unit 21 (see FIG. 6) of the optical disc apparatus 20 causes the position control optical system 30 of the optical pickup 26 to irradiate the red light beam Lr1 from a side of the surface 100A of the optical disc 100 and the driving control unit 22 to perform focus control and tracking control (that is, position control) of the objective lens 36 on the basis of a detection result of the red reflected light beam Lr2 which is reflected light of the red light beam Lr1.

In addition, the control unit 21 causes the information optical system 50 (see FIG. 7) to irradiate the blue light beam Lb1 onto the optical disc 100. At this time, since the focus Fb1 of the blue light beam Lb1 is condensed by the position-controlled objective lens 36, the focus Fb1 of the blue light beam Lb1 is positioned at a bottom side of a target track.

In addition, the control unit 21 adjusts the depth d1 of the focus Fb1 by adjusting the position of the movable lens 59 in the relay lens 58, as shown in FIG. 5. As a result, the focus Fb1 of the blue light beam Lb1 is made to match the first target mark position PS1.

In this case, when the first recording mark RM1 is not recorded at the first target mark position PS1, the first target mark position PS1 of the recording layer 101 acts as a hologram, and accordingly, the blue reproduction light beam Lb3 as so-called reproduction light is generated toward a side of the surface 100A.

On the other hand, when the first recording mark RM1 is recorded at the first target mark position PS1, the first target mark position PS1 of the recording layer 101 does not act as a hologram due to existence of the first recording mark RM1, and accordingly, the blue reproduction light beam Lb3 is not generated from the first target mark position PS1.

In addition, the control unit 21 can prevent erroneous removal of the first recording mark RM1 and precisely detect whether or not the first recording mark RM1 exists by setting the light amount of the blue light beam Lb1 to a predetermined light amount, which is lower than that at the time of recording, by controlling the laser diode 51 through the signal processing unit 23.

In addition, the control unit 21 causes the information optical system 50 to irradiate not only the blue light beam Lb1 but also the blue light beam Lb2 onto the optical disc 100. At this time, similar to the focus Fb1 of the blue light beam Lb1, the focus Fb2 of the blue light beam Lb2 is condensed by the position-controlled objective lens 36, and accordingly, the focus Fb2 of the blue light beam Lb2 is positioned at a bottom side of a target track.

In addition, the control unit 21 adjusts the depth d2 of the focus Fb2 to a second target depth different from the depth d1 of the focus Fb1 by independently adjusting the position of the movable lens 77 in the relay lens 76 and the position of the movable lens 59 in the relay lens 58, as shown in FIG. 5. As a result, the focus Fb2 of the blue light beam Lb2 is made to match the second target mark position PS2.

Then, similar to the case of the first target mark position PS1, from the second target mark position PS2, the blue reproduction light beam Lb4 is generated toward a side of the surface 100A if the second recording mark RM2 is not recorded and the blue reproduction light beam Lb4 is not generated if the second recording mark RM2 is recorded.

In addition, the control unit 21 can prevent erroneous removal of the second recording mark RM2 and precisely detect whether or not the second recording mark RM2 exists by setting the light amount of the blue light beam Lb2 to a predetermined light amount, which is lower than that at the time of recording, by controlling the laser diode 71 through the signal processing unit 23 in the same manner as the laser diode 51.

That is, the information optical system 50 can simultaneously generate the blue reproduction light beams Lb3 and Lb4 from the first target mark position PS1 and the second target mark position PS2 within the recording layer 101 of the optical disc 100 according to the existence of the first recording mark RM1 and the second recording mark RM2 by simultaneously irradiating the blue light beams Lb1 and Lb2 such that the focuses Fb1 and Fb2 are formed at the different first and second target mark positions PS1 and PS2.

At this time, the objective lens 36 of the information optical system 50 converts the blue reproduction light beams Lb3 and Lb4 into parallel light in a state where the blue reproduction light beams Lb3 and Lb4 are mixed and then makes the converted parallel light incident on the surface 35A of the non-polarization beam splitter 35. The transflective film 35S of the non-polarization beam splitter 35 reflects a part of the blue reproduction light beams Lb3 and Lb4 in a state where the blue reproduction light beams Lb3 and Lb4 are mixed, such that the part of the blue reproduction light beams Lb3 and Lb4 is emitted from the surface 35D to be then incident on the condensing lens 61 through the blue optical path 3.

Figure 9A:
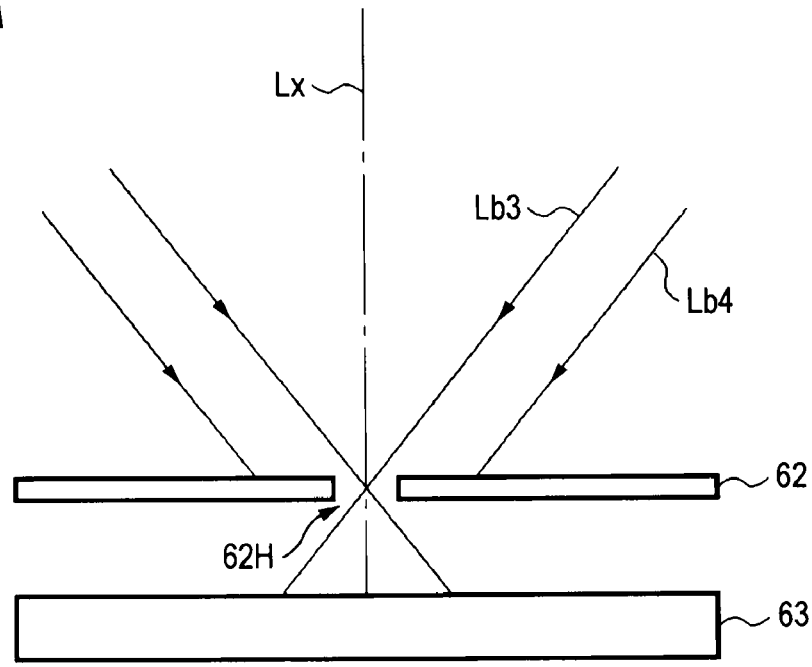
FIGS. 9A and 9B are view schematically illustrating selection of light beams performed by a pinhole.

The condensing lens 61 condenses the blue reproduction light beams Lb3 and Lb4. Here, as shown in FIG. 9A, since a slit 62 is disposed such that a focus of the blue reproduction light beam Lb3 is located within the hole 62H, the slit 62 allows the blue reproduction light beam Lb3 to be transmitted therethrough so as to be irradiated onto the photodetector 63.

On the other hand, the slit 62 does not allow most of the blue reproduction light beams Lb4, whose focuses are not formed in the hole 62H, to be transmitted therethrough, and accordingly, the blue reproduction light beam Lb4 is not actually irradiated onto the photodetector 63.

As a result, the photodetector 63 can detect the light amount of the blue reproduction light beam Lb3, generate the detection signal SD1 according to the detected light amount, and supply the generated detection signal SD1 to the signal processing unit 23 (see FIG. 6).

In addition, the transflective film 35S (see FIG. 13) of the non-polarization beam splitter 35 causes a part of the blue reproduction light beams Lb3 and Lb4 to be transmitted therethrough while the blue reproduction light beams Lb3 and Lb4 are mixed, to be emitted from the surface 35C, and to be then incident on the condensing lens 81 through the blue optical path 4.

Figure 9B:
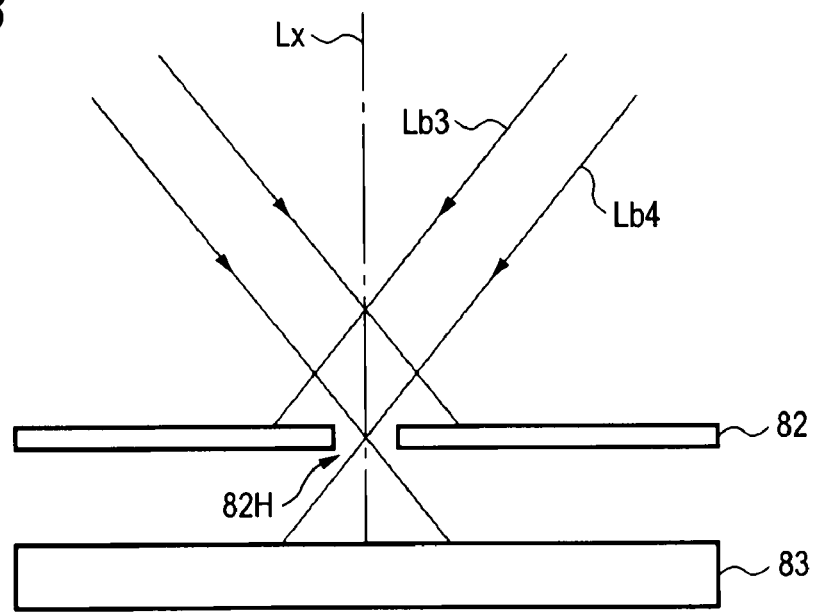

The condensing lens 81 condenses the blue reproduction light beams Lb3 and Lb4. Here, as shown in FIG. 9B, since a slit 82 is disposed such that a focus of the blue reproduction light beam Lb4 is located within the hole 82H, the slit 82 allows the blue reproduction light beam Lb4 to be transmitted therethrough so as to be irradiated onto the photodetector 83.

On the other hand, the slit 82 does not allow most of the blue reproduction light beams Lb3, whose focuses are not formed in the hole 82H, to be transmitted therethrough. Accordingly, unlike the slit 62, the blue reproduction light beam Lb3 is not actually irradiated onto the photodetector 83.

As a result, the photodetector 83 can detect the light amount of the blue reproduction light beam Lb4, generate the detection signal SD2 according to the detected light amount, and supply the generated detection signal SD2 to the signal processing unit 23 (see FIG. 6).

Furthermore, in the optical disc apparatus 20, the blue reproduction light beam Lb3 or Lb4 is not generated from the first target mark position PS1 or the second target mark position PS2 when the first recording mark RM1 or the second recording mark RM2 is recorded at the first target mark position PS1 or the second target mark position PS2. Accordingly, the detection signal SD1 or SD2 indicating that the blue reproduction light beam Lb3 or Lb4 has not been received is generated by the information optical system 50.

Then, the signal processing unit 22 recognizes whether or not the blue reproduction light beam Lb3 or Lb4 has been detected as a value "0" or "1" on the basis of the detection signals SD1 and SD2 and generates reproduction information on the basis of the recognition result.

Accordingly, the optical disc apparatus 20 can independently recognize which one of the values "1" and "0" is recorded as information according to whether or not the first recording mark RM1 or the second recording mark RM2 is recorded at the first target mark position PS1 and the second target mark position PS2 within the recording layer 101 of the optical disc 100.

Thus, the optical pickup 26 is configured to be able to generate the blue reproduction light beams Lb3 and Lb4, detect the light amount of each of the blue reproduction light beams Lb3 and Lb4 through each of the blue optical paths 3 and 4 by using each of the photodetectors 63 and 83, and generate the detection signals SD1 and SD2 by focusing the blue light beams Lb1 and Lb2 as so-called reference light on the first target mark position PS1 and the second target mark position PS2 within the recording layer 101 of the optical disc 100 in the case when the first recording mark RM1 or the second recording mark RM2 is not recorded.

Thereafter, the signal processing unit 23 generates reproduction information by performing various kinds of signal processing, such as the above-described demodulation processing or decoding processing, on the detection signals SD1 and SD2 and then supplies the reproduction information to the control unit 21.

The control unit 21 recognizes information on whether or not division recording is performed and on correspondence of mark recording layers by first referring to the management information recorded in the TOC of the optical disc 100 and the like.

When division recording is performed on the optical disc 100, the control unit 21 unifies two kinds of reproduction information into one reproduction information by predetermined information unifying processing and then transmits the reproduction information to an external device (not shown). As a result, in the optical disc apparatus 20, it is possible to obtain a seemingly double speed only by performing reproduction with a normal reproduction speed using the blue reproduction light beams Lb3 and Lb4.

In addition, the optical disc apparatus 20 may be configured to reproduce information on the basis of only one kind of reproduction information, which can be obtained by the blue light beam Lb1 and the blue reproduction light beam Lb3, by blocking the blue light beam Lb2 and the blue reproduction light beam Lb4 by controlling the liquid crystal panel 75, for example.

(2-5) Operations and Effects

In the configuration described above, the control unit 21 (see FIG. 6) of the optical disc apparatus 20 according to the first embodiment performs focus control and tracking control of the objective lens 36 such that the focus Fr of the red light beam Lr1 is formed on a target track in the transflective film 104 (see FIG. 5) of the optical disc 100 by means of the position control optical system 30 of the optical pickup 26 in both cases when information is recorded on the optical disc 100 and when information is reproduced from the optical disc 100.

In addition, in the case of recording information on the optical disc 100, the control unit 21 independently forms the first recording mark RM1 and the second recording mark RM2 within the recording layer 101 of the optical disc 100 by controlling the positions of the movable lenses 59 and 77 of the relay lenses 58 and 76 such that the focuses Fb1 and Fb2 of the blue light beams Lb1 and Lb2 are respectively formed at the different first and second target mark positions PS1 and PS2 (see FIG. 5) by using the blue light beams Lb1 and Lb2.

On the other hand, in the case of reproducing information from the optical disc 100, the control unit 21 independently controls the positions of the movable lenses 59 and 77 of the relay lenses 58 and 76 such that the focuses Fb1 and Fb2 of the two blue light beams Lb1 and Lb2 are respectively formed at the different first and second target mark positions PS1 and PS2 (see FIG. 5) and generates the blue reproduction light beams Lb3 and Lb4 and detects the generated blue reproduction light beams Lb3 and Lb4 with the photodetectors 63 and 83 if the first recording mark RM1 and the second recording mark RM2 are not recorded.

Therefore, the control unit 21 of the optical disc apparatus 20 can simultaneously record two recording marks, which are independent from each other, at two target mark positions, which correspond to a target track of the optical disc 100 and have different depths, and obtain two kinds of reproduction signals independent from each other from the two target mark positions in both cases of recording and reproduction of information.

At this time, the control unit 21 divides record information into first divided record information and second divided record information and records the divided first and second record information at the first target mark position PS1 and the second target mark position PS2, respectively, at the time of recording of information and unifies the detection signals SD1 and SD2, which are respectively obtained from the first target mark position PS1 and the second target mark position PS2, and generates one reproduction signal corresponding to a double reproduction speed at the time of reproduction of information, thereby being able to obtaining seemingly a double recording speed and a double reproduction speed.

As a result, the optical disc apparatus 20 can double seeming recording speed and reproduction speed by using two kinds of blue light beam Lb1 and blue light beam Lb2 together even if an upper limit in information recording speed and reproduction speed is inevitably set, for example, due to a cause that a predetermined time is required for forming the recording mark RM in the recording layer 101 or there is an upper limit in rotation speed of the optical disc 100 due to the physical strength of the optical disc 100 or surface deviation at the time of high-speed rotation.

At this time, the control unit 21 of the optical disc apparatus 20 can correctly unify two kinds of reproduction signals by recording management information, which indicates correspondence relationship of mark recording layers in which divided record information is recorded, in the TOC of the optical disc 100 and the like and by referring to the recorded management information at the time of reproduction, and thus original record information can be reproduced.

Furthermore, even when information is recorded in a state where the information is not divided, the control unit 21 reads information to be originally read from the blue light beam Lb1 and at the same time, obtains the detection signal SD2 by using the blue light beams Lb2 from other mark recording layers with a high possibility of being read later and stores the detection signal SD2 in a built-in RAM or the like so as to act as a so-called read-ahead cache.

According to the configuration described above, the control unit 21 of the optical disc apparatus 20 according to the first embodiment divides record information, makes the focuses Fb1 and Fb2 of the blue light beams Lb1 and Lb2 based on the divided record information formed at the different first and second target mark positions PS1 and PS2, and forms the first recording mark RM1 and the second recording mark RM2 independently from each other when recording information on the optical disc 100 by performing focus control and tracking control of the objective lens 36 such that the focus Fr of the red light beam Lr1 is formed on a target track in the transflective film 104 of the optical disc 100 by means of the position control optical system 30 of the optical pickup 26. In addition, the control unit 21 of the optical disc apparatus 20 according to the first embodiment makes the focuses Fb1 and Fb2 of the two blue light beams Lb1 and Lb2 formed at the different first and second target mark positions PS1 and PS2, respectively, and unifies reproduction signals obtained on the basis of the blue reproduction light beams Lb3 and Lb4 generated according to the existence of the first recording mark RM1 and the second recording mark RM2 when reproducing information from the optical disc 100. Accordingly, in both cases of recording and reproduction of information, a recording speed and a reproduction speed can be increased.

(3) Second Embodiment (3-1) Configuration of an Optical Disc

In a second embodiment, information is recorded on the optical disc 100 (see FIGS. 4 and 5) and recorded information is reproduced from the optical disc 100 in the same manner as in the first embodiment, and accordingly, an explanation thereof will be omitted.

(3-2) Configuration of an Optical Disc Apparatus

Next, an optical disc apparatus 120 according to the second embodiment will be described. The optical disc apparatus 120 has a configuration corresponding to the optical disc apparatus 20 shown in FIG. 6. The optical disc apparatus 120 is different from the optical disc apparatus 20 in that a control unit 121 corresponding to the control unit 21 and an optical pickup 126 corresponding to the optical pickup 26 are provided, but the other configuration is similar to that of the optical disc apparatus 20.

Similar to the control unit 21 in the first embodiment, the control unit 121 is configured to include a CPU (not shown) as a main portion. In addition, the control unit 21 is configured to execute various kinds of processing, such as information recording processing or information reproduction processing by reading various programs, such as a basic program and an information recording program, from a ROM (not shown) and loading the read program to a RAM (not shown).

As a result, similar to the optical disc apparatus 20 according to the first embodiment, the optical disc apparatus 120 is configured to record information on a target track in the recording layer 101 of the optical disc 100 or to reproduce information from the target track by causing the control unit 121 to control the optical pickup 126.

(3-3) Configuration of an Optical Pickup

Figure 10:
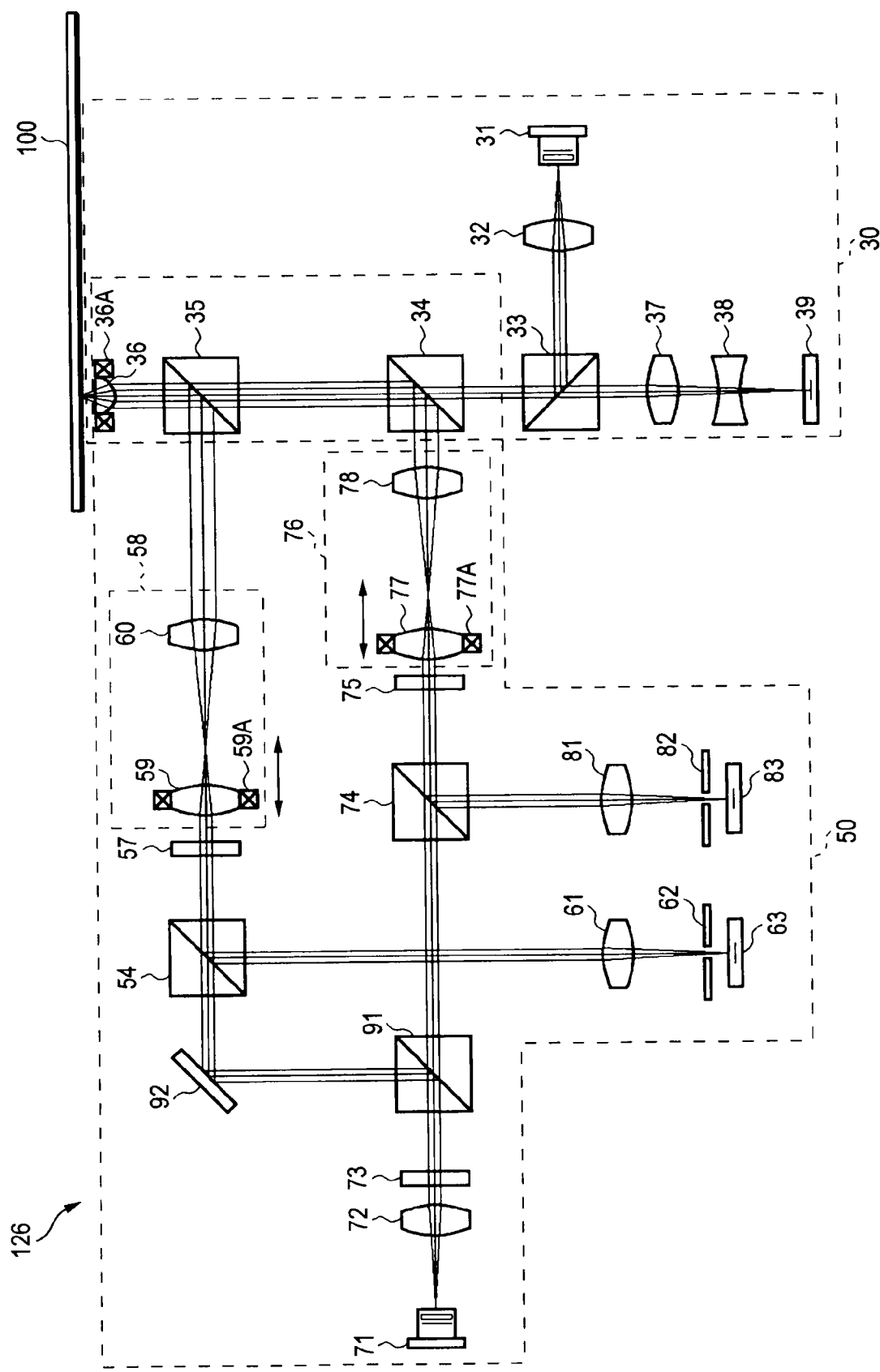
FIG. 10 is a view schematically illustrating the configuration of an optical pickup in the second embodiment.

Next, the configuration of the optical pickup 126 is schematically shown in FIG. 10 in which portions corresponding to those shown in FIG. 7 are denoted by the same reference numerals. Similar to the optical pickup 26, the optical pickup 126 is provided with many optical components and is configured to include largely a position control optical system 30 and an information optical system 90.

(3-3-1) Configuration of a Position Control Optical System

The position control optical system 30 of the optical pickup 26 in the second embodiment has the same configuration as the position control optical system 30 of the optical pickup 26 in the first embodiment, and an explanation thereof will be omitted.

(3-3-2) Configuration of an Information Optical System

On the other hand, the information optical system 90 in the second embodiment is largely different from the information optical system 50 (see FIG. 7) in the first embodiment in that the laser diode 51 and the collimator lens 52 are not provided and one blue light beam irradiated from a laser diode 71 is divided into two blue light beams Lb1 and Lb2, but the other configuration of the information optical system 90 in the second embodiment is similar to that of the information optical system 50 in the first embodiment.

That is, in the information optical system 90, the laser diode 71 is configured to be able to emit a blue laser beam having a wavelength of about 405 nm. In practice, the laser diode 71 emits a blue light beam Lb0, which is divergent light, on the basis of a control of the control unit 121 (see FIG. 6) and makes the emitted blue light beam Lb0 incident on a collimator lens 72. In addition, the blue light beam Lb0 is p-polarized light, for example.

The collimator lens 72 converts the blue light beam Lb0 from divergent light to parallel light and makes the converted blue light beam Lb0 incident on a half wavelength plate 73. The half wavelength plate 73 serves to make the blue light beam Lb0 incident on a surface 91D of a polarization beam splitter 91, for example, in a condition that a percentage of a p-polarized light component is about 50% and a percentage of an s-polarized light component is about 50% by rotating the polarization direction of the blue light beam Lb0.

The polarization beam splitter 91 is configured to cause light beams to be reflected from a transflective surface 91S or transmitted through the transflective surface 91S in a rate changing with the polarizing direction of the light beams. For example, the transflective surface 91S reflects almost all light beams corresponding to p-polarized light therefrom and transmits almost all light beams corresponding to s-polarized light therethrough.

Figure 11:
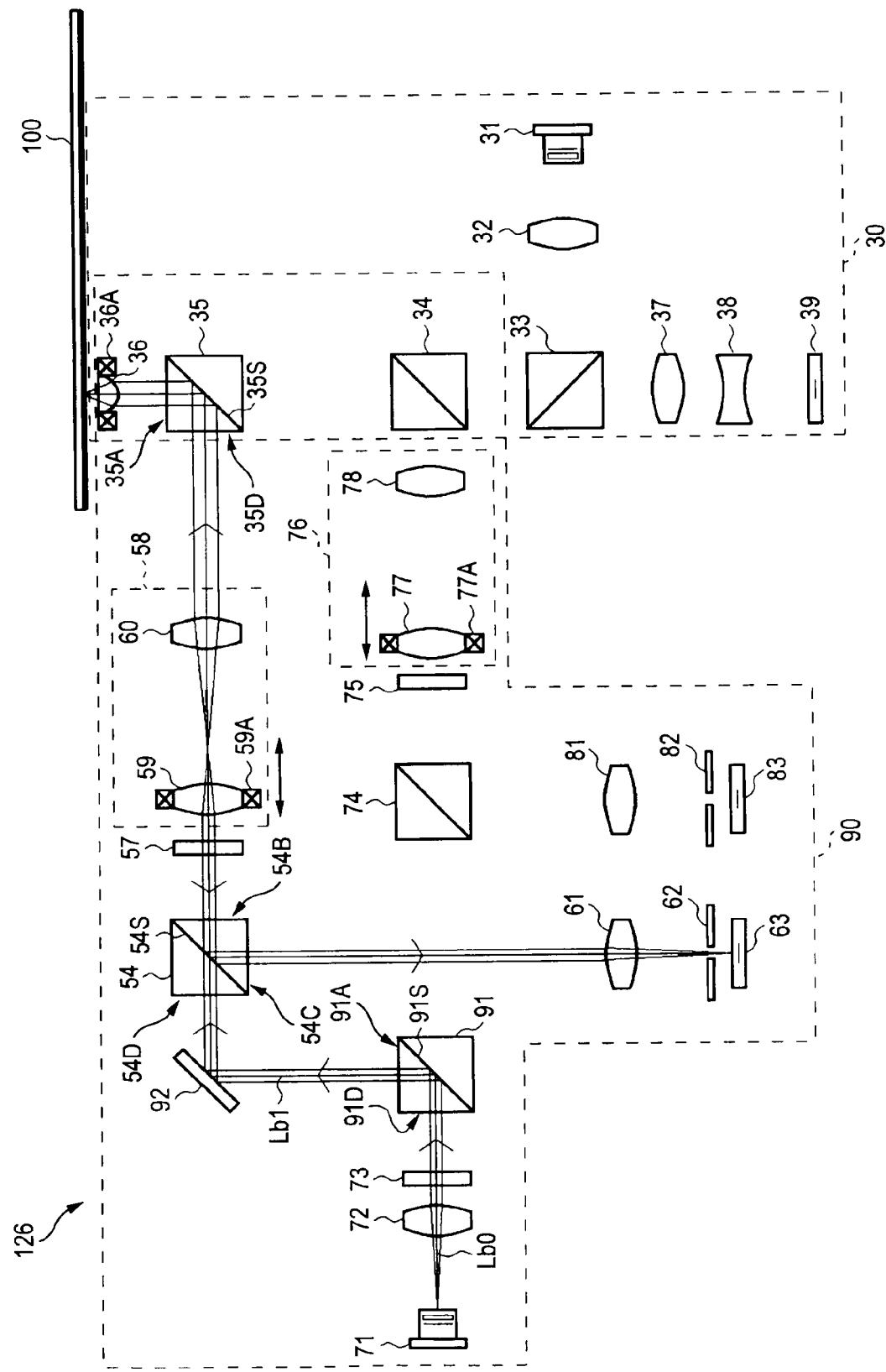
FIG. 11 is a view schematically illustrating an optical path (1) of a blue light beam in the second embodiment.

In practice, as shown in FIG. 11 corresponding to FIG. 10, the polarization beam splitter 91 causes a p-polarized light component of the blue light beams Lb0 to be reflected from the transflective surface 91S to thereby obtain the blue light beam Lb1, causes the blue light beam Lb1 to be irradiated from a surface 91A to a mirror 92 and to be then reflected, and then causes the blue light beam Lb1 to be incident on a surface 54D of a non-polarization beam splitter 54.

Thereafter, the information optical system 90 can form the first recording mark RM1 by forming the focus Fb1 of the blue light beam Lb1 at the first target mark position PS1 within the recording layer 101 of the optical disc 100 through the same blue optical path 1 as in the first embodiment.

Figure 12:
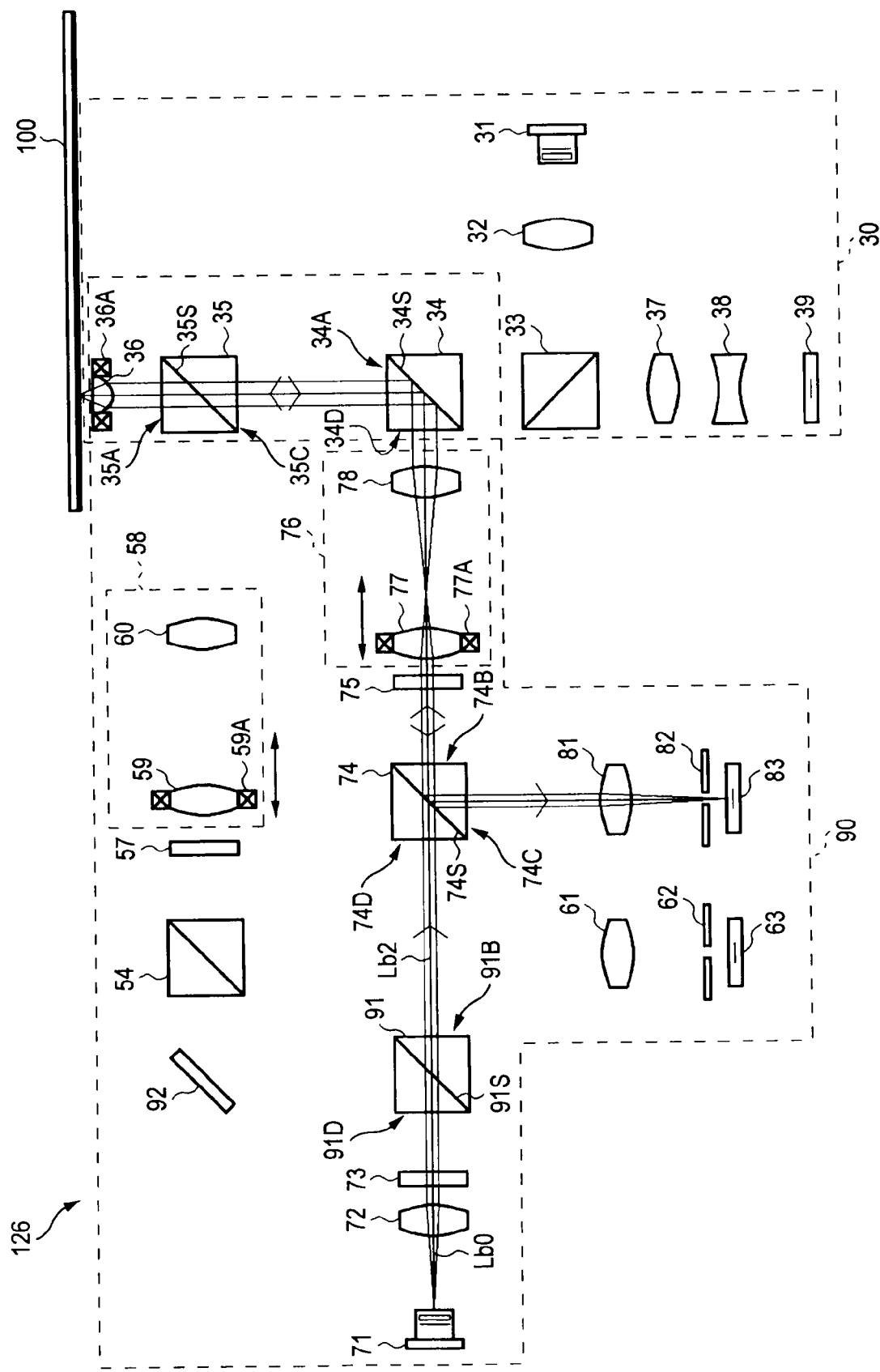
FIG. 12 is a view schematically illustrating an optical path (2) of a blue light beam in the second embodiment.

In addition, as shown in FIG. 12 corresponding to FIG. 10, the polarization beam splitter 91 causes an s-polarized light component of the blue light beams Lb0 to be transmitted through the transflective surface 91S to thereby obtain the blue light beam Lb2 and then causes the blue light beam Lb2 to be incident from a surface 91B onto a surface 74D of a non-polarization beam splitter 74.

Thereafter, the information optical system 90 can form the second recording mark RM2 by forming the focus Fb2 of the blue light beam Lb2 at the second target mark position PS2 within the recording layer 101 of the optical disc 100 through the same blue optical path 2 as in the first embodiment.

Furthermore, the information optical system 90 can also generate the detection signals SD1 and SD2 by causing the photodetectors 63 and 83 to detect the blue reproduction light beams Lb3 and Lb4 through the blue optical path 3 and the blue optical path 4, respectively, in the same manner as the first embodiment.

(3-4) Recording and Reproduction of Information

Next, a case in which the optical disc apparatus 120 records information on the optical disc 100 and a case in which the optical disc apparatus 120 reproduces information from the optical disc 100 will be described.

(3-4-1) Recording of Information

In the case of recording information on the optical disc 100, the control unit 121 (see FIG. 6) of the optical disc apparatus 120 supplies a driving command and record address information to the driving control unit 22 and supplies record information to the signal processing unit 23 when the control unit 121 receives an information recording command, record information, and record address information from an external device (not shown) as described above.

At this time, the driving control unit 22 performs focus control and tracking control (that is, position control) of the objective lens 36 such that the red light beam Lr1 follows a target track corresponding to record address information by means of the position control optical system 30 of the optical pickup 26.

In addition, the control unit 121 can make the focus Fb1 of the blue light beam Lb1 and the focus Fb2 of the blue light beam Lb2 formed at the first target mark position PS1 and the second target mark position PS2 all of which are positioned at a bottom side of a target track, respectively, by adjusting the positions of the movable lenses 59 and 77 in the relay lenses 58 and 76.

As a result, the optical pickup 126 can form the first recording mark RM1 and the second recording mark RM2 at the first target mark position PS1 and the second target mark position PS2 in the recording layer 101 of the optical disc 100, respectively.

Here, since the optical pickup 126 in the second embodiment generates the blue light beams Lb1 and Lb2 by dividing the blue light beams Lb0 emitted from one laser diode 71, it is difficult to independently control the light amount of the blue light beams Lb1 and Lb2 and the like, unlike the optical pickup 26 in the first embodiment.

For this reason, the signal processing unit 23 is configured to generate a recording signal by using record information without dividing the record information and to supply the generated recording signal to the laser diode 71.

As a result, the optical disc apparatus 120 can form the same information on the recording layer 101 of the optical disc 100 so as to overlap through the first recording mark RM1 and the second recording mark RM2 that are formed at the first target mark position PS1 and the second target mark position PS2, respectively.

Figure 13:
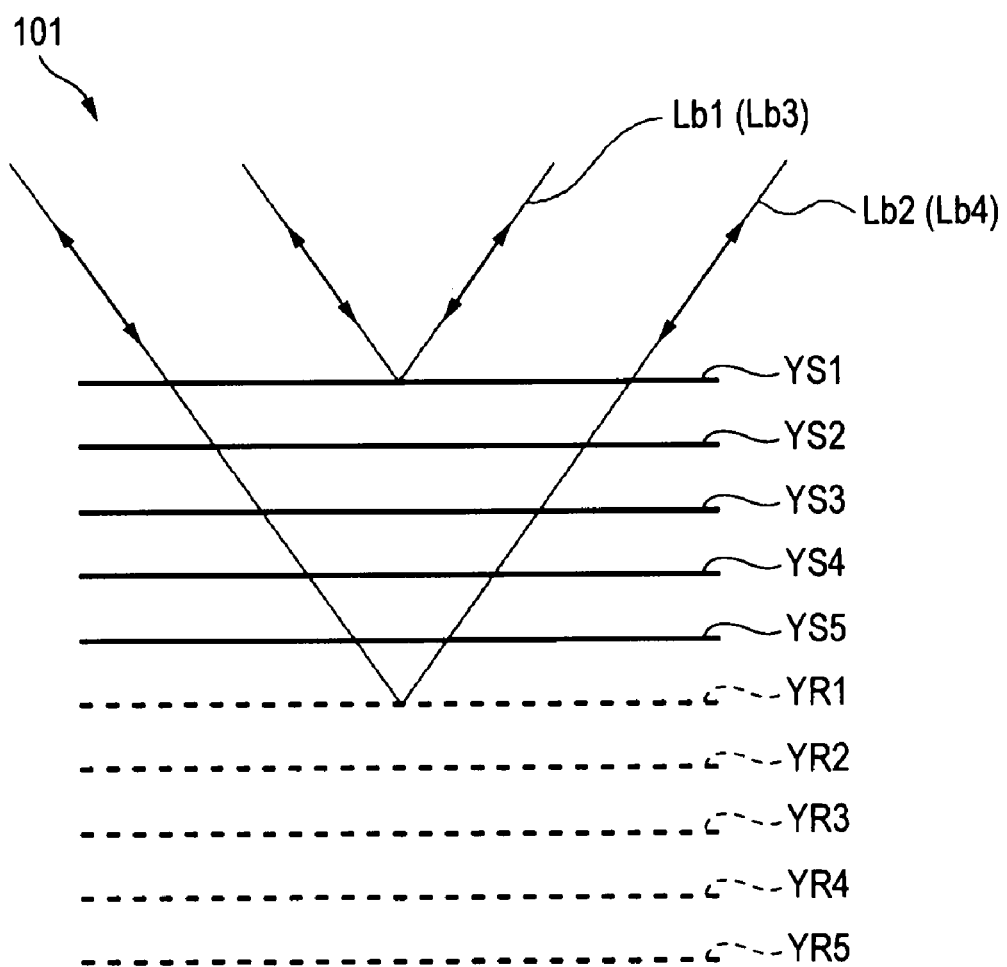
FIG. 13 is a view illustrating the configuration of a mark recording layer at the time of mirroring recording.

Here, as shown in FIG. 13, for example, ten mark recording layers can be formed within the recording layer 101 of the optical disc 100 when the optical disc apparatus 120 records information on the optical disc 100.

In addition, for the convenience of explanation, the ten mark recording layers are referred to as a first master layer YS1, a second master layer YS2, ..., a fifth master layer YS5 and a first mirror layer YR1, a second mirror layer YR2, ..., a fifth mirror layer YR5 sequentially from a side near the transflective film 104.

In practice, the control unit 121 of the optical disc apparatus 120 makes the first master layer YS1 and the first mirror layer YR1, the second master layer YS2 and the second mirror layer YR2, ..., and the fifth master layer YS5 and the fifth mirror layer YS5 correspond to each other. That is, the control unit 121 is configured to record the same information at the master layer YS and the mirror layer YR corresponding to each other, that is, perform so-called mirroring recording.

Thus, the optical disc apparatus 120 can make holograms existing at both the first target mark position PS1 and the second target mark position PS2 in the recording layer 101 of the optical disc 100 without performing any recording when record information is a value "0" and can record the first recording mark RM1 and the second recording mark RM2 at the first target mark position PS1 and the second target mark position PS2, respectively, when record information is a value "1".

In this case, the control unit 121 records information on whether or not mirroring recording is performed and on correspondence of mark recording layers, as management information, in a TOC (table of contents) of the optical disc 100, for example.

Thus, the control unit 121 of the optical disc apparatus 120 is configured to be able to simultaneously record the first recording mark RM1 and the second recording mark RM2, which indicate the same information, at two positions corresponding to a target track within the recording layer 101 of the optical disc 100, that is, at the first target mark position PS1 and the second target mark position PS2.

In addition, the control unit 121 of the optical disc apparatus 120 may also record the first recording mark RM1 only at the first target mark position PS1 without performing mirroring recording by controlling the liquid crystal panel 75 so as to block the blue light beam Lb2 such that the blue light beam Lb2 is not irradiated onto the optical disc 100.

(3-4-2) Reproduction of Information

In the case of reproducing information from the optical disc 100, the control unit 121 (see FIG. 6) of the optical disc apparatus 120 performs focus control and tracking control (that is, position control) of the objective lens 36 such that the red light beam Lr1 follows a target track and makes the blue light beams Lb1 and Lb2 irradiated such that the focus Fb1 of the blue light beam Lb1 and the focus Fb2 of the blue light beam Lb2 are formed at the different first and second target mark positions PS1 and PS2, respectively, in the same manner as the case of the optical disc apparatus 20 according to the first embodiment.

Thus, the control unit 121 can simultaneously generate the blue reproduction light beams Lb3 and Lb4 from the first target mark position PS1 and the second target mark position PS2 in the recording layer 101 of the optical disc 100, respectively, according to the existence of the first recording mark RM1 and the second recording mark RM2.

At this time, in the information optical system 90, it is possible to select the blue reproduction light beams Lb3 and Lb4 and to generate the detection signals SD1 and SD2 by an operation of pinhole plates 62 and 82 (see FIGS. 9A and 9B), in the same manner as the information optical system 50 in the first embodiment.

Then, the signal processing unit 22 recognizes whether or not the blue reproduction light beam Lb3 or Lb4 has been detected as a value "0" or "1" on the basis of the detection signals SD1 and SD2, generates two kinds of reproduction information on the basis of the recognition result, and supplies the generated reproduction information to the control unit 121.

The control unit 121 first checks whether mirroring recording is applied or division recording is applied like the first embodiment on the basis of the management information recorded in the TOC of the optical disc 100.

In the case when mirroring recording has been performed on the optical disc 100, the control unit 121 generates the detection signals SD1 and SD2 by forming the focuses Fb1 and Fb2 of the blue light beams Lb1 and Lb2 at the master layer YS and the mirror layer YR corresponding to each other, respectively, compares two kinds of reproduction information through predetermined comparison and correction processing, generates final reproduction information by performing predetermined error correction processing and the like as necessary, and transmits the generated final reproduction information to an external device (not shown). In this case, the reproduction speed in the optical disc apparatus 20 is a normal reproduction speed.

On the other hand, in the case when division recording has been performed on the optical disc 100, the control unit 121 generates the detection signals SD1 and SD2 by forming the focuses Fb1 and Fb2 of the blue light beams Lb1 and Lb2 at the mark recording layers corresponding to each other, respectively, unifies two kinds of reproduction information into one reproduction information through predetermined information unifying processing in the same manner as the first embodiment, and then transmits the unified reproduction information to an external device (not shown). As a result, similar to the optical disc apparatus 20 according to the first embodiment, in the optical disc apparatus 120, it is possible to obtain a seemingly double reproduction speed only by performing reproduction with a normal reproduction speed using the blue reproduction light beams Lb3 and Lb4.

Thus, the control unit 121 of the optical disc apparatus 120 is configured to detect the blue reproduction light beams Lb3 and Lb4, which are generated according to the existence of the first recording mark RM1 and the second recording mark RM2, to thereby generate the detection signals SD1 and SD2 by irradiating the blue light beams Lb1 and Lb2 such that the focuses Fb1 and Fb2 of the blue light beams Lb1 and Lb2 are formed at the first target mark position PS1 and the second target mark position PS2, respectively, and to output final reproduction information on the basis of the generated detection signals SD1 and SD2.

In addition, the optical disc apparatus 120 may be configured to reproduce information on the basis of only one kind of reproduction information, which can be obtained by the blue light beam Lb1 and the blue reproduction light beam Lb3, by blocking the blue light beam Lb2 and the blue reproduction light beam Lb4 by controlling the liquid crystal panel 75, for example.

(3-5) Operations and Effects

In the configuration described above, the control unit 121 (see FIG. 6) of the optical disc apparatus 120 according to the second embodiment performs focus control and tracking control of the objective lens 36 such that the focus Fr of the red light beam Lr1 is formed on a target track in the transflective film 104 (see FIG. 5) of the optical disc 100 by means of the position control optical system 30 of the optical pickup 126 in both cases when information is recorded on the optical disc 100 and when information is reproduced from the optical disc 100.

In addition, when recording information on the optical disc 100, the control unit 121 forms the first recording mark RM1 and the second recording mark RM2, which indicate the same information, within the recording layer 101 of the optical disc 100 by controlling the positions of the movable lenses 59 and 77 of the relay lenses 58 and 76 such that the focuses Fb1 and Fb2 of the blue light beams Lb1 and Lb2 are respectively formed at the different master layer YS and mirror layer YR (see FIG. 5) by using the blue light beams Lb1 and Lb2 obtained by dividing the blue light beam Lb0.

On the other hand, in the case of reproducing information from the optical disc 100 in which mirroring recording has been performed, the control unit 121 detects the blue reproduction light beams Lb3 and Lb4, which are generated according to the existence of the first recording mark RM1 and the second recording mark RM2, to thereby generate the detection signals SD1 and SD2 by controlling the positions of the movable lenses 59 and 77 of the relay lenses 58 and 76 such that the focuses Fb1 and Fb2 of the two blue light beams Lb1 and Lb2 are formed at the master layer YS and the mirror layer YR corresponding to each other, respectively, and generates final reproduction information through predetermined comparison and correction processing.

Accordingly, similar to the first embodiment, the control unit 121 of the optical disc apparatus 120 can obtain two kinds of reproduction signals, which are independent from each other, from two target mark positions, which correspond to a target track of the optical disc 100 and have different depths, when reproducing information from the optical disc 100.

On the other hand, unlike the first embodiment, the control unit 121 of the optical disc apparatus 120 can record the recording mark RM indicating the same information at two target mark positions in the master layer YS and the mirror layer YR, which correspond to a target track of the optical disc 100 and have different depths, when recording information on the optical disc 100.

Accordingly, the control unit 121 can perform mirroring recording, which increases redundancy of information, by using the master layer YS and the mirror layer YR corresponding to each other within the recording layer 101 of the optical disc 100. As a result, it is possible to improve the quality of reproduction information.

That is, even if the detection signal SD1 or SD2 indicates abnormal reproduction information since a hologram (that is, a format state), the recording mark RM, or the like in either the master layer YS or the mirror layer YR is broken due to a certain cause or there exists a defect in the optical disc 100, for example, there is a high possibility that the control unit 121 could correct the abnormal reproduction information to correct information through comparison and correction processing.

At this time, the control unit 121 can make two kinds of reproduction signals correctly correspond to each other by recording management information, which indicates correspondence relationship of corresponding mark recording layers, in the TOC of the optical disc 100 and the like at the time of recording of information and by referring to the recorded management information at the time of reproduction, and thus original record information can be obtained.

Furthermore, in the case when information is divided and recorded on the optical disc 100 like the first embodiment, the control unit 121 can achieve a double reproduction speed by acquiring two kinds of reproduction information and unifying the two kinds of reproduction information like the first embodiment.

Furthermore, even when information is recorded in a state where the information is not divided, the control unit 121 may also read information to be originally read from the blue light beam Lb1 and at the same time, obtain the detection signal SD2 by using the blue light beams Lb2 from other mark recording layers with a high possibility of being read later and store the detection signal SD2 in a built-in RAM like the first embodiment so as to act as a so-called read-ahead cache.

According to the configuration described above, the control unit 121 of the optical disc apparatus 120 according to the second embodiment performs mirroring recording for forming the first recording mark RM1 and the second recording mark RM2, which indicate the same information, at two target mark positions in the master layer YS and the mirror layer YR having different depths from a target track when recording information on the optical disc 100 by performing focus control and tracking control of the objective lens 36 such that the focus Fr of the red light beam Lr1 is formed on a target track in the transflective film 104 of the optical disc 100. In addition, the control unit 121 of the optical disc apparatus 120 according to the second embodiment detects the blue reproduction light beams Lb3 and Lb4, which are generated according to the existence of the first recording mark RM1 and the second recording mark RM2, to thereby generate the detection signals SD1 and SD2 by forming the focuses Fb1 and Fb2 of the blue light beams Lb1 and Lb2 at the master layer YS and the mirror layer YR corresponding to each other, respectively, and then generates final reproduction information through predetermined comparison and correction processing when reproducing information. As a result, it is possible to improve the quality of reproduction information. In addition, in the case when record information is recorded in a state where the record information is divided, it is possible to increase the reproduction speed.

(4) Third Embodiment (4-1) Configuration of an Optical Disc

In the third embodiment, information is recorded on an optical disc 200 and is reproduced from the optical disc 200 instead of the optical disc 100 in the first and second embodiments.

The optical disc 200 has the same external configuration as the optical disc 100 (see FIG. 6) in the first and second embodiments, but the internal configuration of the optical disc 200 is partially different from that of the optical disc 100.

Figure 14:
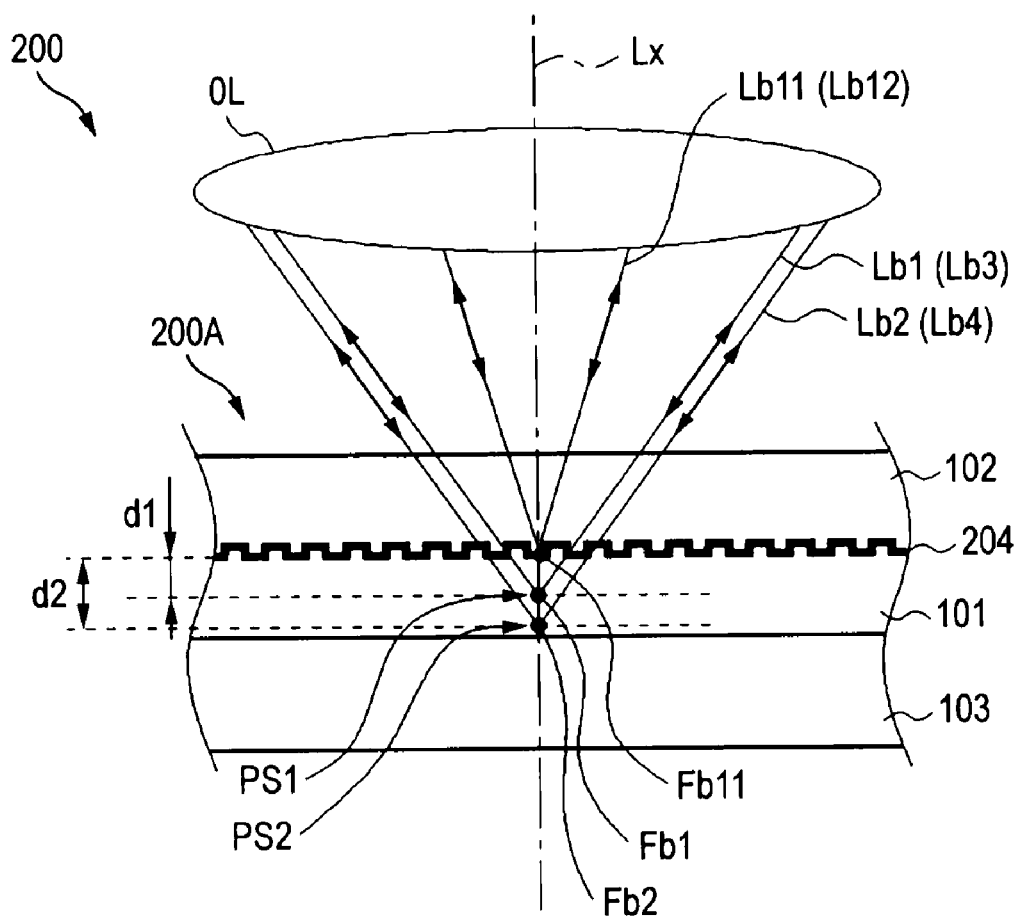
FIG. 14 is a view schematically illustrating the internal configuration of optical discs in third and fourth embodiments.

That is, as shown in FIG. 14 in which portions corresponding to those shown in FIG. 5 are denoted by the same reference numeral, the optical disc 200 has a transflective film 204 instead of the transflective film 104 in the first and second embodiments.

The transflective film 204 is formed with a spiral track like the transflective film 104 and is formed of a material, which reflects the blue light beam Lb in a predetermined rate (for example, about 10%) and transmits the rest (for example, about 90%), unlike the transflective film 104.

In the configuration described above, the optical disc 200 is configured such that when information is recorded, a transmittance of a part of the blue light beams Lb1 and Lb2 in the transflective film 204 is reduced as compared with the optical disc 100 but the first recording mark RM1 and the second recording mark RM2 are recorded by the blue light beams Lb1 and Lb2 in an almost similar manner.

In addition, similar to the optical disc 100, when information is reproduced, the optical disc 200 is configured such that the blue reproduction light beams Lb3 and Lb4 are generated if the first recording mark RM1 and the second recording mark RM2 are not formed at the first target mark position PS1 and the second target mark position PS2 when the focuses Fb1 and Fb2 of the blue light beams Lb1 and Lb2 are formed at the first target mark position PS1 and the second target mark position PS2, respectively.

At this time, the optical disc 200 is configured such that a transmittance of a part of the blue reproduction light beams Lb3 and Lb4 in the transflective film 204 is reduced as compared with the optical disc 100 but the blue reproduction light beams Lb3 and Lb4 are emitted as divergent light from a side of the surface 200A.

Thus, unlike the optical disc 100 in the first embodiment, the optical disc 200 is configured such that blue light beams can be used for both position control and information recording in both cases when information is recorded and information is reproduced.

(4-2) Configuration of an Optical Disc Apparatus

Next, an optical disc apparatus 220 corresponding to the above optical disc 200 will be described. The optical disc apparatus 220 is different from the optical disc apparatus 20 according to the first embodiment shown in FIG. 6 in that a control unit 221 is provided instead of the control unit 21 and an optical pickup 226 is provided instead of the optical pickup 26, but the other configuration of the optical disc apparatus 220 is similar to that of the optical disc apparatus 20.

Similar to the control unit 21, the control unit 221 is configured to include a CPU (not shown) as a main portion. In addition, the control unit 221 is configured to execute various kinds of processing, such as information recording processing or information reproduction processing by reading various programs, such as a basic program and an information recording program, from a ROM (not shown) and loading the read program to a RAM (not shown).

In addition, similar to the optical disc apparatus 20 according to the first embodiment, the optical disc apparatus 220 is configured to record information at a position corresponding to a target track in the recording layer 101 of the optical disc 200 or to reproduce information from a position corresponding to the target track by causing the control unit 221 to control the optical pickup 226.

(4-3) Configuration of an Optical Pickup

Figure 15:
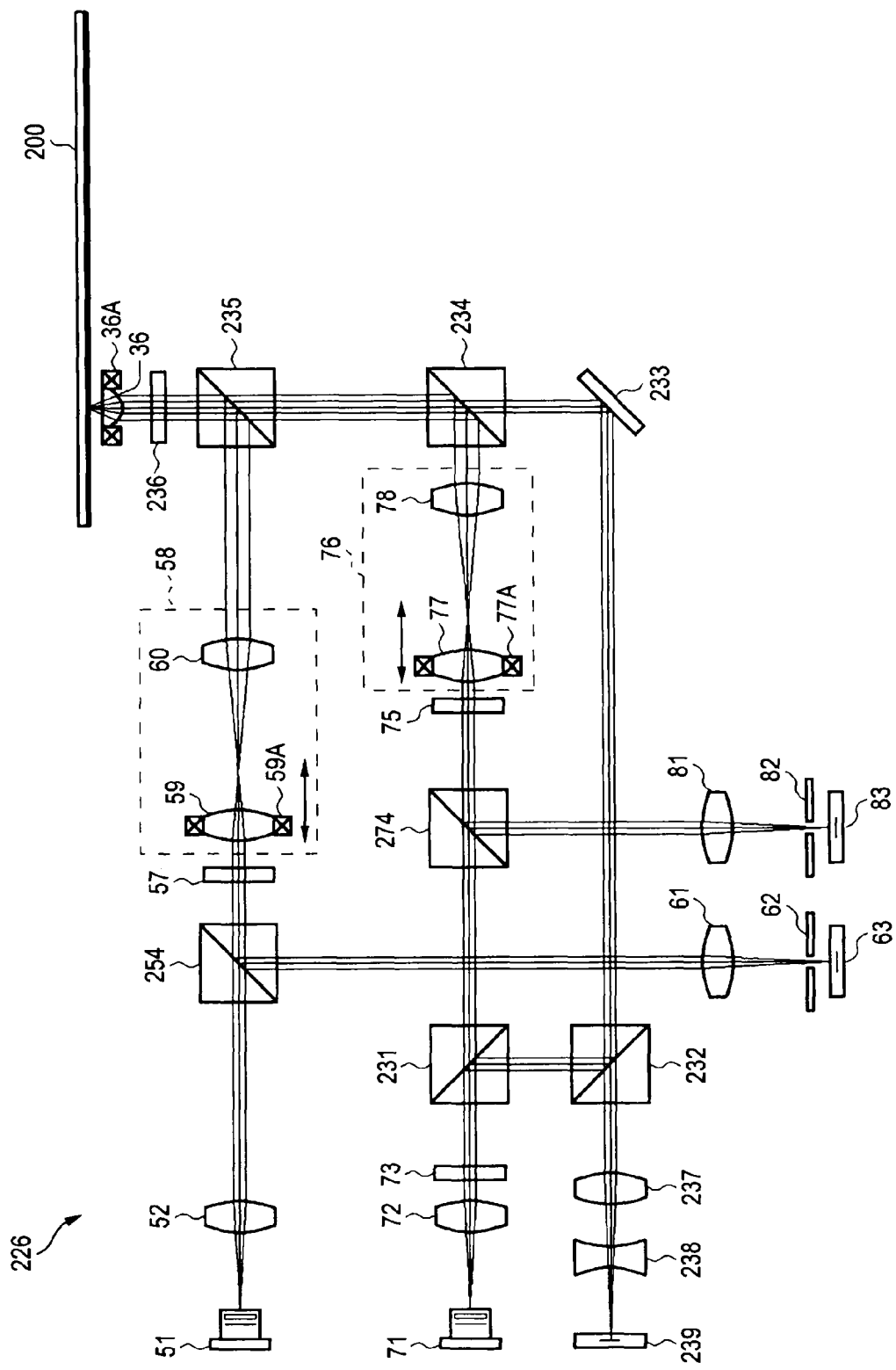
FIG. 15 is a view schematically illustrating the configuration of an optical pickup in the third embodiment.

Next, the configuration of the optical pickup 226 will be described. As shown in FIG. 15 in which portions corresponding to those shown in FIG. 7 are denoted by the same reference numeral, the optical pickup 226 has a polarization beam splitter 231 and a photodetector 239 instead of a part of optical components, such as the laser diode 31 or the photodetector 39, in the optical pickup 26.

That is, as compared with the optical pickup 26, the optical pickup 226 does not have the position control optical system 30. Instead, the optical pickup 226 has a position control optical system 230 (see FIG. 16), which performs focus control or tracking control using a blue light beam, and has an information optical system 250 (see FIG. 17) corresponding to the information optical system 50.

(4-3-1) Configuration of a Position Control Optical System

Figure 16:
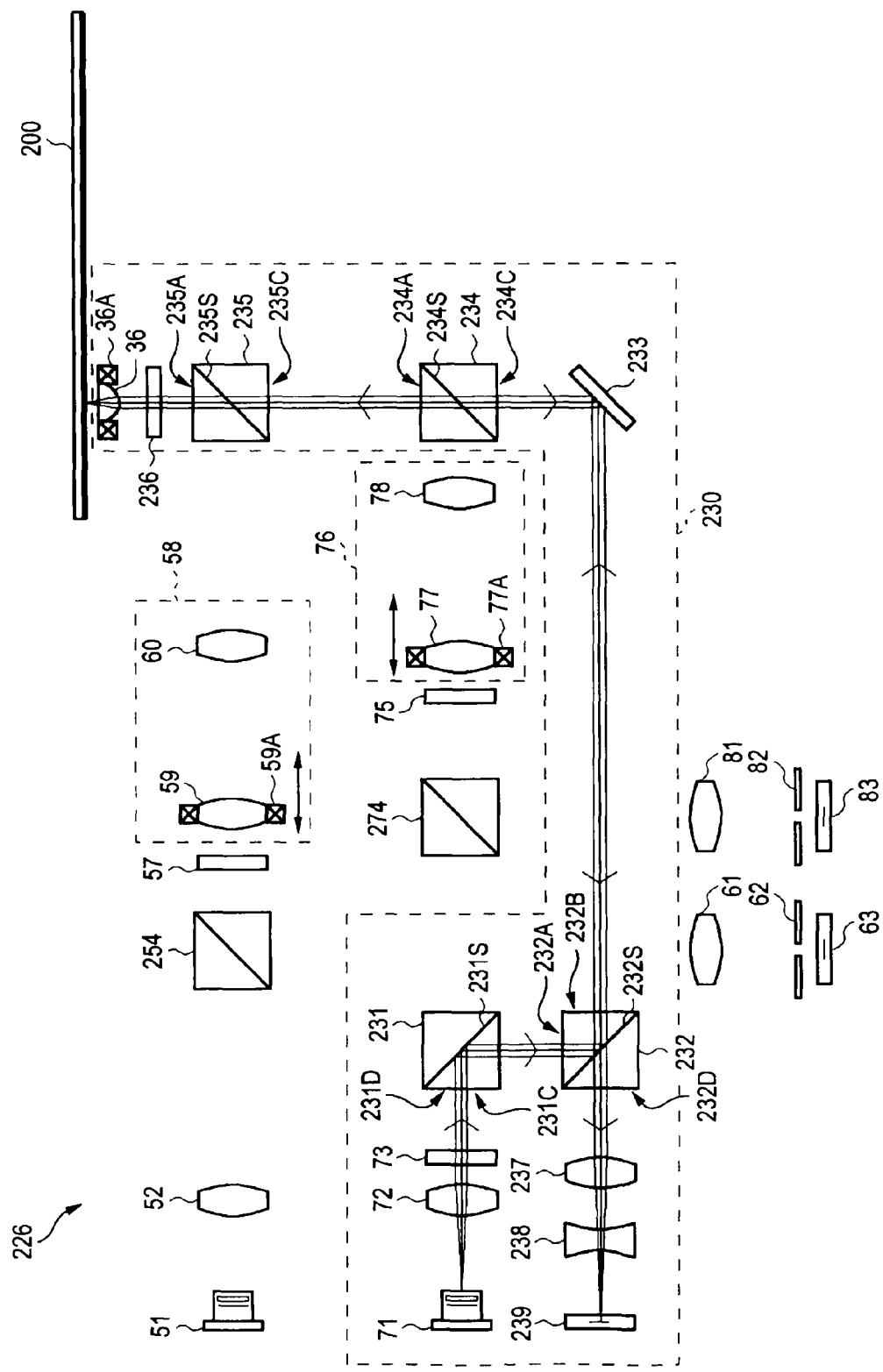
FIG. 16 is a view schematically illustrating an optical path (1) of a blue light beam in the third embodiment.

In FIG. 16 corresponding to FIG. 15, the laser diode 71 emits a blue light beam Lb0, which is divergent light, on the basis of a control of the control unit 221 (see FIG. 6) and makes the emitted blue light beam Lb0 incident on a collimator lens 72. The collimator lens 72 converts the blue light beam Lb0 from divergent light to parallel light and makes the converted blue light beam Lb0 incident on a half wavelength plate 53.

The polarization direction of the blue light beam Lb0 is rotated by a predetermined angle by the half wavelength plate 53, such that a percentage of a p-polarized light component is 50% and a percentage of an s-polarized light component is 50%, for example. Then, the blue light beam Lb0 is incident on a surface 231D of the polarization beam splitter 231.

The polarization beam splitter 231 is configured to cause light beams to be reflected from a transflective surface 231S or transmitted through the transflective surface 231 according to the polarizing direction of the light beams. For example, the transflective surface 231S reflects almost all light beams corresponding to s-polarized light therefrom and transmits almost all light beams corresponding to p-polarized light therethrough.

In practice, the polarization beam splitter 231 reflects an s-polarized light component of the blue light beams Lb0 from a transflective surface 231S to thereby generate a blue light beam Lb11, emits the blue light beam Lb11 from a surface 231C, and makes the emitted blue light beam Lb11 incident on a polarization beam splitter 232.

Similar to the polarization beam splitter 231, the polarization beam splitter 232 is configured to reflect almost all light beams corresponding to s-polarized light from a transflective surface 232S and to transmit almost all light beams corresponding to p-polarized light through the transflective surface 232S. Accordingly, the polarization beam splitter 232 causes the blue light beam Lb11 to be reflected from the transflective surface 232, to be emitted from a surface 232B and be then reflected from a mirror 233, and to be then incident on a surface 234C of a non-polarization beam splitter 234.

The non-polarization beam splitter 234 causes the blue light beam Lb11 to be transmitted through a transflective surface 234S in a predetermined rate (for example, 20%), to be emitted from a surface 234A, and to be then incident on a surface 235C of a non-polarization beam splitter 235. The non-polarization beam splitter 235 causes the blue light beam Lb11 to be transmitted through a transflective surface 235S in a predetermined rate (for example, about 50%), to be emitted from a surface 235A, and to be then incident on a quarter wavelength plate 236.

The quarter wavelength plate serves to convert a light beam between linearly polarized light and circularly polarized light. In this case, the quarter wavelength plate converts the blue light beam Lb11 from s-polarized light to left circularly polarized light and makes the converted blue light beam Lb11 incident on the objective lens 36.

The objective lens 36 condenses the blue light beam Lb11 and irradiates the blue light beam Lb11 toward the surface 200A of the optical disc 200, in the same manner as the red light beam Lr1 in the first embodiment. At this time, the blue light beam Lb11 is transmitted through the substrate 102 and is then reflected from the transflective film 204 in a predetermined rate (for example, about 10%), thereby becoming a blue light beam Lb12 propagating in the direction opposite to the blue light beam Lb11, as shown in FIG. 14. At this time, since the rotation direction of circularly polarized light is inverted, the blue light beam Lb12 becomes right circularly polarized light with respect to the blue light beam Lb11 which is left circularly polarized light.

Then, the blue light beam Lb12 is converted into parallel light by the objective lens 36 and is then incident on the quarter wavelength plate 236. The quarter wavelength plate 236 converts the blue light beam Lb12 from right circularly polarized light to linear polarized light, which is p-polarized light, and then makes the converted blue light beam Lb12 incident on the surface 235A of the non-polarization beam splitter 235.

Thereafter, the blue light beam Lb12 is sequentially transmitted through the non-polarization beam splitter 35 and the non-polarization beam splitter 234, is reflected by the mirror 233, and is then incident on the surface 232B of the polarization beam splitter 232.

The polarization beam splitter 232 causes the blue light beam Lb12, which is p-polarized light, to be transmitted therethrough, to be emitted from the surface 232D, and to be then incident on a condensing lens 237. The condensing lens 237 makes the blue light beam Lb12 converging, astigmatism is given by a cylindrical lens 238, and then the blue light beam Lb12 is irradiated onto a photodetector 239.

Similar to the photodetector 39 in the first embodiment, a detection region (not shown) of the photodetector 239 is divided into four region. In addition, similar to the photodetector 39, the photodetector 239 generates four kinds of detection signals SDAc, SDBc, SDCc, and SDDc and transmits the detection signals SDAC, SDBc, SDCc, and SDDc to the signal processing unit 23 (see FIG. 6).

Then, the signal processing unit 23 generates the same focus error signal SFEc and tracking error signal STEc as in the first embodiment and supplies the focus error signal SFEc and the tracking error signal STEc to the driving control unit 22.

The driving control unit 22 performs a feedback control (that is, focus control) of the objective lens 36 on the basis of the focus error signal SFEc such that the blue light beam Lb11 is focused on the transflective film 204 of the optical disc 200.

In addition, the driving control unit 22 performs a feedback control (that is, tracking control) of the objective lens 36 on the basis of the tracking error signal STEr such that the blue light beam Lb11 is focused on a target track in the transflective film 204 of the optical disc 200.

Thus, the position control optical system 230 is configured to use the blue light beam Lb11 instead of the red light beam Lr1 in the first embodiment, irradiate the blue light beam Lb11 onto the transflective film 204 of the optical disc 200, and supply to the signal processing unit 23 a result of reception of the blue light beam Lb12 that is reflected light of the blue light beam Lb11. Then, the driving control unit 22 is configured to perform focus control and tracking control of the objective lens 36 such that the blue light beam Lb11 is focused on a target track of the transflective film 204.

(4-3-2) Configuration of an Information Optical System

Figure 17:
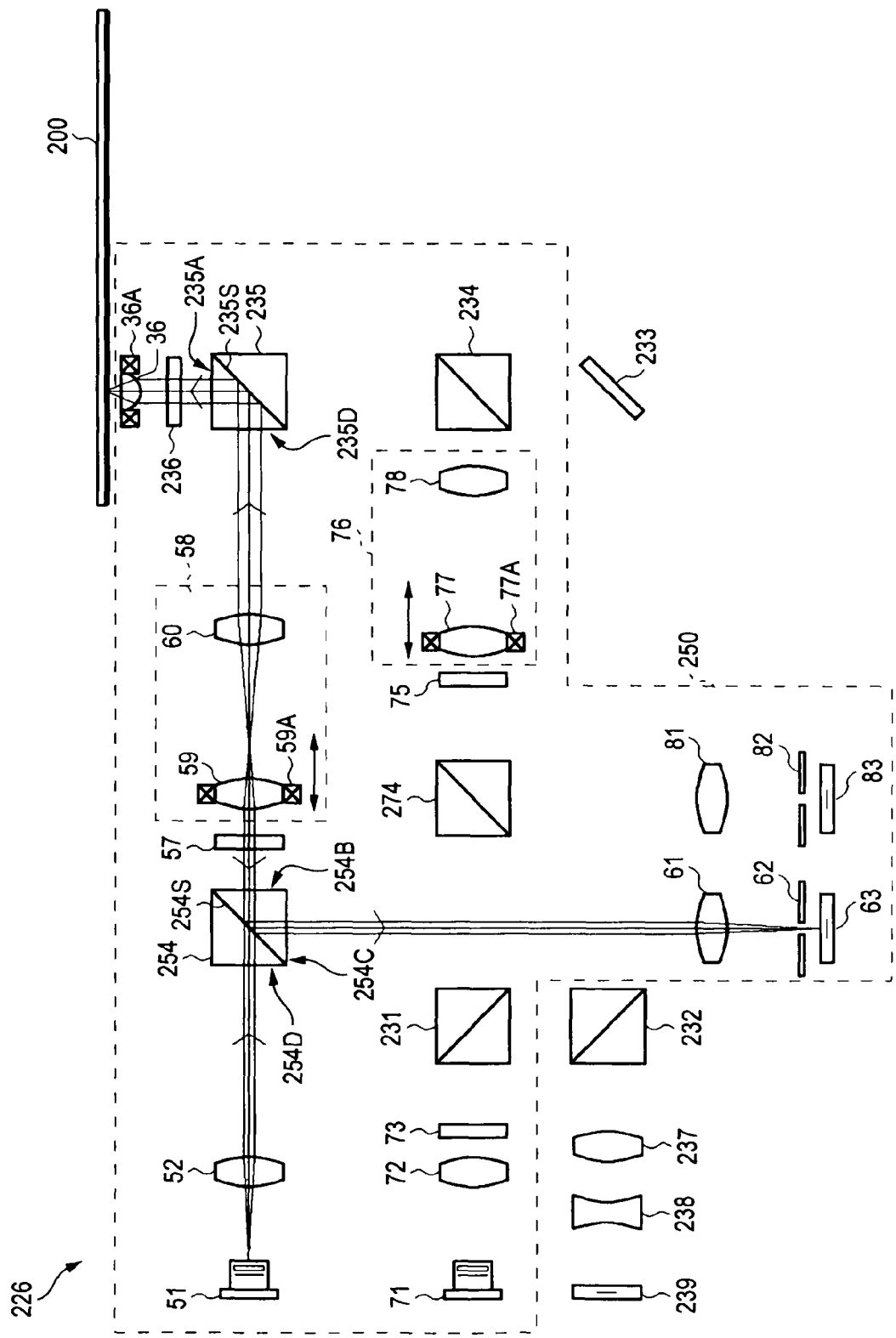
FIG. 17 is a view schematically illustrating an optical path (2) of a blue light beam in the third embodiment.

As shown in FIG. 17 corresponding to FIG. 15, the information optical system 250 in the second embodiment has the configuration corresponding to the information optical system 50 (see FIG. 7) in the first embodiment.

(4-3-2-1) Optical Path (1) of a Blue Light Beam

Similar to the first embodiment, a laser diode 51 is configured to be able to emit a blue laser beam having a wavelength of about 405 nm. In practice, the laser diode 51 emits the blue light beam Lb1, which is divergent light, on the basis of a control of the control unit 221 (see FIG. 6) and makes the emitted blue light beam Lb1 incident on the collimator lens 52. In addition, the blue light beam Lb1 is s-polarized light, for example.

The collimator lens 52 converts the blue light beam Lb1 from divergent light to parallel light and makes the converted blue light beam Lb1 incident on a polarization beam splitter 254. The polarization beam splitter 254 is configured to cause light beams to be reflected from a transflective surface 254S or transmitted through the transflective surface 254S according to the polarizing direction of the light beams. For example, the polarization beam splitter 254 reflects almost all light beams corresponding to p-polarized light therefrom and transmits almost all light beams corresponding to s-polarized light therethrough.

In practice, the polarization beam splitter 254 causes the blue light beam Lb1, which is p-polarized light, to be transmitted through the transflective surface 254S, to be emitted from a surface 254B, and to be then incident on the liquid crystal panel 57. Similar to the first embodiment, the liquid crystal panel 57 corrects a spherical aberration of the blue light beam Lb1 or a comatic aberration resulting from the inclination of the optical disc 100 and makes the corrected blue light beam Lb1 to be incident on a relay lens 58.

Similar to the first embodiment, the relay lens 58 converts the blue light beam Lb1 from parallel light to convergent light using a movable lens 59, converts the blue light beam Lb1, which has become divergent light after convergence, into convergent light again using a fixed lens 60, and makes the blue light beam Lb1 incident on a surface 235D of the non-polarization beam splitter 235.

The non-polarization beam splitter 235 causes the blue light beam Lb1 to be reflected from a transflective surface 35S in a predetermined rate (for example, about 50%) and to be then incident on a quarter wavelength plate 236. The quarter wavelength plate 236 converts the blue light beam Lb1, which is s-polarized light, into left circularly polarized light and makes the converted blue light beam Lb1 incident on the objective lens 36. The objective lens 36 condenses the blue light beam Lb1 and irradiates the blue light beam Lb1 toward the surface 100A of the optical disc 100.

At this time, as shown in FIG. 14, the blue light beam Lb1 is transmitted through the substrate 102 and the transflective film 204, and the focus Fb1 of the blue light beam Lb1 is formed at a position corresponding to the position of the movable lens 59 within the recording layer 101, that is, the first target mark position PS1. Moreover, in the following description, an optical path that the blue light beam Lb1 follows is called a blue optical path 1.

(4-3-2-2) Optical Path (2) of a Blue Light Beam

On the other hand, the polarization beam splitter 231 causes a p-polarized light component of the blue light beams Lb0 emitted from the laser diode 71 to be transmitted through the transflective surface 231S to thereby generate the blue light beam Lb2, to be emitted from a surface 231B, and to be then incident on a surface 274D of a polarization beam splitter 274.

Similar to the polarization beam splitter 254, the polarization beam splitter 274 causes the blue light beam Lb2, which is p-polarized light, to be transmitted through a transflective surface 274S, to be emitted from a surface 274B, and to be then incident on the liquid crystal panel 75.

Similar to the first embodiment, the liquid crystal panel 75 corrects a spherical aberration of the blue light beam Lb2 or a comatic aberration resulting from the inclination of the optical disc 100 and makes the corrected blue light beam Lb2 to be incident on the relay lens 76.

Similar to the first embodiment, the relay lens 76 converts the blue light beam Lb2 from parallel light to convergent light using the movable lens 77, converts the blue light beam Lb2, which has become divergent light after convergence, into convergent light again using the fixed lens 78, and makes the blue light beam Lb2 incident on a surface 234D of the non-polarization beam splitter 234.

The non-polarization beam splitter 234 causes the blue light beam Lb2 to be reflected from the transflective surface 234S in a predetermined rate (for example, 50%), to be emitted from the surface 234A, and to be then incident on the surface 235C of the non-polarization beam splitter 235. The non-polarization beam splitter 235 causes the blue light beam Lb2 to be transmitted through the transflective surface 235S in a predetermined rate (for example, about 50%) and to be then incident on the quarter wavelength plate 236.

The quarter wavelength plate 236 converts the blue light beam Lb2, which is p-polarized light, into right circularly polarized light and makes the converted blue light beam Lb2 incident on the objective lens 36. The objective lens 36 condenses the blue light beam Lb2 and irradiates the blue light beam Lb2 toward the surface 100A of the optical disc 100.

At this time, as shown in FIG. 14, the blue light beam Lb2 is transmitted through the substrate 102 and the transflective film 204, and the focus Fb2 of the blue light beam Lb2 is formed at a position corresponding to the position of the movable lens 77 within the recording layer 101, that is, the second target mark position PS2. Moreover, in the following description, an optical path that the blue light beam Lb2 follows is called a blue optical path 2.

(4-3-2-3) Optical Path (3) of a Blue Light Beam

As described above, the optical disc 200 (see FIG. 14) generates the blue reproduction light beam Lb3 since a property as a hologram is shown if the first recording mark RM1 is not recorded at the position (that is, first target mark position PS1) of the focus Fb1 in the recording layer 101 when the blue light beam Lb1 is irradiated. At this time, the blue reproduction light beam Lb3 becomes right circularly polarized light opposite to the blue light beam Lb1, for example.

The blue reproduction light beam Lb3 is converted from right circularly polarized light into p-polarized light by the quarter wavelength plate 236 (see FIG. 17), propagates to follow the blue optical path 1 in the opposite direction, and is incident on the surface 235A of the non-polarization beam splitter 235. The non-polarization beam splitter 235 causes the blue reproduction light beam Lb3 to be reflected from the transflective surface 235S in a predetermined rate (for example, about 50%) and to be then incident on the relay lens 58.

The relay lens 58 causes the blue reproduction light beam Lb3 to be transmitted sequentially through the fixed lens 60 and the movable lens 59 and to be then incident on the surface 254B of the polarization beam splitter 254 through the liquid crystal panel 57. The polarization beam splitter 254 causes the blue reproduction light beam Lb3, which is p-polarized light, to be reflected from the transflective surface 254S, to be emitted from the 254C, and to be then incident on the condensing lens 61.

Similar to the first embodiment, the condensing lens 61 makes the blue reproduction light beam Lb3 converging and irradiates the blue reproduction light beam Lb3 onto the photodetector 63 through the pinhole plate 62 in which the hole 62H having a predetermined diameter is provided. The photodetector 63 detects the light amount of the blue reproduction light beam Lb3, generates the detection signal SD1 according to the detected light amount, and supplies the generated detection signal SD1 to the signal processing unit 23 (see FIG. 6). Moreover, in the following description, an optical path that the blue reproduction light beam Lb3 follows is called a blue optical path 3.

(4-3-2-4) Optical Path (4) of a Blue Light Beam

In addition, similar to the blue light beam Lb1, the optical disc 200 (see FIG. 14) generates the blue reproduction light beam Lb4 since a property as a hologram is shown if the second recording mark RM2 is not recorded at the position (that is, second target mark position PS2) of the focus Fb2 in the recording layer 101 even when the blue light beam Lb2 is irradiated. At this time, the blue reproduction light beam Lb4 also becomes left circularly polarized light opposite to the blue light beam Lb2, for example.

Figure 18:
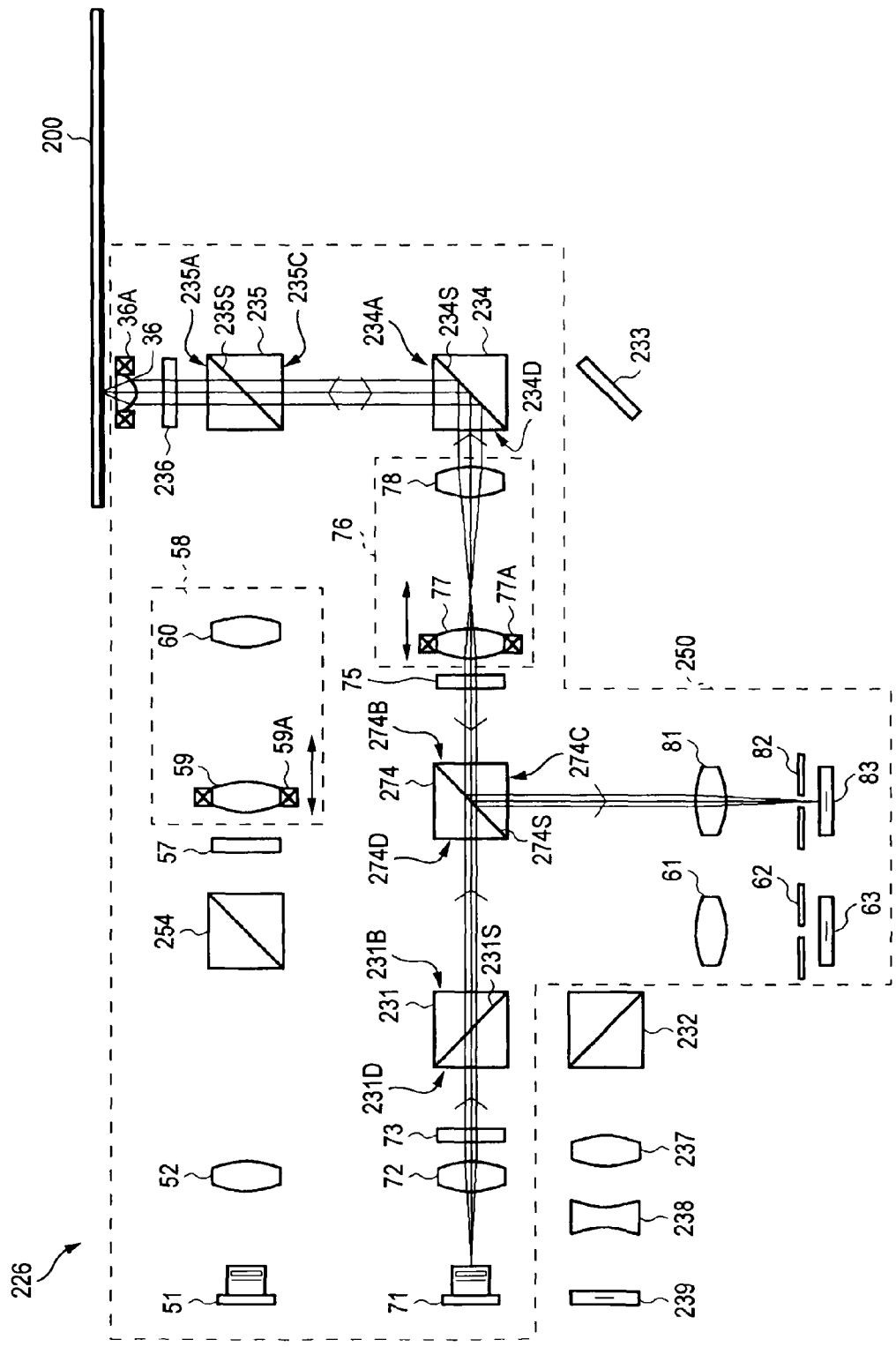
FIG. 18 is a view schematically illustrating an optical path (3) of a blue light beam in the third embodiment.

The blue reproduction light beam Lb4 is converted from left circularly polarized light into s-polarized light by the quarter wavelength plate 236 (see FIG. 18), propagates to follow the blue optical path 2 in the opposite direction, and is incident on the surface 235A of the non-polarization beam splitter 235. The non-polarization beam splitter 235 causes the blue light beam Lb4 to be transmitted through the transflective surface 235S in a predetermined rate (for example, 50%), to be emitted from the surface 235C, and to be then incident on the surface 234A of the non-polarization beam splitter 234. The non-polarization beam splitter 234 causes the blue reproduction light beam Lb4 to be reflected from the transflective surface 234S in a predetermined rate (for example, about 80%) and to be then incident on the relay lens 76.

The relay lens 76 causes the blue reproduction light beam Lb4 to be transmitted sequentially through the fixed lens 78 and the movable lens 77 and to be then incident on the surface 274B of the polarization beam splitter 274 through the liquid crystal panel 75. The polarization beam splitter 274 causes the blue reproduction light beam Lb4, which is s-polarized light, to be reflected from the transflective surface 274S, to be emitted from the 274C, and to be then incident on the condensing lens 81.

Similar to the first embodiment, the condensing lens 81 makes the blue reproduction light beam Lb4 converging and irradiates the blue reproduction light beam Lb4 onto the photodetector 83 through the pinhole plate 82 in which the hole 82H having a predetermined diameter is provided. The photodetector 83 detects the light amount of the blue reproduction light beam Lb4, generates the detection signal SD2 according to the detected light amount, and supplies the generated detection signal SD2 to the signal processing unit 23 (see FIG. 6). Moreover, in the following description, an optical path that the blue reproduction light beam Lb4 follows is called a blue optical path 4.

(4-4) Recording and Reproduction of Information

Next, a case in which the optical disc apparatus 220 records information on the optical disc 200 and a case in which the optical disc apparatus 220 reproduces information from the optical disc 200 will be described.

(4-4-1) Recording of Information

When recording information on the optical disc 200, the control unit 221 of the optical disc apparatus 220 irradiates the blue light beams Lb1 and Lb2 onto the optical disc 200 in a state where focus control and tracking control of the objective lens 36 are performed by using the blue light beam Lb11 and forms the focuses Fb1 and Fb2 of the blue light beams Lb1 and Lb2 at the first target mark position PS1 and the second target mark position PS2 all of which are positioned at a bottom side of a target track, respectively. As a result, the optical disc apparatus 220 can form the first recording mark RM1 and the second recording mark RM2 at the first target mark position PS1 and the second target mark position PS2 in the recording layer 101 of the optical disc 100, respectively.

Here, similar to the first embodiment, the signal processing unit 23 divides record information into first divided record information and second divided record information by predetermined data dividing processing, generates recording signals corresponding to binary data (that is, value "0" or "1") that form each divided record information, and supplies the recording signals to the laser diodes 51 and 71, respectively.

Thus, similar to the first embodiment, the optical disc apparatus 220 is configured to be able to simultaneously record the first recording mark RM1 and the second recording mark RM2 that are independent from each other, as two kinds of divided record information obtained by dividing record information, at two positions corresponding to target tracks within the recording layer 101 of the optical disc 200, that is, at the first target mark position PS1 and the second target mark position PS2.

(4-4-2) Reproduction of Information

When reproducing information from the optical disc 200, the control unit 221 (see FIG. 6) of the optical disc apparatus 220 performs focus control and tracking control (that is, position control) of the objective lens 36 using the blue light beam Lb11 in the same manner as recording of information.

Here, similar to the information optical system 50 in the first embodiment, the information optical system 250 (see FIGS. 17 and 18) can simultaneously generate the blue reproduction light beams Lb3 and Lb4 from the first target mark position PS1 and the second target mark position PS2 within the recording layer 101 of the optical disc 200 according to the existence of the first recording mark RM1 and the second recording mark RM2 by simultaneously irradiating the blue light beams Lb1 and Lb2 such that the focuses Fb1 and Fb2 are formed at different first and second target mark positions.

In addition, similar to the first embodiment, the information optical system 250 detects the light amount of the blue reproduction light beams Lb3 and Lb4 using the photodetectors 63 and 83, generates the detection signals SD1 and SD2 according to the detected light amount, and supplies the generated signals SD1 and SD2 to the signal processing unit 23 (see FIG. 6).

Thus, the optical pickup 226 is configured to be able to generate the blue reproduction light beams Lb3 and Lb4, detect the light amount of each of the blue reproduction light beams Lb3 and Lb4 through each of the blue optical paths 3 and 4 by using each of the photodetectors 63 and 83, and generate the detection signals SD1 and SD2 by focusing the blue light beams Lb1 and Lb2 as so-called reference light on the first target mark position PS1 and the second target mark position PS2 within the recording layer 101 of the optical disc 100 in the case when the first recording mark RM1 or the second recording mark RM2 is not recorded.

Accordingly, similar to the first embodiment, the optical disc apparatus 220 can independently recognize which one of the values "1" and "0" is recorded as information according to whether or not the first recording mark RM1 or the second recording mark RM2 is recorded at the first target mark position PS1 or the second target mark position PS2 within the recording layer 101 of the optical disc 200.

In addition, similar to the first embodiment, when division recording is performed on the optical disc 200, the control unit 221 unifies two kinds of reproduction information into one reproduction information by predetermined information unifying processing and then transmits the reproduction information to an external device (not shown). As a result, similar to the first embodiment, in the optical disc apparatus 220, it is possible to obtain a seemingly double reproduction speed only by performing reproduction with a normal reproduction speed using the blue reproduction light beams Lb3 and Lb4.

(4-5) Operations and Effects

In the configuration described above, the control unit 221 (see FIG. 6) of the optical disc apparatus 220 according to the third embodiment performs focus control and tracking control of the objective lens 36 such that the focus Fb11 of the blue light beam Lb11 is formed on a target track in the transflective film 204 (see FIG. 14) of the optical disc 200 by means of the position control optical system 230 (see FIG. 16) of the optical pickup 226 in both cases when information is recorded on the optical disc 200 and when information is reproduced from the optical disc 200.

In addition, similar to the first embodiment, when recording information on the optical disc 200, the control unit 221 independently forms the first recording mark RM1 and the second recording mark RM2 within the recording layer 101 of the optical disc 200 by complementarily controlling the positions of the movable lenses 59 and 77 of the relay lenses 58 and 76 through the actuators 59A and 77A such that the focuses Fb1 and Fb2 of the two blue light beams Lb1 and Lb2 are respectively formed at the different first and second target mark positions PS1 and PS2 (see FIG. 14).

On the other hand, similar to the first embodiment, even in the case of reproducing information from the optical disc 200, the control unit 221 independently controls the positions of the movable lenses 59 and 77 of the relay lenses 58 and 76 such that the focuses Fb1 and Fb2 of the two blue light beams Lb1 and Lb2 are respectively formed at different target mark positions (see FIG. 14) and generates the blue reproduction light beams Lb3 and Lb4 and detects the generated blue reproduction light beams Lb3 and Lb4 with the photodetectors 63 and 83 if the first recording mark RM1 and the second recording mark RM2 are not recorded.

Therefore, similar to the first embodiment, the control unit 221 of the optical disc apparatus 220 can simultaneously record two recording marks, which are independent from each other, at two target mark positions, which correspond to a target track of the optical disc 200 and have different depths, and obtain two kinds of reproduction signals independent from each other from the two target mark positions in both cases of recording and reproduction of information.

At this time, similar to the first embodiment, the control unit 221 divides record information into first divided record information and second divided record information and records the divided first and second record information at the first target mark position PS1 and the second target mark position PS2, respectively, at the time of recording of information and unifies the detection signals SD1 and SD2, which are respectively obtained from the first target mark position PS1 and the second target mark position PS2, and generates one reproduction signal corresponding to a double reproduction speed at the time of reproduction of information, thereby being able to obtain seemingly a double recording speed and a double reproduction speed.

Particularly in the optical pickup 226 (see FIG. 15) of the optical disc apparatus 220, the red laser diode 31 and the like can be removed as compared with the optical pickup 26 (see FIG. 7) in the first embodiment. As a result, since it is possible to make the configuration of the optical pickup 226 simple, it is possible to improve response at the time of tracking-direction movement of the optical pickup 226 due to a reduction in weight and to lower a cost due to elimination of components.

According to the configuration described above, the control unit 221 of the optical disc apparatus 220 according to the third embodiment divides record information, makes the focuses Fb1 and Fb2 of the blue light beams Lb1 and Lb2 based on the divided record information formed at the different first and second target mark positions PS1 and PS2, and forms the first recording mark RM1 and the second recording mark RM2 independently from each other when recording information on the optical disc 200 by performing focus control and tracking control of the objective lens 36 such that the focus Fb11 of the blue light beam Lb11 is formed on a target track in the transflective film 204 of the optical disc 200 by means of the position control optical system 230 of the optical pickup 226. In addition, the control unit 221 of the optical disc apparatus 220 according to the third embodiment makes the focuses Fb1 and Fb2 of the two blue light beams Lb1 and Lb2 formed at the different first and second target mark positions PS1 and PS2, respectively, and unifies reproduction signals obtained on the basis of the blue reproduction light beams Lb3 and Lb4 generated according to the existence of the first recording mark RM1 and the second recording mark RM2 when reproducing information from the optical disc 200. Accordingly, in both cases of recording and reproduction of information, a recording speed and a reproduction speed can be increased.

(5) Fourth Embodiment (5-1) Configuration of an Optical Disc

In a fourth embodiment, information is recorded on the optical disc 200 (see FIGS. 4 and 14) and record information is reproduced from the optical disc 100 in the same manner as in the third embodiment, and accordingly, an explanation thereof will be omitted.

(5-2) Configuration of an Optical Disc Apparatus

Next, an optical disc apparatus 320 according to the fourth embodiment will be described. The optical disc apparatus 320 has a configuration corresponding to the optical disc apparatus 20 shown in FIG. 6. The optical disc apparatus 320 is different from the optical disc apparatus 20 in that a control unit 321 corresponding to the control unit 21 and an optical pickup 326 corresponding to the optical pickup 26 are provided, but the other configuration is similar to that of the optical disc apparatus 20.

Similar to the control unit 221 in the third embodiment, the control unit 321 is configured to include a CPU (not shown) as a main portion. In addition, the control unit 321 is configured to execute various kinds of processing, such as information recording processing or information reproduction processing by reading various programs, such as a basic program and an information recording program, from a ROM (not shown) and loading the read program to a RAM (not shown).

As a result, similar to the optical disc apparatus 20 according to the first embodiment, the optical disc apparatus 320 is configured to record information on a target track in the recording layer 101 of the optical disc 200 or to reproduce information from the target track by causing the control unit 321 to control the optical pickup 326.

(5-3) Configuration of an Optical Pickup

Figure 19:
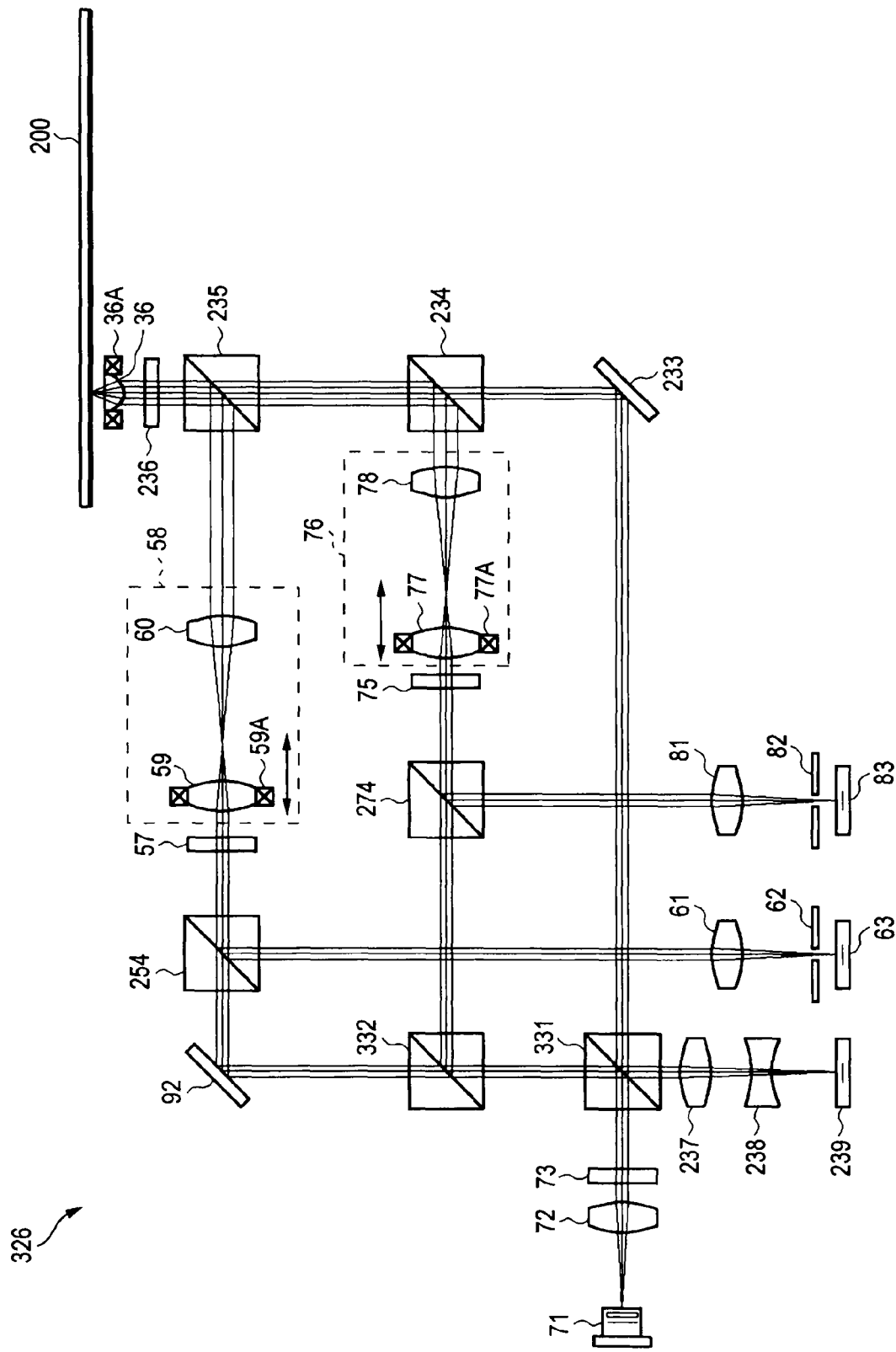
FIG. 19 is a view schematically illustrating the configuration of an optical pickup in the fourth embodiment.

Next, the configuration of the optical pickup 326 is schematically shown in FIG. 19 in which portions corresponding to those shown in FIG. 15 are denoted by the same reference numerals. Similar to the optical pickup 226, the optical pickup 326 is provided with many optical components and is configured to include largely a position control optical system 330 (see FIG. 20) and an information optical system 350 (see FIGS. 21 and 22).

(5-3-1) Configuration of a Position Control Optical System

Figure 20:
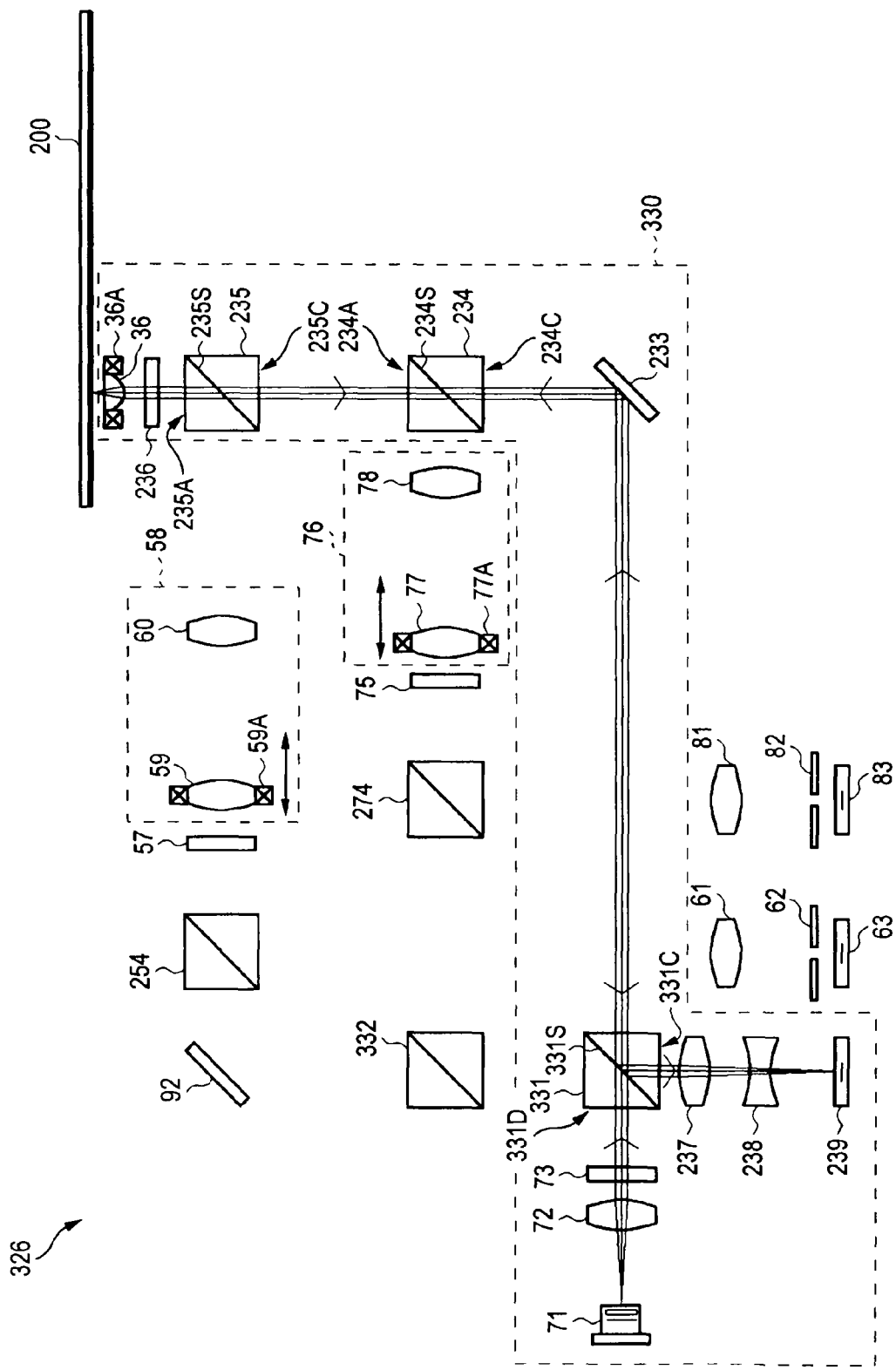
FIG. 20 is a view schematically illustrating an optical path (1) of a blue light beam in the fourth embodiment.

In FIG. 20 corresponding to FIG. 19, the position control optical system 330 in the fourth embodiment is different from the position control optical system 230 of the optical pickup 226 in the third embodiment in that a non-polarization beam splitter 331 is provided instead of the polarization beam splitters 231 and 232, but the other configuration is similar to that of the position control optical system 230.

That is, similar to the third embodiment, the laser diode 71 emits a blue light beam Lb0, which is divergent light, on the basis of a control of the control unit 321 (see FIG. 6) and makes the emitted blue light beam Lb0 incident on a collimator lens 72. The collimator lens 72 converts the blue light beam Lb0 from divergent light to parallel light and makes the converted blue light beam Lb0 incident on a half wavelength plate 53.

The polarization direction of the blue light beam Lb0 is rotated by a predetermined angle by the half wavelength plate 53, such that a percentage of a p-polarized light component is 50% and a percentage of an s-polarized light component is 50%, for example. Then, the blue light beam Lb0 is incident on a surface 331D of the non-polarization beam splitter 331.

The non-polarization beam splitter 331 causes apart (for example, about 10%) of the blue light beams Lb0 to be transmitted through the transflective surface 331S to thereby generate the blue light beam Lb11, to be emitted from a surface 331B, to be reflected by a mirror 233, and to be then incident on a surface 234C of the non-polarization beam splitter 234.

Then, similar to the case of the position control optical system 230 in the third embodiment, the position control optical system 330 irradiates the blue light beam Lb11 toward a surface 200A of the optical disc 200. At this time, the blue light beam Lb11 is transmitted through the substrate 102 and is then reflected from the transflective film 204 in a predetermined rate (for example, about 10%), thereby becoming a blue light beam Lb12 propagating in the direction opposite to the blue light beam Lb11, as shown in FIG. 14.

The blue light beam Lb12 is converted into parallel light by the objective lens 36 and is then incident on the quarter wavelength plate 236. The quarter wavelength plate 236 converts the blue light beam Lb12 from circularly polarized light to linear polarized light and then makes the converted blue light beam Lb12 incident on the surface 235A of the non-polarization beam splitter 235.

Thereafter, the blue light beam Lb12 is sequentially transmitted through the non-polarization beam splitter 35 and the non-polarization beam splitter 234, is reflected by the mirror 233, and is then incident on the surface 331B of the non-polarization beam splitter 331.

The non-polarization beam splitter 331 causes the blue light beam Lb12 to be transmitted through a transflective surface 331S in a predetermined rate (for example, about 80%), to be emitted from a surface 331C, and to be then incident on a condensing lens 237. The condensing lens 237 makes the blue light beam Lb12 converging, astigmatism is given by a cylindrical lens 238, and then the blue light beam Lb12 is irradiated onto a photodetector 239.

Similar to the third embodiment, the photodetector 239 generates four kinds of detection signals SDAc, SDBc, SDCc, and SDDc and transmits the detection signals SDAc, SDBc, SDCc, and SDDc to the signal processing unit 23 (see FIG. 6). Then, the signal processing unit 23 generates the same focus error signal SFEc and tracking error signal STEc as in the third embodiment. The driving control unit 22 is configured to perform focus control and tracking control of the objective lens 36 on the basis of the focus error signal SFEc and the tracking error signal STEc such that the blue light beam Lb11 is focused on a target track of the transflective film 204.

(5-3-2) Configuration of an Information Optical System

On the other hand, the information optical system 350 in the fourth embodiment is largely different from the information optical system 250 (see FIGS. 17 and 18) in the third embodiment in that the laser diode 51 and the collimator lens 52 are not provided and one blue light beam Lb0 irradiated from a laser diode 71 is divided into two blue light beams Lb1 and Lb2, but the other configuration of the information optical system 350 in the fourth embodiment is similar to that of the information optical system 250 in the third embodiment.

Figure 21:
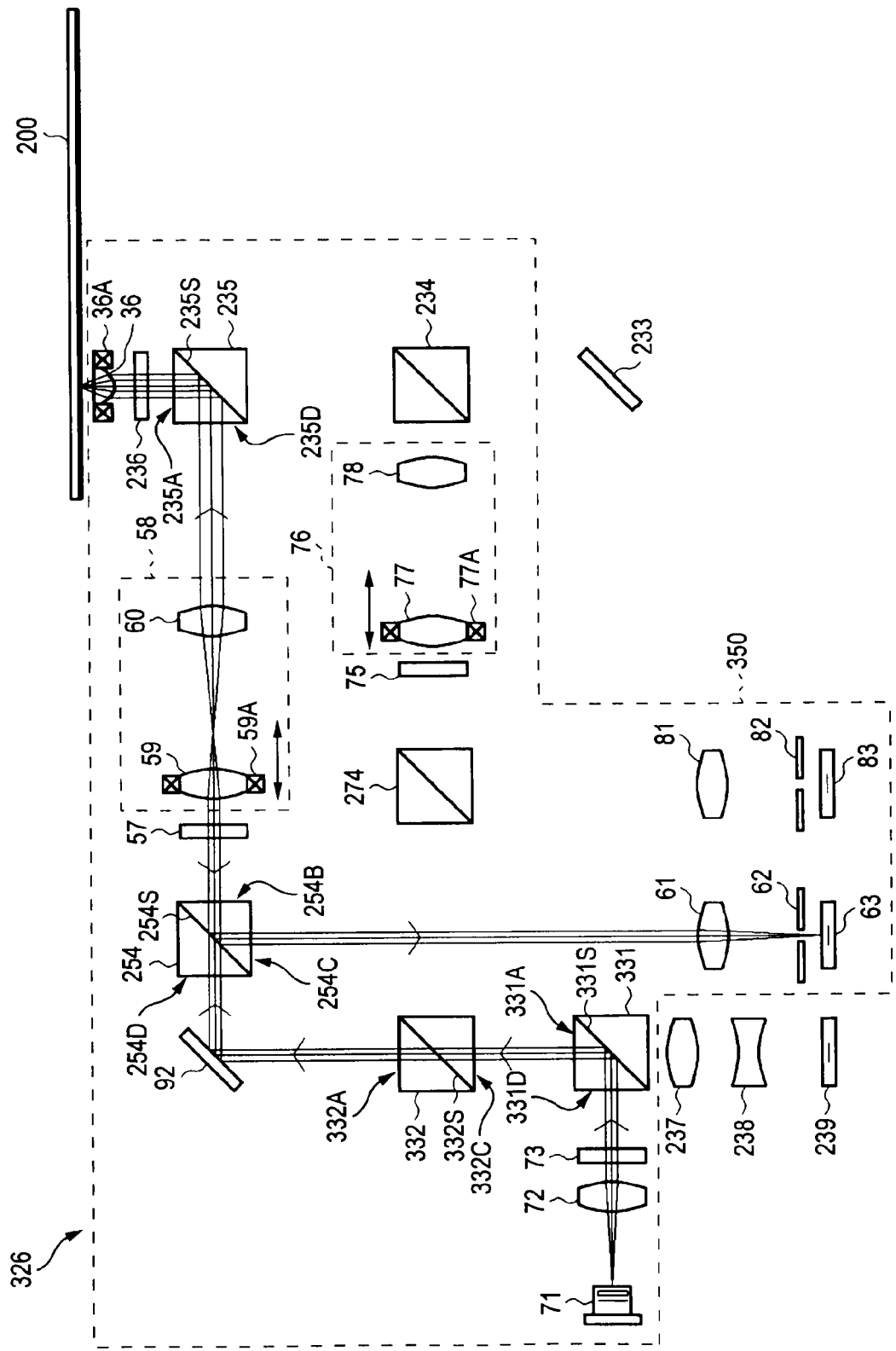
FIG. 21 is a view schematically illustrating an optical path (2) of a blue light beam in the fourth embodiment.

That is, as shown in FIG. 21 corresponding to FIG. 19, in the information optical system 350, the non-polarization beam splitter 331 causes the blue light beam Lb0, which is emitted from the laser diode 71 and whose ratio of p-polarized light and s-polarized light is adjusted to about 50%, to be reflected from the transflective surface 331S in a predetermined rate (for example, about 80%), to be emitted from the surface 331A, and to be then incident on the surface 332C of the polarization beam splitter 332.

The polarization beam splitter 332 causes an s-polarized light component of the blue light beams Lb0 to be transmitted through the transflective surface 332S to thereby generate the blue light beam Lb1, to be emitted from a surface 332A, to be reflected by a mirror 92, and to be then incident on a surface 254D of the polarization beam splitter 254.

Thereafter, the information optical system 350 can form the first recording mark RM1 by forming the focus Fb1 of the blue light beam Lb1 at the first target mark position PS1 within the recording layer 101 of the optical disc 200 through the same blue optical path 1 as in the information optical system 250 in the third embodiment.

Figure 22:
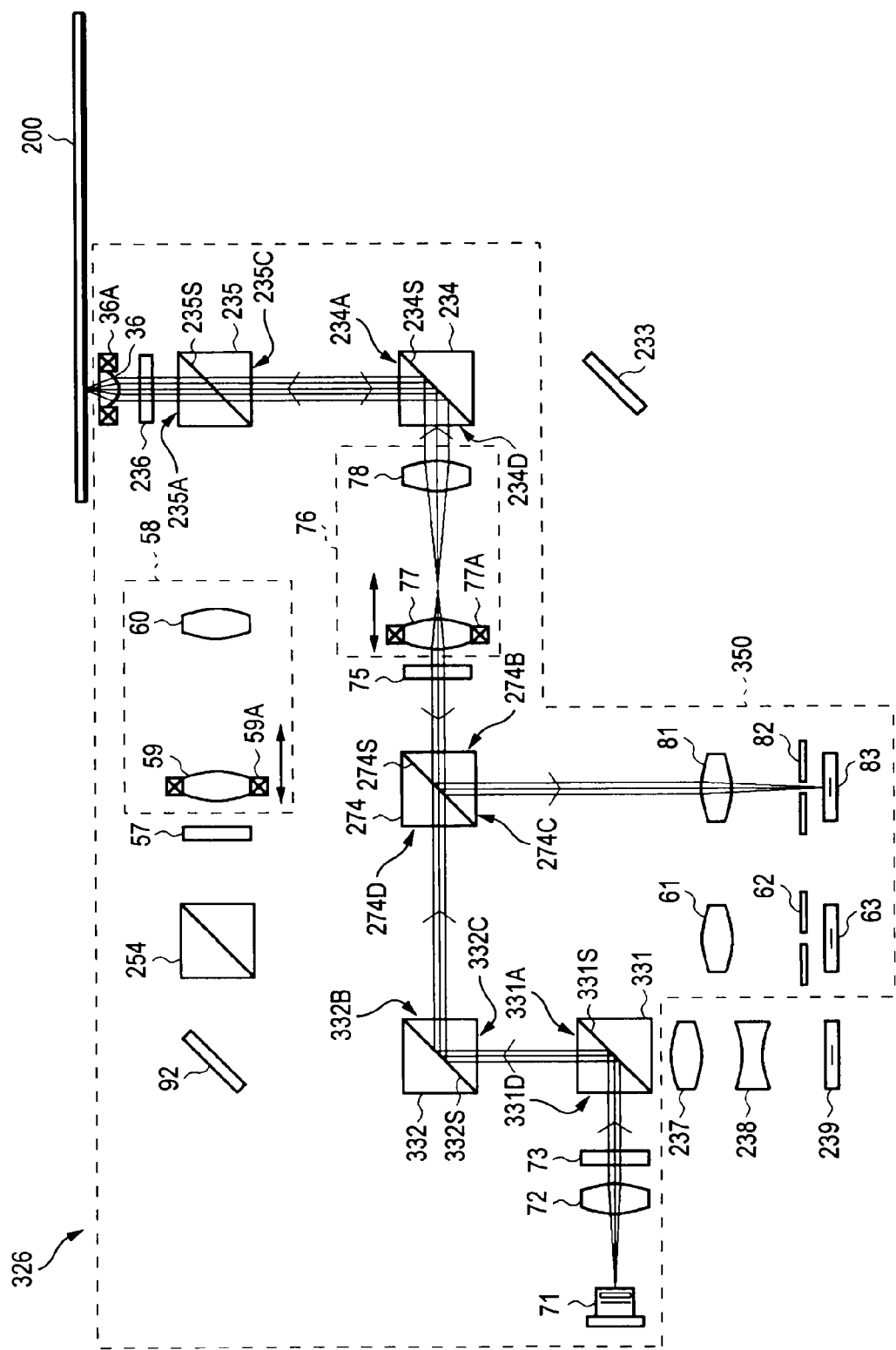
FIG. 22 is a view schematically illustrating an optical path (3) of a blue light beam in the fourth embodiment.

In addition, as shown in FIG. 22 corresponding to FIG. 19, the polarization beam splitter 332 causes a p-polarized light component of the blue light beams Lb0 to be transmitted through the transflective surface 332S to thereby obtain the blue light beam Lb2 and then causes the blue light beam Lb2 to be incident from a surface 332B on a surface 274D of a polarization beam splitter 274.

Thereafter, the information optical system 350 can form the second recording mark RM2 by forming the focus Fb2 of the blue light beam Lb2 at the second target mark position PS2 within the recording layer 101 of the optical disc 200 through the same blue optical path 2 as in the information optical system 250 in the third embodiment.

Furthermore, the information optical system 350 can also generate the detection signals SD1 and SD2 by causing the photodetectors 63 and 83 to detect the blue reproduction light beams Lb3 and Lb4 through the blue optical path 3 and the blue optical path 4, respectively, in the same manner as the third embodiment.

(5-4) Recording and Reproduction of Information

Next, a case in which the optical disc apparatus 320 records information on the optical disc 200 and a case in which the optical disc apparatus 320 reproduces information from the optical disc 200 will be described.
(5-4-1) Recording of Information In the case of recording information on the optical disc 200, the control unit 321 (see FIG. 6) of the optical disc apparatus 320 supplies a driving command and record address information to the driving control unit 22 and supplies record information to the signal processing unit 23 when the control unit 321 receives an information recording command, record information, and record address information from an external device (not shown) as described above.

At this time, the driving control unit 22 performs focus control and tracking control (that is, position control) of the objective lens 36 such that the blue light beam Lb11 follows a target track corresponding to record address information by means of the position control optical system 330 of the optical pickup 326.

In addition, the control unit 321 can make the focus Fb1 of the blue light beam Lb1 and the focus Fb2 of the blue light beam Lb2 formed at the first target mark position PS1 and the second target mark position PS2 all of which are positioned at a bottom side of a target track, respectively, by adjusting the positions of the movable lenses 59 and 77 in the relay lenses 58 and 76.

Here, similar to the second embodiment, the control unit 321 is configured to perform mirroring recording (see FIG. 13) for recording the same information at the master layer YS and the mirror layer YR corresponding to each other.

In this case, similar to the optical pickup 126 in the second embodiment, the optical pickup 326 can form the first recording mark RM1 and the second recording mark RM2, which indicate the same information, at the first target mark position PS1 and the second target mark position PS2 in the recording layer 101 of the optical disc 200, respectively.

(5-4-2) Reproduction of Information

On the other hand, in the case of reproducing information from the optical disc 200, the control unit 321 (see FIG. 6) of the optical disc apparatus 320 performs focus control and tracking control (that is, position control) of the objective lens 36 such that the blue light beam Lb11 follows a target track corresponding to record address information and makes the blue light beams Lb1 and Lb2 irradiated such that the focus Fb1 of the blue light beam Lb1 and the focus Fb2 (see FIG. 14) of the blue light beam Lb2 are formed at the different first and second target mark positions PS1 and PS2, respectively, in the same manner as the case of the optical disc apparatus 220 in the third embodiment.

Thus, the control unit 321 can simultaneously generate the blue reproduction light beams Lb3 and Lb4 from the first target mark position PS1 and the second target mark position PS2 in the recording layer 101 of the optical disc 100, respectively, according to the existence of the first recording mark RM1 and the second recording mark RM2.

Similar to the second embodiment, in the case when mirroring recording is performed on the optical disc 200, the control unit 321 generates the detection signals SD1 and SD2 by forming the focuses Fb1 and Fb2 of the blue light beams Lb1 and Lb2 at the master layer YS and the mirror layer YR corresponding to each other, respectively, compares two kinds of reproduction information through predetermined comparison and correction processing, generates final reproduction information by performing predetermined error correction processing and the like as necessary, and transmits the generated final reproduction information to an external device (not shown) In this case, the reproduction speed in the optical disc apparatus 320 is a normal reproduction speed.

On the other hand, in the case when division recording has been performed on the optical disc 200, the control unit 321 generates the detection signals SD1 and SD2 by forming the focuses Fb1 and Fb2 of the blue light beams Lb1 and Lb2 at the mark recording layers corresponding to each other, respectively, unifies two kinds of reproduction information into one reproduction information through predetermined information unifying processing in the same manner as the first embodiment, and then transmits the unified reproduction information to an external device (not shown). As a result, similar to the optical disc apparatus 20 according to the first embodiment, in the optical disc apparatus 320, it is possible to obtain a seemingly double reproduction speed only by performing reproduction with a normal reproduction speed using the blue reproduction light beams Lb3 and Lb4.

Thus, the control unit 321 of the optical disc apparatus 320 is configured to detect the blue reproduction light beams Lb3 and Lb4, which are generated according to the existence of the first recording mark RM1 and the second recording mark RM2, to thereby generate the detection signals SD1 and SD2 by irradiating the blue light beams Lb1 and Lb2 such that the focuses Fb1 and Fb2 of the blue light beams Lb1 and Lb2 are formed at the first target mark position PS1 and the second target mark position PS2, respectively, by means of the optical pickup 326 and to output final reproduction information on the basis of the generated detection signals SD1 and SD2.

(5-5) Operations and Effects

In the configuration described above, the control unit 321 (see FIG. 6) of the optical disc apparatus 320 according to the fourth embodiment performs focus control and tracking control of the objective lens 36 such that the focus Fb11 of the blue light beam Lb11 is formed on a target track in the transflective film 204 (see FIG. 14) of the optical disc 200 by means of the position control optical system 330 (see FIG. 16) of the optical pickup 326 in both cases when information is recorded on the optical disc 200 and when information is reproduced from the optical disc 200, similar to the third embodiment.

In addition, similar to the second embodiment, when recording information on the optical disc 100, the control unit 321 forms the first recording mark RM1 and the second recording mark RM2, which indicate the same information, within the recording layer 101 of the optical disc 200 by controlling the positions of the movable lenses 59 and 77 of the relay lenses 58 and 76 such that the focuses Fb1 and Fb2 of the blue light beams Lb1 and Lb2 are respectively formed at the different master layer YS and mirror layer YR (see FIG. 5) by using the blue light beams Lb1 and Lb2 obtained by dividing the blue light beam Lb0.

On the other hand, similar to the second embodiment, even in the case of reproducing information from the optical disc 200 in which mirroring recording has been performed, the control unit 321 detects the blue reproduction light beams Lb3 and Lb4, which are generated according to the existence of the first recording mark RM1 and the second recording mark RM2, to thereby generate the detection signals SD1 and SD2 by controlling the positions of the movable lenses 59 and 77 of the relay lenses 58 and 76 such that the focuses Fb1 and Fb2 of the two blue light beams Lb1 and Lb2 are formed at the master layer YS and the mirror layer YR corresponding to each other, respectively, and generates final reproduction information through predetermined comparison and correction processing.

Accordingly, similar to the first to third embodiments, the control unit 321 of the optical disc apparatus 320 can obtain two kinds of reproduction signals, which are independent from each other, from two target mark positions, which correspond to a target track of the optical disc 200 and have different depths, when reproducing information from the optical disc 200.

On the other hand, similar to the second embodiment, the control unit 321 of the optical disc apparatus 320 can record the recording mark RM indicating the same information at two target mark positions in the master layer YS and the mirror layer YR, which correspond to a target track of the optical disc 200 and have different depths, when recording information on the optical disc 200.

Accordingly, the control unit 321 can perform mirroring recording, which increases redundancy of information, by using the master layer YS and the mirror layer YR corresponding to each other within the recording layer 101 of the optical disc 200. As a result, it is possible to improve the quality of reproduction information.

Particularly in the optical pickup 326 (see FIG. 19) of the optical disc apparatus 320, the red laser diode 31 and the like can be removed as compared with the optical pickup 126 (see FIG. 10) in the second embodiment. Accordingly, similar to the third embodiment, it is possible to make the configuration of the optical pickup 326 simple. As a result, it is possible to improve response at the time of tracking-direction movement of the optical pickup 326 due to a reduction in weight and to lower a cost due to elimination of components.

According to the configuration described above, the control unit 321 of the optical disc apparatus 320 according to the fourth embodiment performs mirroring recording for forming the first recording mark RM1 and the second recording mark RM2, which indicate the same information, at two target mark positions in the master layer YS and the mirror layer YR having different depths from a target track when recording information on the optical disc 200 by performing focus control and tracking control of the objective lens 36 such that the focus Fb11 of the blue light beam Lb11 is formed on a target track in the transflective film 204 of the optical disc 200. In addition, the control unit 321 of the optical disc apparatus 320 according to the fourth embodiment detects the blue reproduction light beams Lb3 and Lb4, which are generated according to the existence of the first recording mark RM1 and the second recording mark RM2, to thereby generate the detection signals SD1 and SD2 by forming the focuses Fb1 and Fb2 of the blue light beams Lb1 and Lb2 at the master layer YS and the mirror layer YR corresponding to each other, respectively, and then generates final reproduction information through predetermined comparison and correction processing when reproducing information. As a result, it is possible to improve the quality of reproduction information. In addition, in the case when record information is recorded in a state where the record information is divided, it is possible to increase the reproduction speed.

(6) Other Embodiments

Figure 23A:
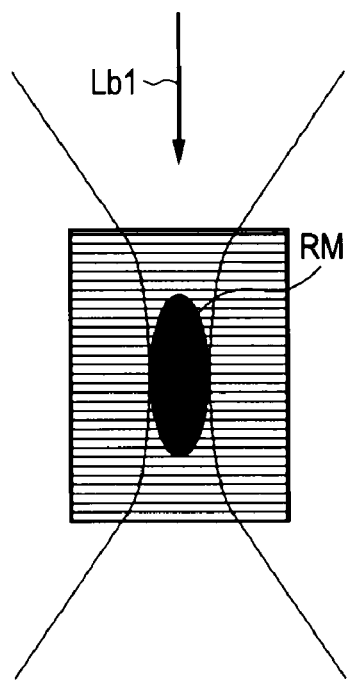
FIGS. 23A and 23B are views illustrating principles of recording and reproduction of information in other embodiments.
Figure 23B:
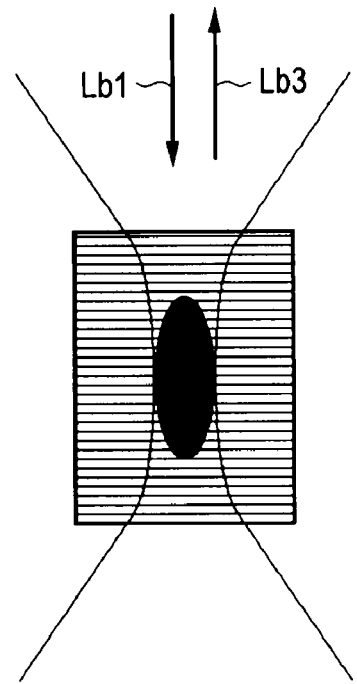

In the above first to fourth embodiments, the cases in which recording of information is performed by forming holograms as a format on the entire surfaces of the optical disc 100 and 200 beforehand and breaking the holograms by recording the recording mark RM have been described. However, the present invention is not limited to the above cases. For example, it may be possible to use various kinds of optical discs capable of performing recording and reproduction of the recording mark RM with one light beam and of forming a plurality of mark recording layers within a recording layer so as to overlap one another, like an optical disc capable of forming the recording mark RM by condensing light beams on a recording layer, which is formed of photopolymer having a uniform refractive index, such that the refractive index or the reflectance changes as shown in FIG. 23A and capable of detecting whether or not the recording mark RM is present on the basis of the change of the refractive index or the reflectance of a light beam as shown in FIG. 23B.

In this case, preferably, the light amount or irradiation time of light beams irradiated onto an optical disc is properly adjusted according to a type, a recording method, and the like of an optical disc.

Furthermore, in the above first to fourth embodiments, the cases in which two blue reproduction light beams Lb3 and Lb4 are generated through two kinds of blue optical paths and two kinds of reproduction signals obtained at this time are unified to thereby generate one reproduction signal having a double reproduction speed have been described. However, the present invention is not limited to the above cases. For example, it may be possible to make a reproduction speed three times or four or more times by providing three or four or more blue optical paths and unifying three or four or more reproduction signals that can be obtained by generating three or four or more blue reproduction light beams.

In this case, preferably, a relay lens is provided in each blue optical path such that the focus Fb of the blue light beam Lb irradiated onto the optical disc 100 or 200 can be adjusted to be formed at different positions (depths), and the light amount of only desired blue reproduction light beams is detected by a pinhole plate provided immediately before a photodetector.

Furthermore, in the above second to fourth embodiments, the cases in which mirroring recording for simultaneously recording the same information on a plurality of mark recording layers is performed have been described. However, the present invention is not limited to the above cases. For example, in the case of providing three or more blue optical paths and recording different information for each blue light beam of each optical path in the first to third embodiments described above, each hard disc drive in so-called RAID (redundant array of inexpensive discs) 2 to 5 may be made to correspond to each mark recording layer and a part of information that is recorded at the same time may be recorded as a parity.

Furthermore, in the above second to fourth embodiments, the cases in which when mirroring recording is performed, the blue reproduction light beams Lb3 and Lb4 are concurrently generated from the first target mark position PS1 and the second target mark position PS2 even at the time of reproduction by using two kinds of light beams of the blue light beams Lb1 and Lb2 and real-time comparison and correction processing is performed such that a reproduction signal is generated in a normal reproduction speed have been described. However, the present invention is not limited to the above cases. For example, in the case of increasing the accuracy of information reproduction rather than a reproduction speed, information may be sequentially read from the master layer YS and the mirror layer YR and then comparison and then correction processing may be performed in an optical disc apparatus having a configuration in which only one kind of blue light beam Lb1 can be irradiated.

Furthermore, in the above first and second embodiments, the cases in which a red light beam having a wavelength of about 660 nm is used as a light beam (referred to as a position control light beam) for performing position control of the objective lens 36 and a blue light beam having a wavelength of about 405 nm is used as a light beam (referred to as a recording light beam) for forming the recording mark RM have been described. However, the present invention is not limited to the above cases, but each of the position control light beam and the recording light beam may have an arbitrary wavelength.

In this case, a material having a property of reflecting a position control light beam according to the wavelength and transmitting a recording light beam according to the wavelength is preferably used as the transflective film 104. In addition, the recording layer 101 is preferably formed of a material that reacts to the wavelength of a recording light beam.

Furthermore, in the above third and fourth embodiments, the cases in which a blue light beam having a wavelength of about 405 nm is used as each of the position control light beam and the recording light beam have been described. However, the present invention is not limited to the above cases, but each of the position control light beam and the recording light beam may have an arbitrary wavelength.

Furthermore, in the above first to fourth embodiments, the cases in which the depth (that is, a distance from the transflective film 104 or 204) of a target mark position within the optical disc 100 or 200 is adjusted by the relay lenses 58 and 76 have been described. However, the present invention is not limited to the above cases. For example, the depth of the target mark position may be changed by moving a single condensing lens or the depth of the target mark position may be changed by performing focus control of the objective lens 36. That is, the depth of the target mark position may be changed by using the other techniques.

Furthermore, in the above first and second embodiments, the cases in which optical axes of the red light beam Lr1 and the blue light beam Lb1 are made to match have been described. However, the present invention is not limited to the above cases. For example, optical axes of the red light beam Lr1 and the blue light beam Lb1 may be made to be inclined from each other by a predetermined angle, such that a target track and a target mark position do not match each other (that is, offset is provided) intentionally when viewed from the surface 100A of the optical disc 100.

Furthermore, in the above first to fourth embodiments, the cases in which a focus error signal is generated by using an astigmatic method in the position control optical systems 30, 90, 230, and 330 have been described. However, the present invention is not limited to the above cases, but the focus error signal may also be generated by using other methods, such as a knife edge method or the Foucault method.

In addition, generation of a tracking error signal in the position control optical systems 30, 90, 230, and 330 is not limited to the push-pull method. For example, the tracking error signal may also be generated by using other methods, such as a three beam method or a differential push-pull method.

In this case, it is preferable that an optical element, such as a diffraction grating, be provided instead of the cylindrical lenses 38 and 238 according to a method of generating an error signal. In addition, for the photodetectors 39 and 239, it is preferable that a detection region be divided in a division pattern according to a method of generating an error signal. In addition, the signal processing unit 23 preferably generates an error signal by performing calculation processing according to a method of generating an error signal.

Furthermore, in the above first to fourth embodiments, the cases in which the spherical aberrations of the blue light beams Lb1 and Lb2 and the blue reproduction light beams Lb3 and Lb4 or the comatic aberrations resulting from the inclination of the optical disc 100 are corrected by the liquid crystal panel 57 or 75 have been described. However, the present invention is not limited to the above cases. The spherical aberration or the comatic aberration resulting from the inclination of the optical disc 100 may also be corrected by other kinds of optical elements, such as a relay lens.

Furthermore, in the above first to fourth embodiments, the cases in which the diameters of the optical discs 100 and 200 are set to about 120 mm, the thickness t1 of the recording layer 101 is set to about 0.3 mm, and the thicknesses t2 and t3 of the substrates 102 and 103 are set to about 0.6 mm have been described. However, the present invention is not limited to the above cases, but other values may also be set. In this case, it is preferable to set optical properties or arrangement of optical components such that focuses of the blue light beams Lb1 and Lb2 are formed at the target mark positions in consideration of the thicknesses of the recording layer 101 and substrates 102 and 103 and the refractive index of each material.

Furthermore, in the above embodiments, the cases in which the relay lens 58 and the control unit 21 as a first focus position adjusting section, the relay lens 76 and the control unit 21 as a second focus position adjusting section, and the control unit 21 as a focus control section and a recording control section form the optical disc apparatus 20 as an optical disc apparatus have been described. However, the present invention is not limited to the above cases, but the optical disc apparatus may also be configured to include the first focus position adjusting section, the second focus position adjusting section, and the focus control section and the recording control section having other kinds of circuit configurations.

Furthermore, in the above embodiments, the cases in which the relay lens 58 and the control unit 21 as the first focus position adjusting section, the relay lens 76 and the control unit 21 as the second focus position adjusting section, and the control unit 21 as the focus control section, the photodetectors 63 and 83 as first and second detecting sections, and the signal processing unit 23 and the control unit 21 as a reproduction signal generating section form the optical disc apparatus 20 as an optical disc apparatus have been described. However, the present invention is not limited to the above cases, but the optical disc apparatus may also be configured to include the first focus position adjusting section, the second focus position adjusting section, and the focus control section, the first and second detecting sections, and the reproduction signal generating section having other kinds of circuit configurations.

The present invention may also be applied to an optical disc apparatus that records/reproduces various kinds of data, such as image data or music data, on/from an optical disc.

It should be understood by those skilled in the art that various modifications, combinations, sub-combinations and alterations may occur depending on design requirements and other factors in so far as they are within the scope of the appended claims or the equivalents thereof.

What is claimed is:

1. An optical disc apparatus that records recording marks in a plurality of mark layers by irradiating predetermined light onto a recording medium on a basis of information to be recorded, comprising:

first focus position adjusting means for adjusting a focus of a first light beam onto a first mark layer of the recording medium, in a direction of an optical axis of the first light beam;

second focus position adjusting means for adjusting a focus of a second light beam onto a second mark layer of the recording medium, in a direction of an optical axis of the second light beam;

an objective lens disposed so that the first light beam and the second light beam pass through the objective lens to the recording medium;

objective lens control means for irradiating a third light beam onto a positioning layer of the recording medium through the objective lens and for controlling a position of the objective lens on a basis of the third light beam reflected from the positioning layer so that the third light beam is focused onto the positioning layer;

focus control means for controlling the first focus position adjusting means and the second focus position adjusting means independently such that the first light beam and the second light beam are focused onto the first mark layer and the second mark layer of the recording medium, respectively; and recording control means for forming the recording marks in the first mark layer and the second mark layer of the recording medium by irradiating the first light beam and the second light beam, respectively, according to the information to be recorded.

2. The optical disc apparatus according to claim 1, wherein the recording control means forms the recording marks by dividing the information to be recorded in a predetermined unit and distributing the divided information to the first light beam and the second light beam.

3. The optical disc apparatus according to claim 1, wherein the recording control means forms the recording marks by applying the information to be recorded to both the first light beam and the second light beam in a redundant manner.

4. The optical disc apparatus according to claim 1, wherein the positioning layer is formed with a track indicating a recording position of the recording mark, and the objective lens control means recognizes the track on a basis of the third light beam reflected from the positioning layer and then controls the position of the objective lens.

5. The optical disc apparatus according to claim 1, wherein the third light beam has a wavelength different from that of the first and second light beams, and the positioning layer transmits the first and second light beams therethrough and reflects the third light beam therefrom by using a wavelength selectivity thereof.

6. The optical disc apparatus according to claim 1, wherein the third light beam has a same wavelength as the first and second light beams, and the positioning layer transmits the first and second light beams therethrough in a predetermined rate and reflects the third light beam therefrom in a predetermined rate by adjusting a transmittance thereof.

7. The optical disc apparatus according to claim 1, wherein the recording medium is formed beforehand with a uniform hologram, and the recording control means forms the recording mark by locally breaking the hologram when the information is recorded by using the first or second light beam.

8. The optical disc apparatus according to claim 1, wherein the recording medium uniformly has a predetermined reflectance, and the recording control means forms the recording mark by changing the reflectance by locally altering the recording medium when the information is recorded by using the first or second light beam.

9. The optical disc apparatus according to claim 1, wherein the recording medium uniformly has a predetermined refractive index, and the recording control means forms the recording mark by changing the refractive index by locally altering the recording medium when the information is recorded by using the first or second light beam.

10. An information recording method of recording marks in a plurality of mark layers by irradiating predetermined light onto a recording medium on a basis of information to be recorded, comprising:

adjusting a focus of a first light beam onto a first mark layer of the recording medium, in a direction of an optical axis of the first light beam;

adjusting a focus of a second light beam onto a second mark layer of the recording medium, in a direction of an optical axis of the second light beam, the first light beam and the second light beam passing through an objective lens and the adjusting of the focus of the first light beam and the adjusting of the focus of the second light beam being independent from each other;

irradiating a third light beam onto a positioning layer of the recording medium through the objective lens;

controlling a position of the objective lens on a basis of the third light beam reflected from the positioning layer of the recording medium so that the third light beam is focused onto the positioning layer; and forming the recording marks in the first mark layer and the second mark layer of the recording medium by irradiating the first light beam and the second light beam, respectively, according to the information to be recorded.

11. An optical disc apparatus that reproduces information by irradiating predetermined light onto a recording medium in which recording marks are recorded in a plurality of mark layers, comprising:

first focus position adjusting means for adjusting a focus of a first light beam onto a first mark layer of the recording medium, in a direction of an optical axis of the first light beam;

second focus position adjusting means for adjusting a focus of a second light beam onto a second mark layer of the recording medium, in a direction of an optical axis of the second light beam;

an objective lens disposed so that the first light beam and the second light beam pass through the objective lens to the recording medium;

objective lens control means for irradiating a third light beam onto a positioning layer of the recording medium through the objective lens and for controlling a position of the objective lens on a basis of the third light beam reflected from the positioning layer so that the third light beam is focused onto the positioning layer;

focus control means for controlling the first focus position adjusting means and the second focus position adjusting means independently such that the first light beam and the second light beam are focused onto the first mark layer and the second mark layer of the recording medium, respectively, and first and second reproduction light beams being generated according to the recording marks of the first and second mark layers, respectively;

detecting means for detecting the first and second reproduction light beams; and reproduction signal generating means for generating a reproduction signal based on detection results of the detecting means.

12. The optical disc apparatus according to claim 11, wherein the recording medium is configured such that when the information is recorded as the recording marks, the information is divided in a predetermined recording unit and is recorded in a state where the divided information is distributed to the first and second mark layers by the first light beam and the second light beam, and the reproduction signal generating means generates the reproduction signal equivalent to the information before the division by unifying detection results of the detecting means.

13. The optical disc apparatus according to claim 11, wherein the recording medium is configured such that when the recording marks are recorded, the same information is recorded on the first mark layer and the second mark layer by the first light beam and the second light beam, respectively, in a redundant manner, and the reproduction signal generating means generates the reproduction signal by performing predetermined error correction processing on detection results of the detecting means.

14. The optical disc apparatus according to claim 11, wherein the detecting means causes mixed reproduction light comprising the first and second reproduction light beams to converge and the detecting means selectively detects one of the first and second reproduction light beams by using a pinhole provided at a focus position of the first or second reproduction light.

15. The optical disc apparatus according to claim 11, wherein the positioning layer is formed with a track indicating a recording position of the recording mark, and the objective lens control means recognizes the track on a basis of the third light beam reflected from the positioning layer and then controls the position of the objective lens.

16. The optical disc apparatus according to claim 11, wherein the third light beam has a wavelength different from that of the first and second light beams, and the positioning layer transmits the first and second light beams therethrough and reflects the third light beam therefrom by using a wavelength selectivity thereof.

17. The optical disc apparatus according to claim 11, wherein the third light beam has a same wavelength as the first and second light beams, and the positioning layer transmits the first and second light beams therethrough in a predetermined rate and reflects the third light beam, which has the same wavelength as the first and second light beams, therefrom in a predetermined rate by adjusting a transmittance thereof.

18. The optical disc apparatus according to claim 11, wherein the recording medium is formed with a uniform hologram beforehand and then the hologram is locally broken to thereby form the recording mark, and the detecting means detects that the recording marks are recorded when the first and second reproduction light beams are not detected.

19. The optical disc apparatus according to claim 11, wherein the recording medium uniformly has a predetermined reflectance and the recording mark is formed by changing the reflectance by locally altering the recording medium, and the detecting means detects the first and second reproduction light beams as a change in the reflectance.

20. The optical disc apparatus according to claim 11, wherein the recording layer of the recording medium uniformly has a predetermined refractive index and the recording mark is formed by changing the refractive index by locally altering the recording medium, and the detecting means detects the first and second reproduction light beams as a change in the refractive index.

21. An information reproduction method of reproducing information by irradiating predetermined light onto a recording medium in which recording marks are recorded in a plurality of mark layers, comprising:

irradiating a first light beam and a second light beam onto a first mark layer and a second mark layer of the recording medium, the first light beam and the second light beam passing through an objective lens;

irradiating a third light beam onto a positioning layer of the recording medium through the objective lens;

controlling a position of the objective lens on a basis of the third light beam reflected from the positioning layer so that the third light beam is focused onto the positioning layer;

adjusting a focus of the first light beam onto the first mark layer of the recording medium, in a direction of an optical axis of the first light beam;

adjusting a focus of the second light beam onto the second mark layer of the recording medium, in a direction of an optical axis of the second light beam, the adjusting of the focus of the first light beam and the adjusting of the focus of the second light beam being independent from each other, and first and second reproduction light beams being generated on a basis of the recording marks of the first and second mark layers, respectively;

detecting the first and second reproduction light beams; and generating a reproduction signal based on detection results in the detecting of the first and second reproduction light beams.

22. An optical disc apparatus that records recording marks in a plurality of mark layers by irradiating predetermined light onto a recording medium on a basis of information to be recorded, comprising:

a first focus position adjusting unit configured to adjust a focus of a first light beam onto a first mark layer of the recording medium, in a direction of an optical axis of the first light beam;

a second focus position adjusting unit configured to adjust a focus of a second light beam onto a second mark layer of the recording medium, in a direction of an optical axis of the second light beam;

an objective lens disposed so that the first light beam and the second light beam pass through the objective lens to the recording medium;

an objective lens control unit configured to irradiate a third light beam onto a positioning layer of the recording medium through the objective lens and to control a position of the objective lens on a basis of the third light beam reflected from the positioning layer so that the third light beam is focused onto the positioning layer;

a focus control unit configured to control the first focus position adjusting unit and the second focus position adjusting unit independently such that the first light beam and the second light beam are focused onto the first mark layer and the second mark layer of the recording medium, respectively; and a recording control unit configured to form the recording marks in the first mark layer and the second mark layer of the recording medium by irradiating the first light beam and the second light beam, respectively, according to the information to be recorded.

23. An optical disc apparatus that reproduces information by irradiating predetermined light onto a recording medium in which recording marks are recorded in a plurality of mark layers, comprising:

a first focus position adjusting unit configured to adjust a focus of a first light beam onto a first mark layer of the recording medium, in a direction of an optical axis of the first light beam;

a second focus position adjusting unit configured to adjust a focus of a second light beam onto a second mark layer of the recording medium, in a direction of an optical axis of the second light beam;

an objective lens disposed so that the first light beam and the second light beam pass through the objective lens to the recording medium;

an objective lens control unit configured to irradiate a third light beam onto a positioning layer of the recording medium through the objective lens and to control a position of the objective lens on a basis of the third light beam reflected from the positioning layer so that the third light beam is focused onto the positioning layer;

a focus control unit configured to control the first focus position adjusting unit and the second focus position adjusting unit independently such that the first light beam and the second light beam are focused onto the first mark layer and the second mark layer of the recording medium, respectively, and first and second reproduction light beams being generated according to the recording marks of the first and second mark layers, respectively;

a detecting unit configured to detect the first and second reproduction light beams; and a reproduction signal generating unit configured to generate a reproduction signal based on detection results of the detecting unit.

* * * * *